US010204380B1

United States Patent
Moore et al.

(10) Patent No.: US 10,204,380 B1
(45) Date of Patent: Feb. 12, 2019

(54) CATEGORICALLY INDUCTIVE TAXONOMY SYSTEM, PROGRAM PRODUCT AND METHOD

(71) Applicant: EEZZData, Inc., Stockton, CA (US)

(72) Inventors: Riley Moore, Stockton, CA (US); Wendy Foulks, Stockton, CA (US); Thom Foulks, Stockton, CA (US); James Terrence Moore, Clovis, CA (US); Andrew Anthony Gallegos, Albuquerque, NM (US)

(73) Assignee: EEZZData, Inc., Stockton, CA (US)

( * ) Notice: Subject to any disclaimer, the term of this patent is extended or adjusted under 35 U.S.C. 154(b) by 590 days.

(21) Appl. No.: 14/740,757

(22) Filed: Jun. 16, 2015

(51) Int. Cl.
*G06Q 40/00* (2012.01)
*G06F 17/30* (2006.01)

(52) U.S. Cl.
CPC ....... *G06Q 40/12* (2013.12); *G06F 17/30342* (2013.01)

(58) Field of Classification Search
CPC ...... G06Q 30/00; G06Q 40/00; G06Q 20/282; G06Q 30/06; G06Q 30/04; G06Q 10/10; G06Q 10/06; G06F 17/30; G06F 7/00
USPC ............. 707/661, 827, 754, 999.01, 999.009
See application file for complete search history.

(56) References Cited

U.S. PATENT DOCUMENTS

| 5,659,165 | A | 8/1997 | Jennings et al. |
| 6,571,251 | B1 * | 5/2003 | Koski ...................... G06N 5/04 |
| 7,685,033 | B2 | 3/2010 | Talan et al. |
| 8,156,150 | B2 * | 4/2012 | Ng ................... G06F 17/30592 |
| | | | 707/791 |
| 8,315,900 | B2 * | 11/2012 | Schwarz ............ G06Q 10/0631 |
| | | | 705/7.12 |
| 8,392,310 | B1 | 3/2013 | Praisner et al. |
| 8,583,516 | B1 | 11/2013 | Pitt et al. |
| 8,719,126 | B2 | 5/2014 | Hall et al. |
| 2002/0087454 | A1 * | 7/2002 | Calo ..................... G06Q 30/06 |
| | | | 705/37 |

(Continued)

FOREIGN PATENT DOCUMENTS

| AU | 2001100006 A4 | 5/2001 |
| JP | 2002-236786 A | 8/2002 |

(Continued)

*Primary Examiner* — Olusegun Goyea
(74) *Attorney, Agent, or Firm* — Foley & Lardner LLP

(57) ABSTRACT

System, method and program product, the system configured to retrieve entity financial transaction data; receive for the financial transaction categorical transaction tags categorizing the financial transaction; access a taxonomy associated with the entity, wherein the taxonomy has a progression inductively backwards; determine an identification code for the financial transaction based on the categorical transaction tags, wherein the identification code references a particular data structures in the taxonomy; select one of the categorical transaction tags as the most granular element; assign a unique data tag in the particular data structure to the most granular element; identify, parse and transform the financial transaction data for use in logical functions; execute an inductive algorithm to propagate from the most granular element to a higher level in the one data structure to thereby determine and populate a location in a report based on the inductive algorithm; and transmit the report.

23 Claims, 38 Drawing Sheets

(56) References Cited

U.S. PATENT DOCUMENTS

| | | | |
|---|---|---|---|
| 2002/0087455 A1* | 7/2002 | Tsagarakis | G06Q 20/382 |
| | | | 705/37 |
| 2003/0055754 A1 | 3/2003 | Sullivan | |
| 2004/0078271 A1 | 4/2004 | Morano et al. | |
| 2006/0041605 A1* | 2/2006 | King | G06F 17/30011 |
| 2007/0055602 A1 | 3/2007 | Mohn | |
| 2007/0067297 A1* | 3/2007 | Kublickis | G06Q 30/02 |
| 2007/0168274 A1 | 7/2007 | Taylor | |
| 2009/0112743 A1* | 4/2009 | Mullins | G06Q 30/04 |
| | | | 705/31 |
| 2009/0112773 A1* | 4/2009 | Song | G06Q 40/04 |
| | | | 705/36 R |
| 2009/0254572 A1* | 10/2009 | Redlich | G06Q 10/06 |
| 2010/0250497 A1* | 9/2010 | Redlich | F41H 13/00 |
| | | | 707/661 |
| 2013/0036047 A1 | 2/2013 | Busher | |
| 2014/0006426 A1* | 1/2014 | Eden | G06F 17/30386 |
| | | | 707/754 |
| 2014/0067973 A1* | 3/2014 | Eden | G06Q 10/10 |
| | | | 709/206 |

FOREIGN PATENT DOCUMENTS

| | | |
|---|---|---|
| KR | 100513756 B1 | 12/2004 |
| KR | 1020090002167 A | 6/2007 |
| KR | 1020130038126 A | 4/2012 |

* cited by examiner

Figure 1A System Overview – Part 1
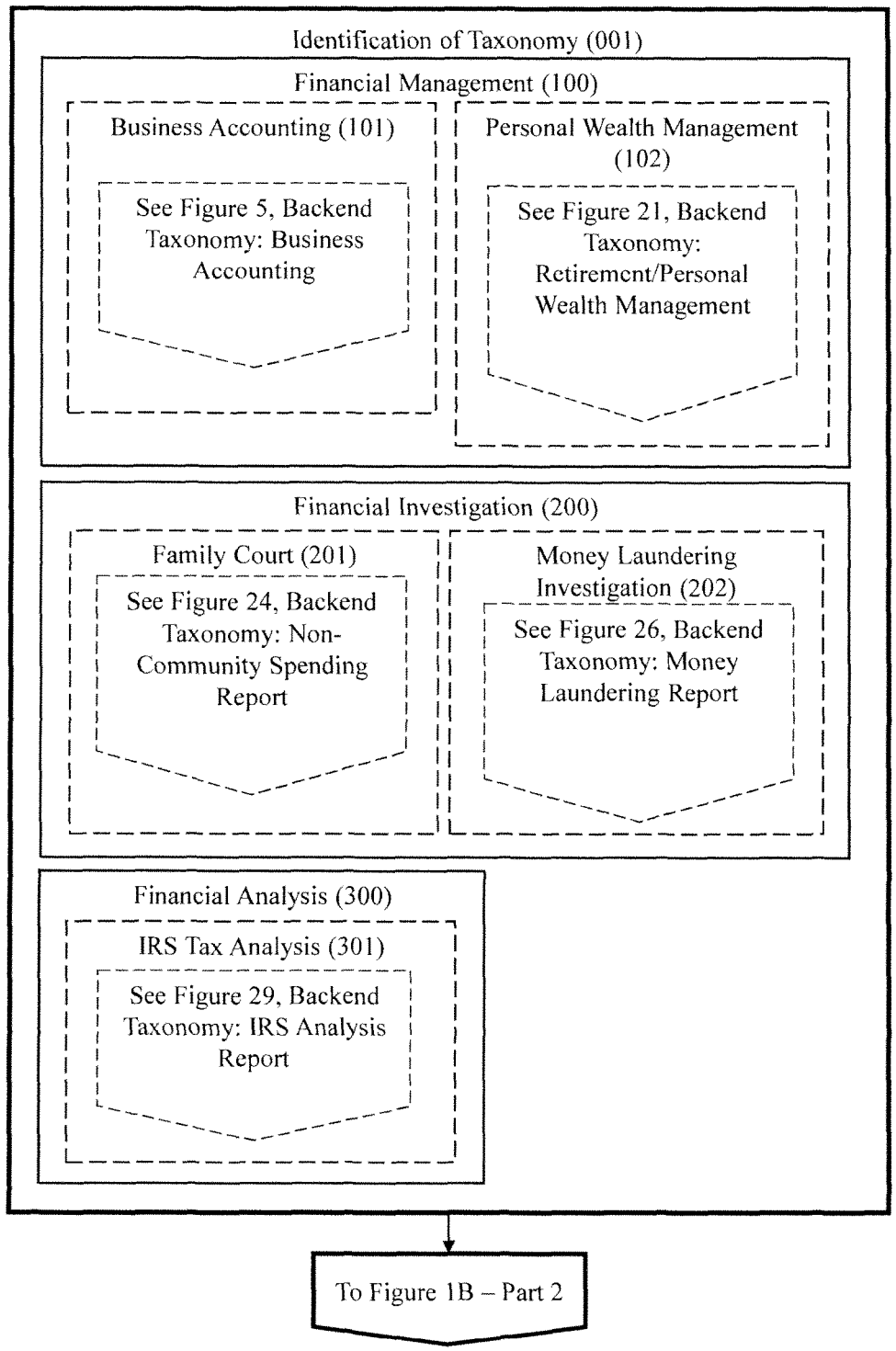

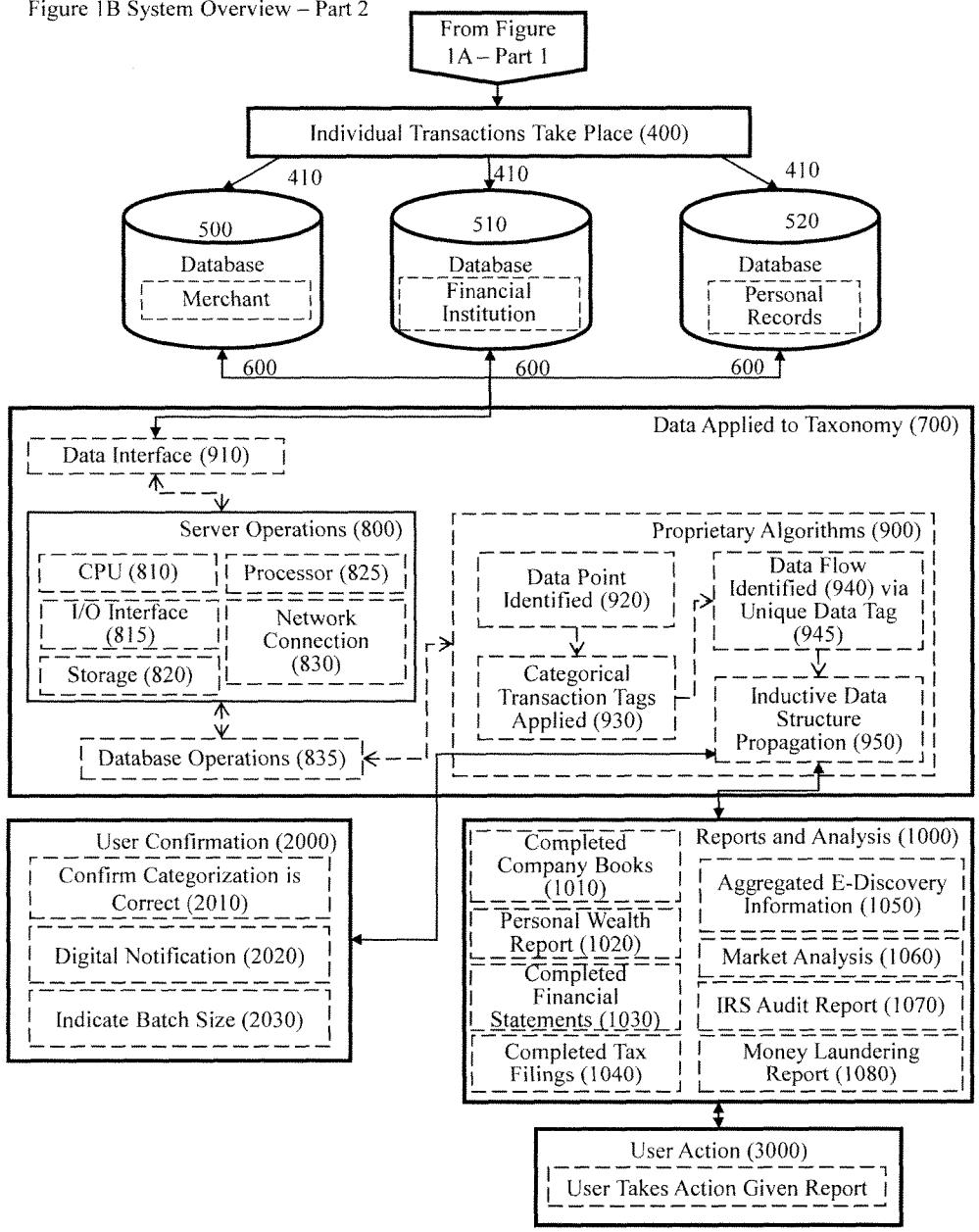
Figure 1B System Overview – Part 2

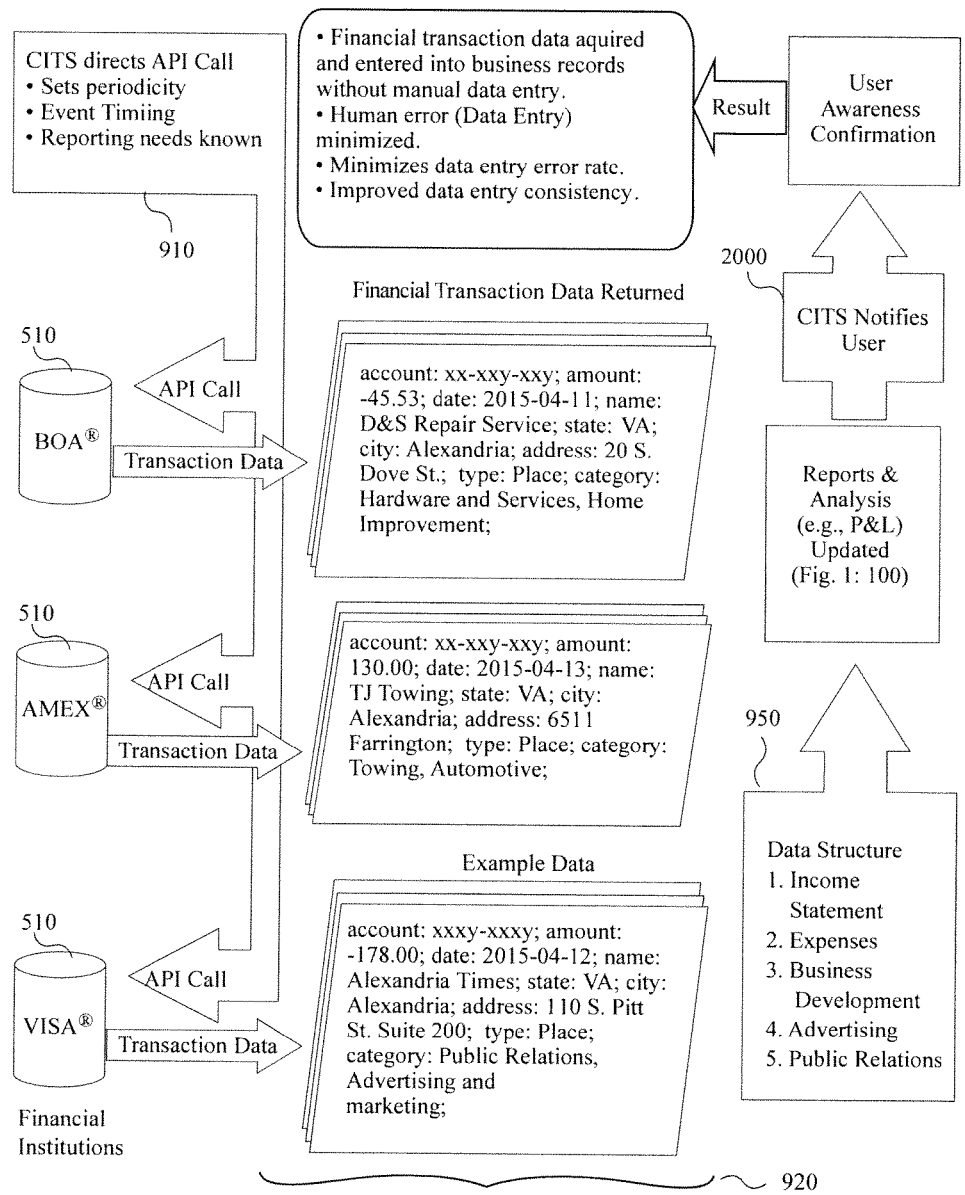
Figure 2A, Inductive Data Structure Propagation (FIG. 1: 950)

Figure 2B, Inductive Data Structure Propagation (FIG. 1: 950) Continued
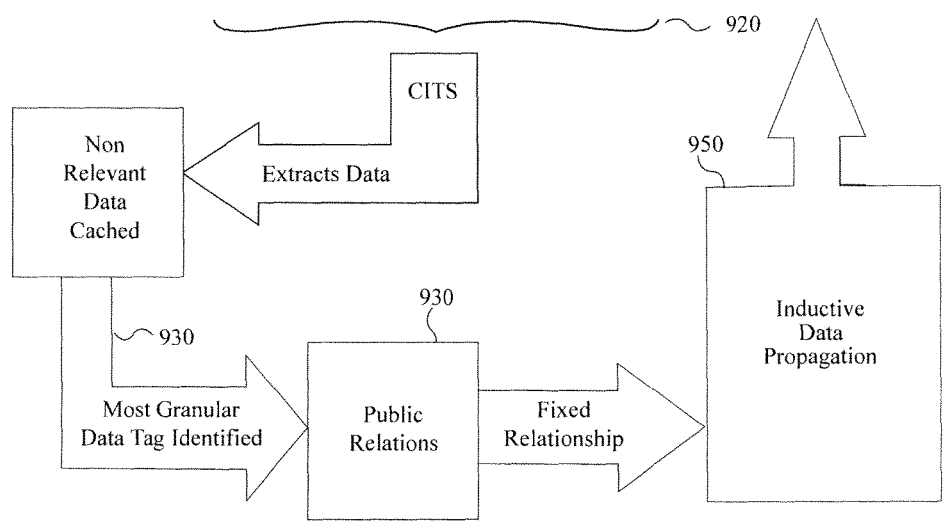

Figure 3, Inductive Data Structure Propagation – Part 1
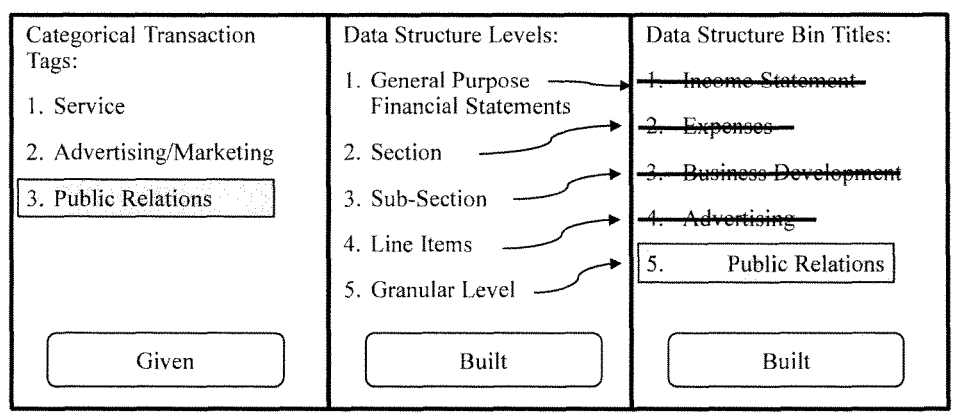

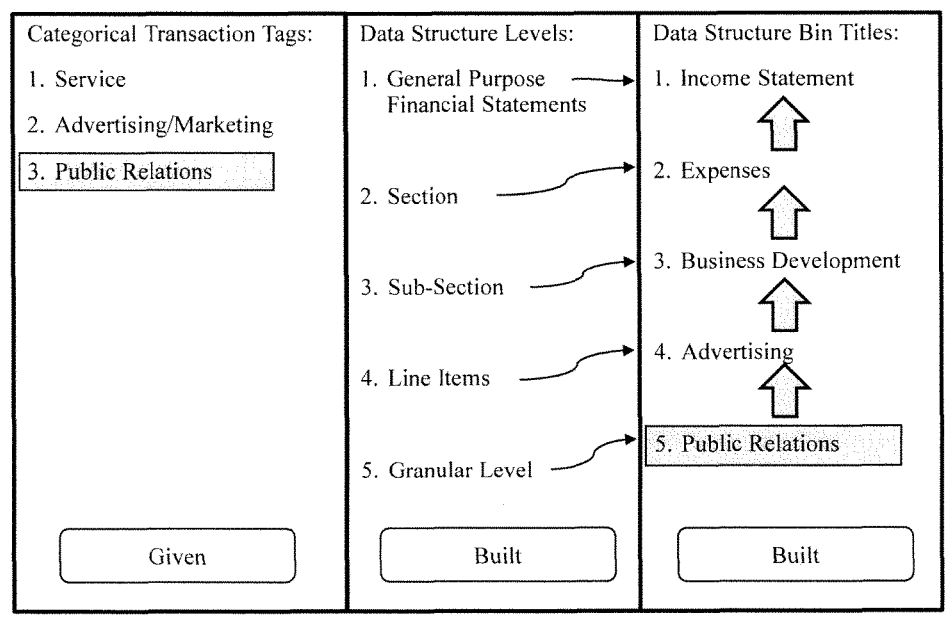
Figure 4, Inductive Data Structure Propagation – Part 2

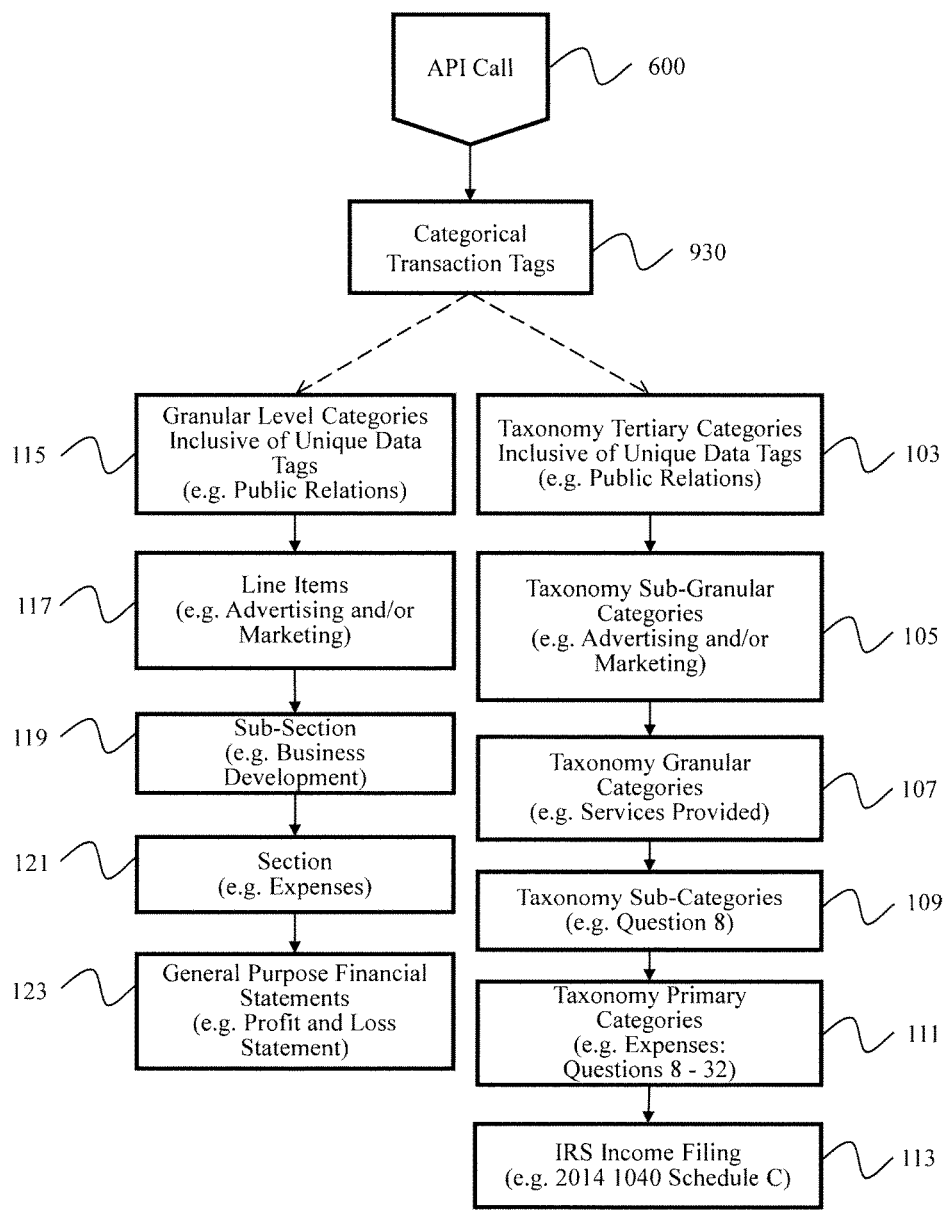
Figure 5, Backend Taxonomy: Business Accounting

Figure 6A, Category Example: Business Accounting Part 1

| Backend Taxonomy: Business Accounting – Advertising Expense | | | |
|---|---|---|---|
| Categorical Transaction Tags | | | |
| Categorical Transaction Tag Type | | Data Flow | Categorical Transaction Tag Value |
| Categorical Transaction Tags Pulled (931) | No Data Field Required | *Services* | Services (931) |
| Categorical Transaction Tags Pulled (932) | | Services: *Advertising and Marketing* | Advertising and/or Marketing (932) |
| Categorical Transaction Tag Applied (933) | | Services: Advertising and Marketing: *Public Relations* | Public Relations (933) |
| Data Structure 1: IRS Income Filing | | | |
| Data Structure Title | Data Bin Title | Data Flow | Unique Data Tags |
| Taxonomy Tertiary Category Inclusive of Unique Data Tags (103) | *Public Relations* | *Public Relations* | Public Relations |
| Taxonomy Sub-Granular Categories (105) | *Advertising and/or Marketing* | Public Relations: *Advertising and/or Marketing* | No Data Field Required |
| Taxonomy Granular Categories (107) | *Services Provided* | Public Relations: Advertising and/or Marketing: *Services Provided* | |
| Taxonomy Sub-Category (109) | *Question 8* | Public Relations: Advertising and/or Marketing: Services Provided: *Question 8* | |
| Taxonomy Primary Category (111) | *Expenses - Question eight through thirty-two* | Public Relations: Advertising and/or Marketing: Services Provided: Question 8: *Expenses - Question eight through thirty-two* | |
| IRS Income Filing (113) | *2014 1040 Schedule C* | Public Relations: Advertising and/or Marketing: Services Provided: Question 8: Expenses - Question eight through thirty-two: *2014 1040 Schedule* | |

Figure 6B, Category Example: Business Accounting Part 2

| Data Structure 2: General Purpose Financial Statements ||||
|---|---|---|---|
| Data Structure Title | Data Bin Title | Data Flow | Unique Data Tags |
| Granular Level Categories Inclusive of Unique Data Tags (115) | *Public Relations* | *Public Relations* | Public Relations |
| Line Items (117) | *Advertising and/or Marketing* | Public Relations: *Advertising and/or Marketing* | |
| Sub-Section (119) | *Business Development* | Public Relations: Advertising and/or Marketing: *Business Development* | |
| Section (121) | *Expenses* | Public Relations: Advertising and/or Marketing: Business Development: *Expenses* | No Data Field Required |
| General Purpose Financial Statements (123) | *Profit and Loss Statement* | Public Relations: Advertising and/or Marketing: Business Development: Expenses: *Profit and Loss Statement* | |

Figure 7, Relevant Portion of Exemplary Profit and Loss Statement

```
            Profit and Loss Statement Exemplary Sole Proprietorship (123)
                         For Year End December 31, 2014

Revenue (111)

Not Relevant for Given Example (113 – 117)              $XXX.XX

Total Revenue                                                      $XXX.XX

Expenses (111)
           Business Development (113)                              $YYY.YY
                       Advertising and Marketing (115)             $YYY.YY
                                   Public Relations (117)          $YYY.YY Total Expenses                                                     $YYY.YY Net Income (111)
           Not Relevant for Given Example (113 – 117)              $ZZZ.ZZ Total Net Income                                                   $ZZZ.ZZ Where Total Revenue = $XXX.XX; Total Expenses = $YYY.YY and Total Net
   Income is equal to Total Revenue – Total Expenses = Total Net Income where
                         Total Net Income = $ZZZ.ZZ
```

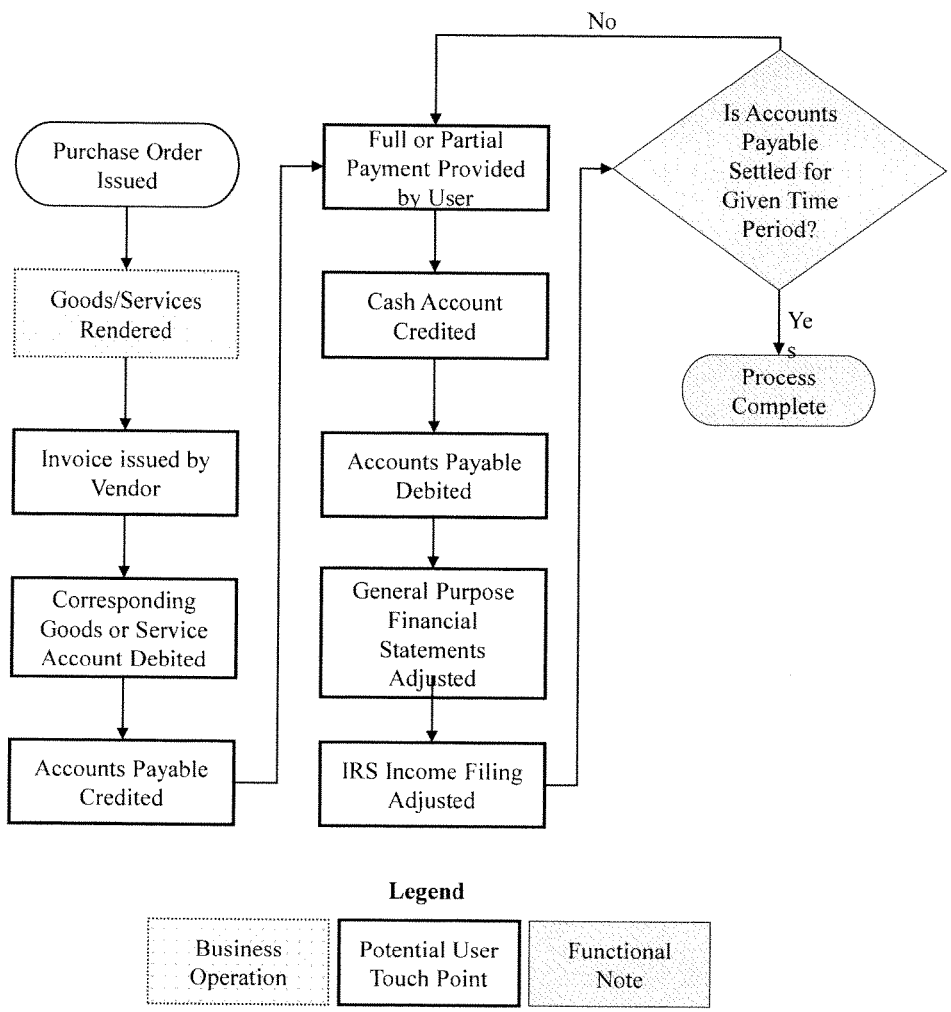

Figure 9, Recording and Settling Accounts Payable According to CITS

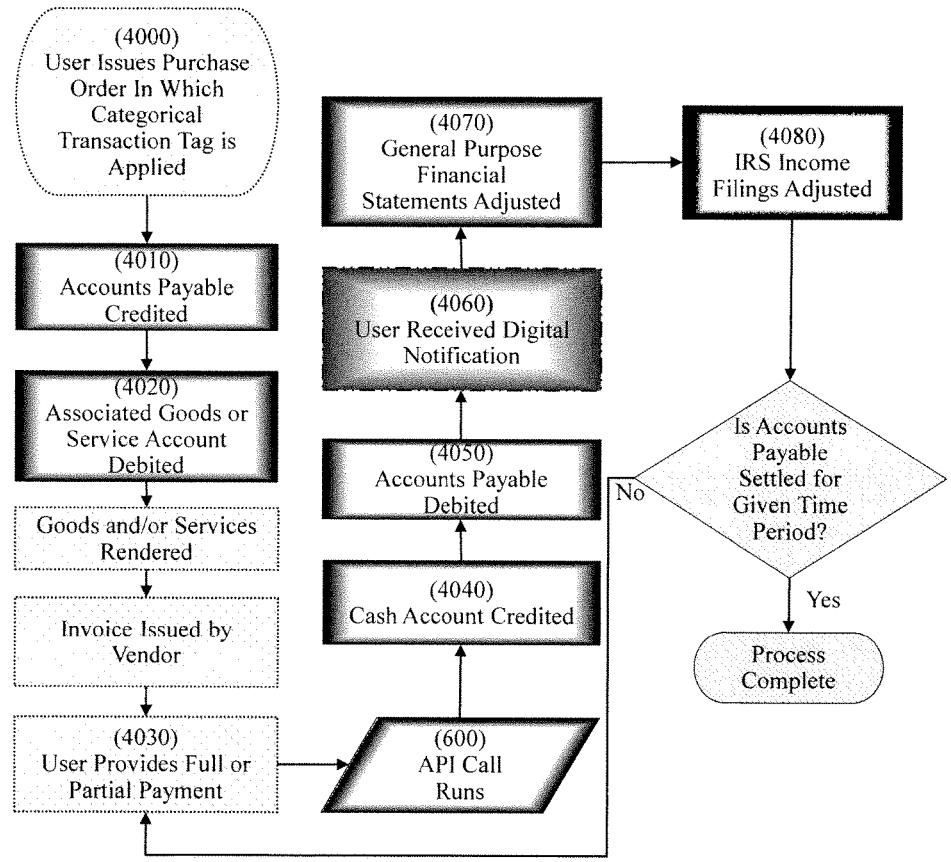

As almost all API Calls will include Vendor name, assigning a category is a secondary way of matching a credit in the accounts payable process with its associated debit. When the user receives the digital notification they may assign a vendor name if it was not pulled during the API Call. This Vendor List consists of all Vendors identified in API Calls and any additional vendors the user inputs.

Legend

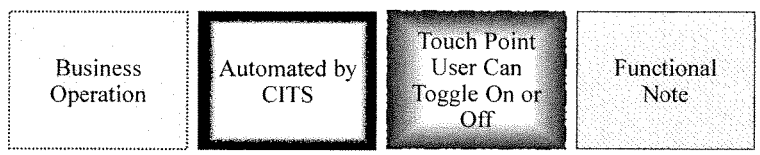

Figure 10, Recording Expenses According to Accrual Accounting
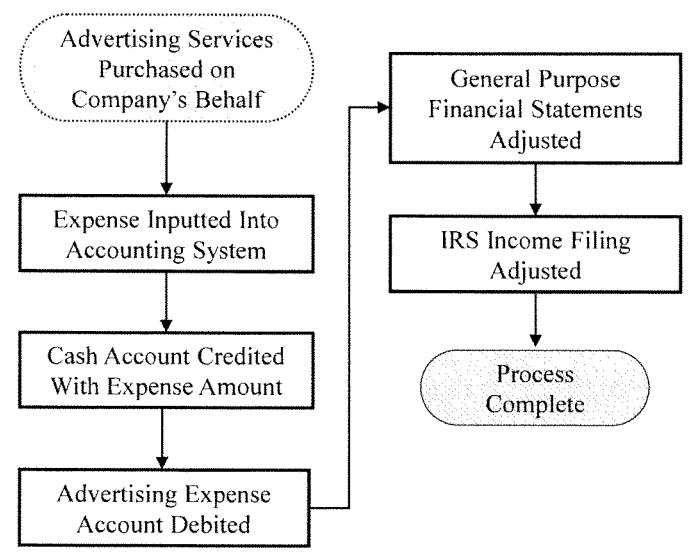
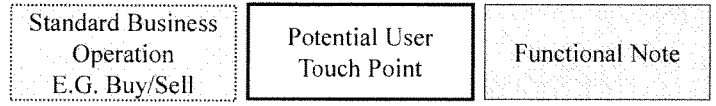

Figure 11, Recording Digital Expenses According to CITS
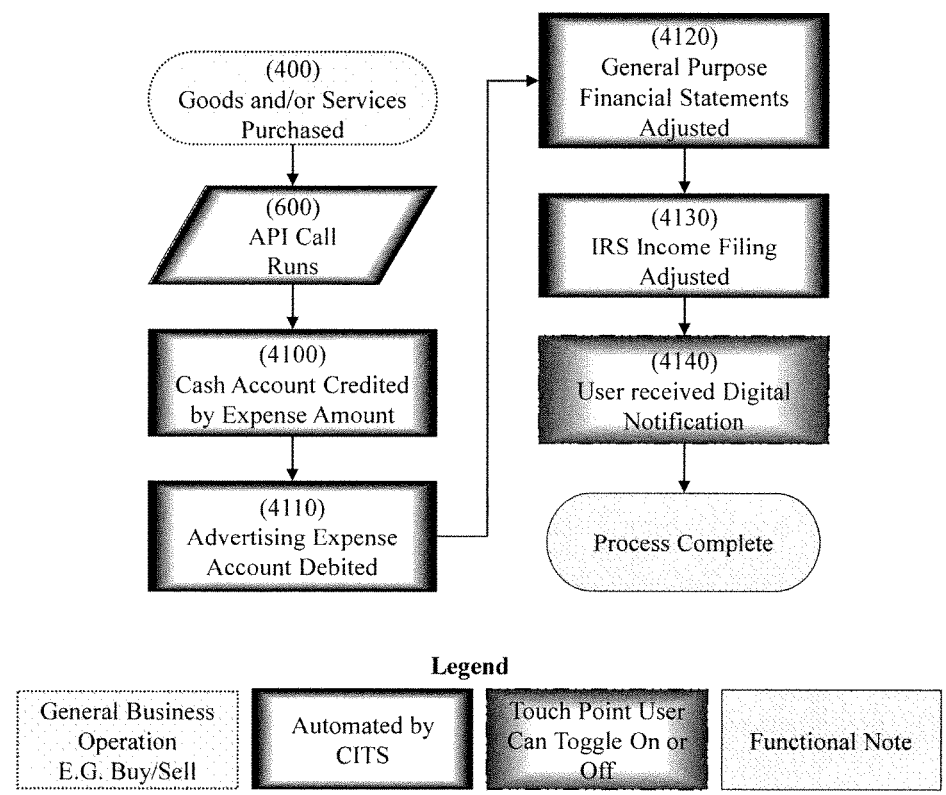

Figure 12, Recording Expenses Paid with Cash or Hand Written Check According to CITS
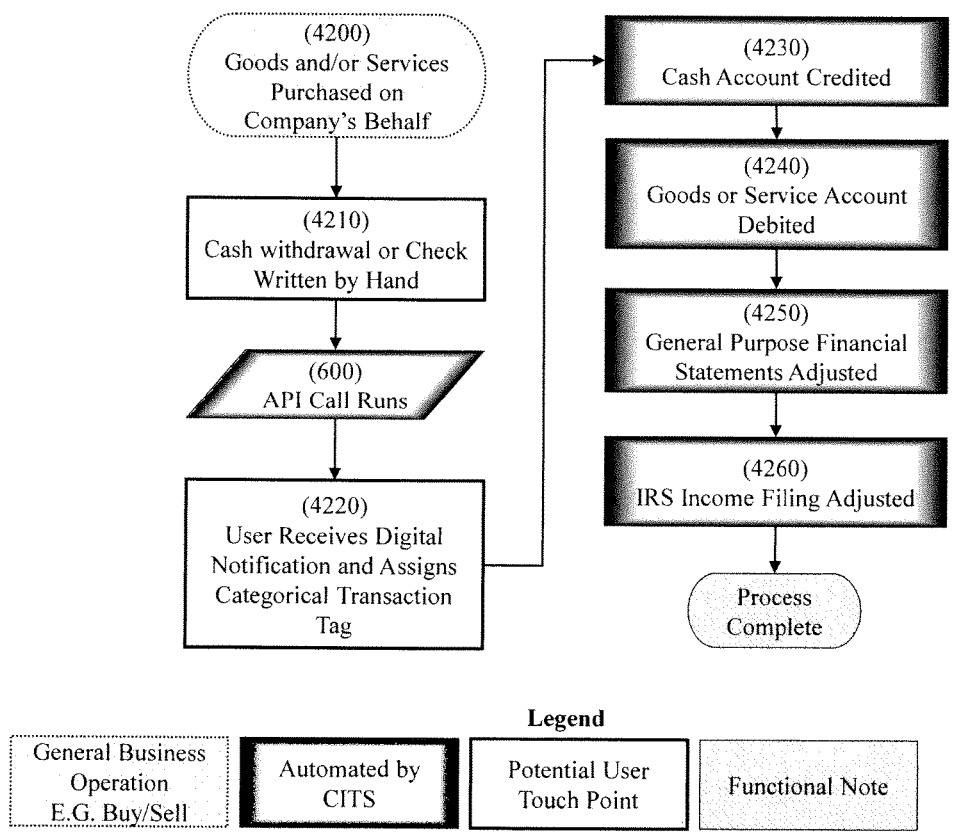

Figure 13, Check Transaction when Check Written in Native Accounting Software and Employee Reimbursement Procedure
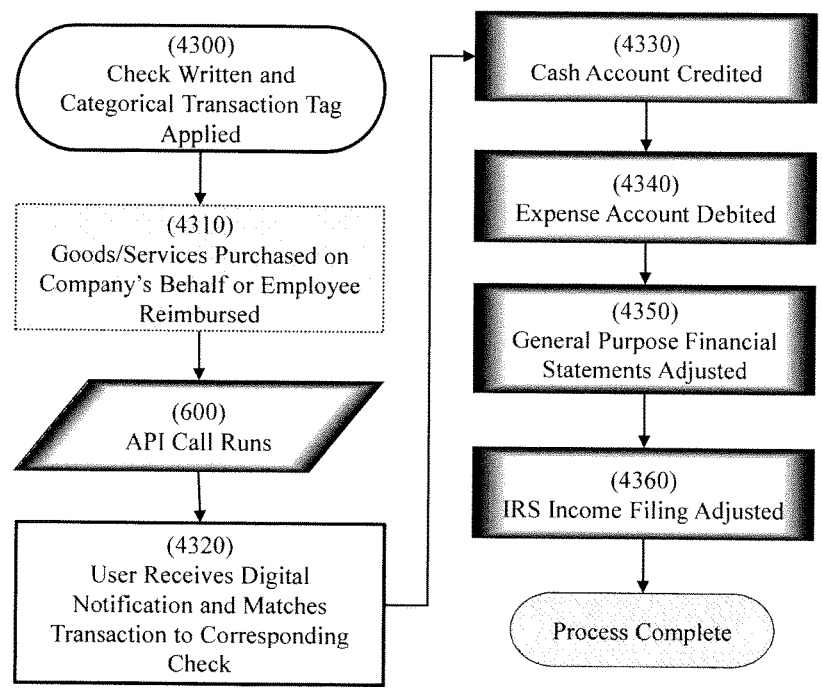
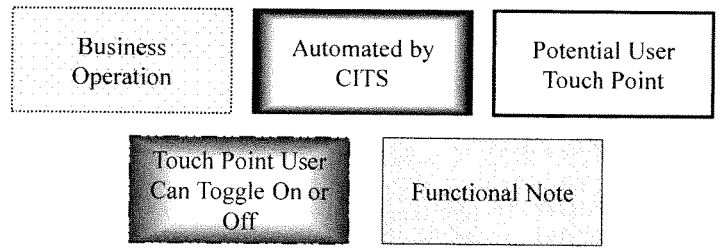

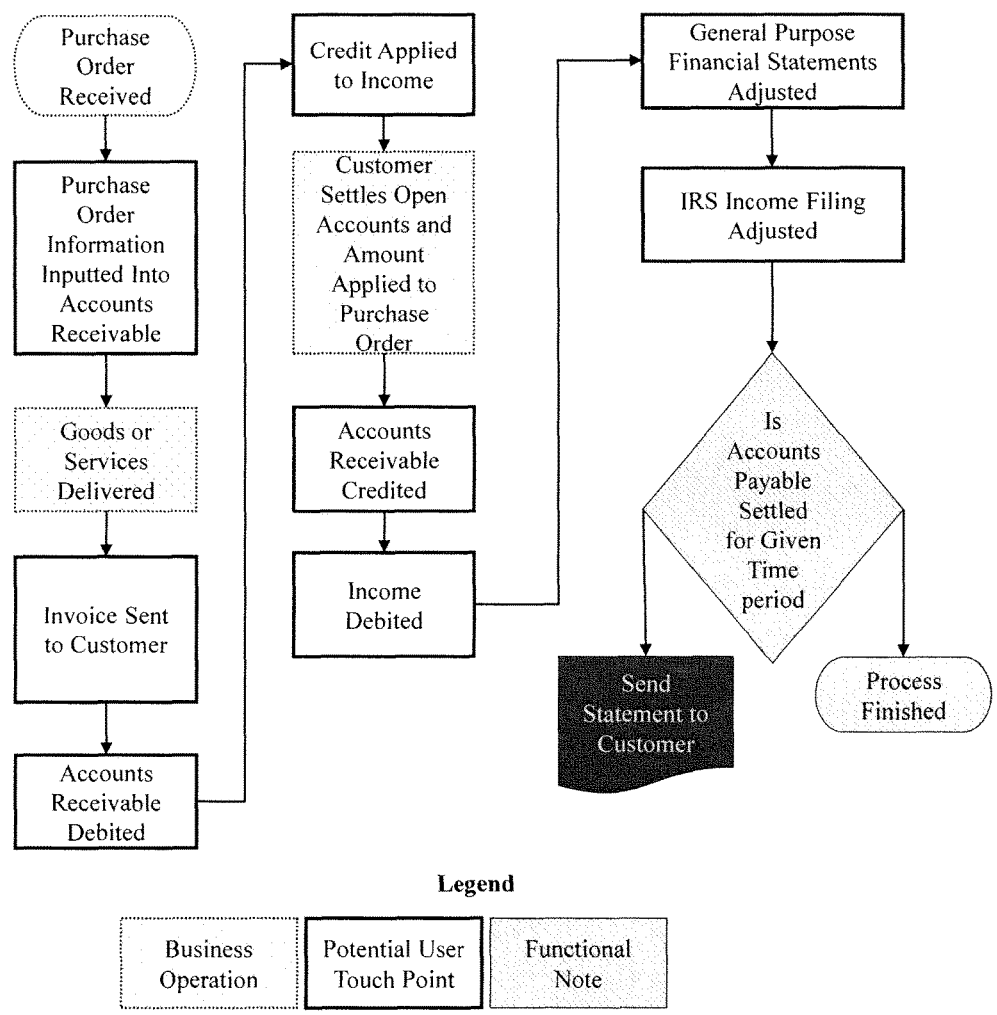
Figure 14, Recording and Settling Accounts Receivable According to Accrual Accounting Figure 15, Recording and Settling Accounts Receivable According to CITS
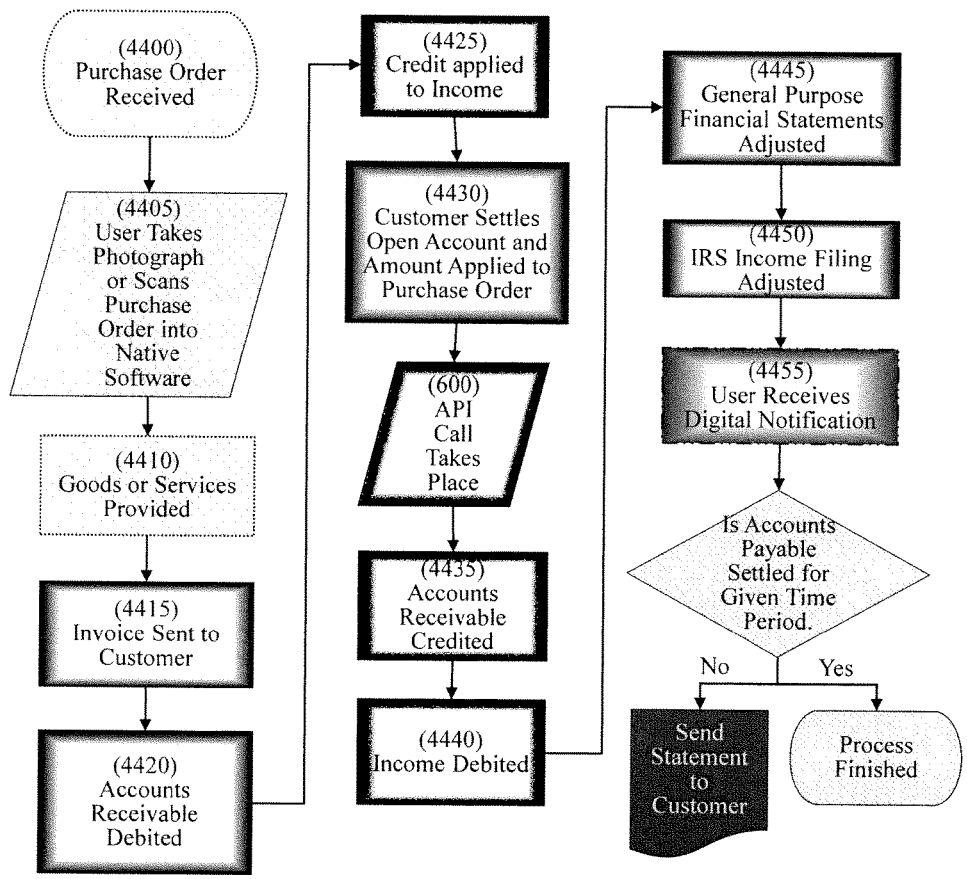
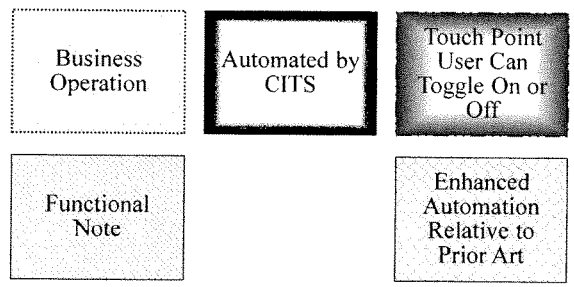

Figure 16, Recording Incomes According to Accrual Accounting
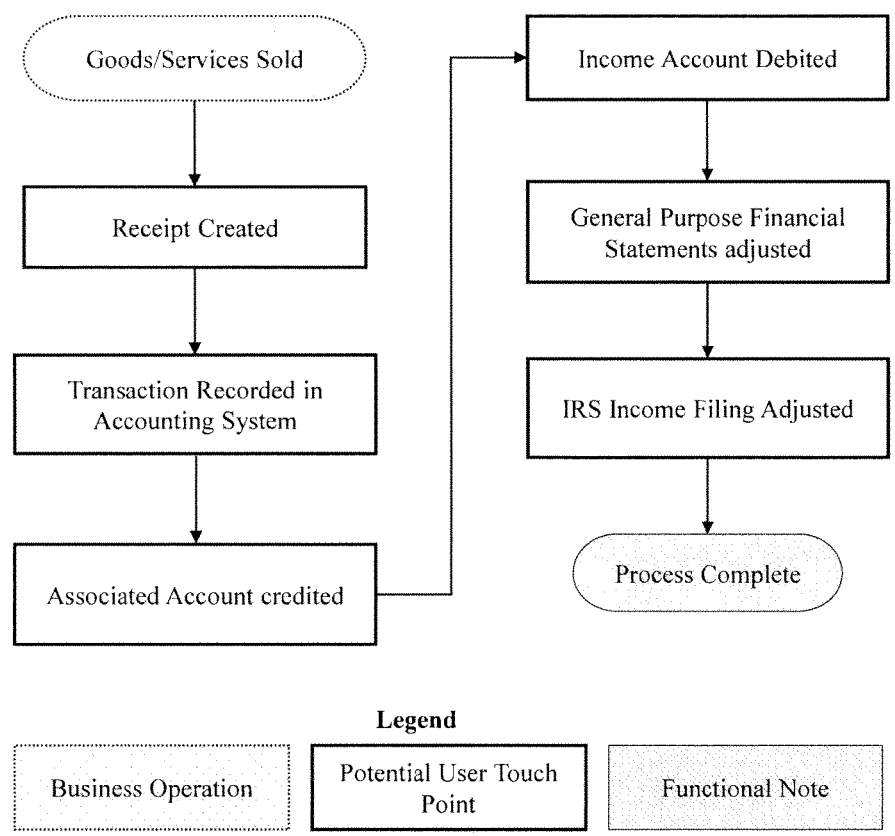

Figure 17, Recording Digital Income According to CITS
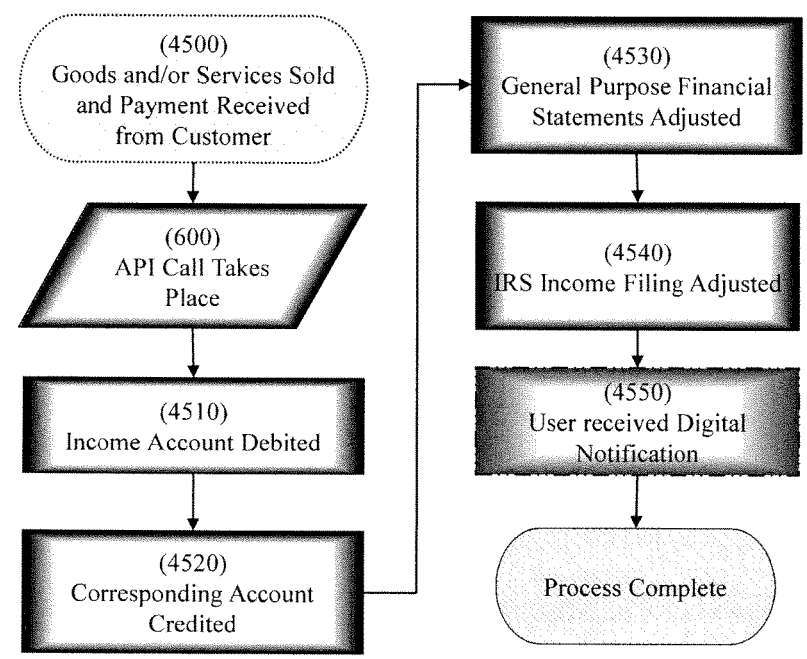
Legend
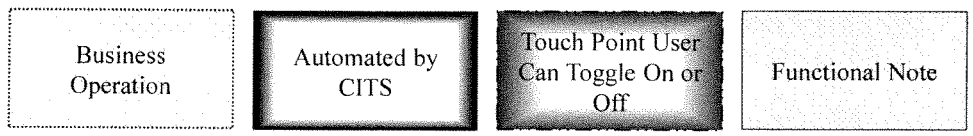

Figure 18, Recording Income Received via Cash or Check According to CITS
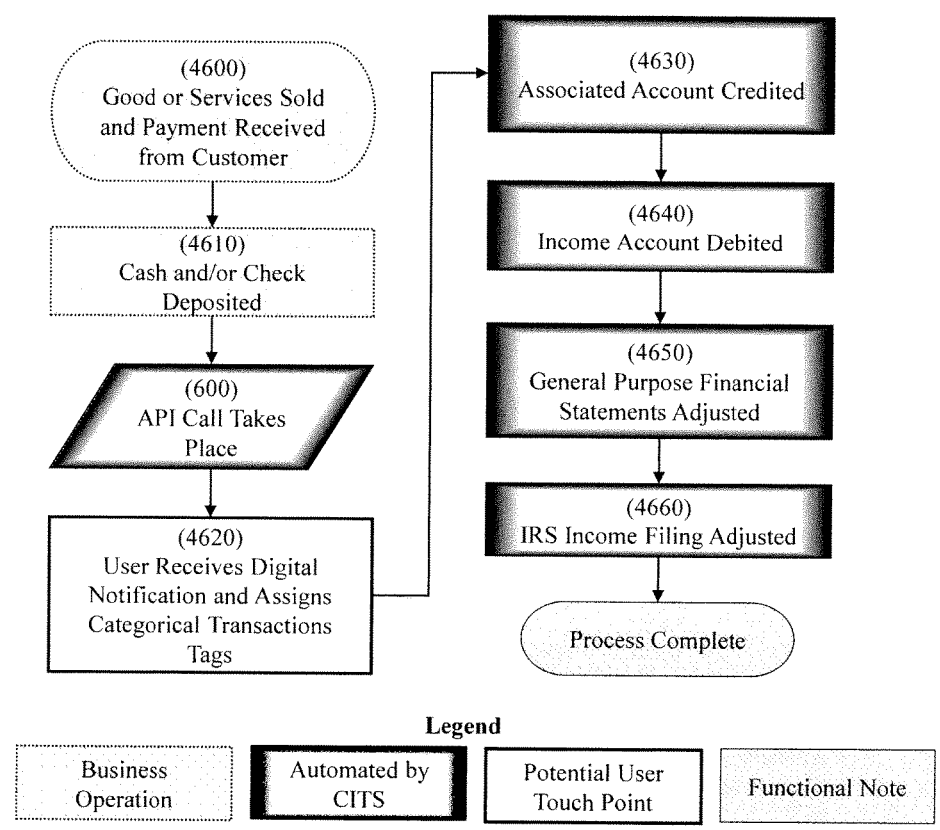

Figure 19, Reconciling According to Traditional Accounting Standards

| Reconciliation |
|---|
| Adjustments |
|     Deduct: Bank Service Charges |
|     Deduct: NSF Checks & Fees |
|     Add: Interest earned |
|     Add: Deposits in transit |
|     Add or Deduct: Bank errors |
|     Add or Deduct: Errors in company's cash account |
| True Balance per Bank |

Figure 20, Auto-Reconciling According to CITS
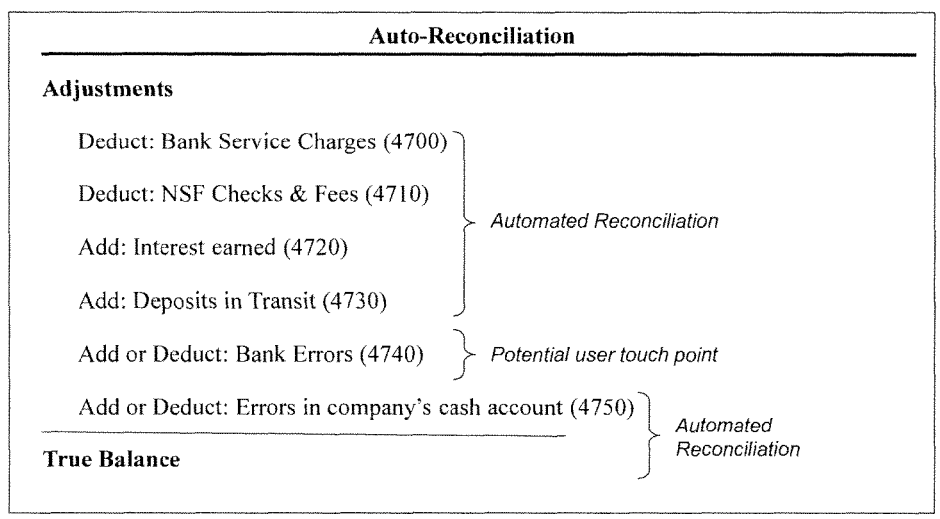

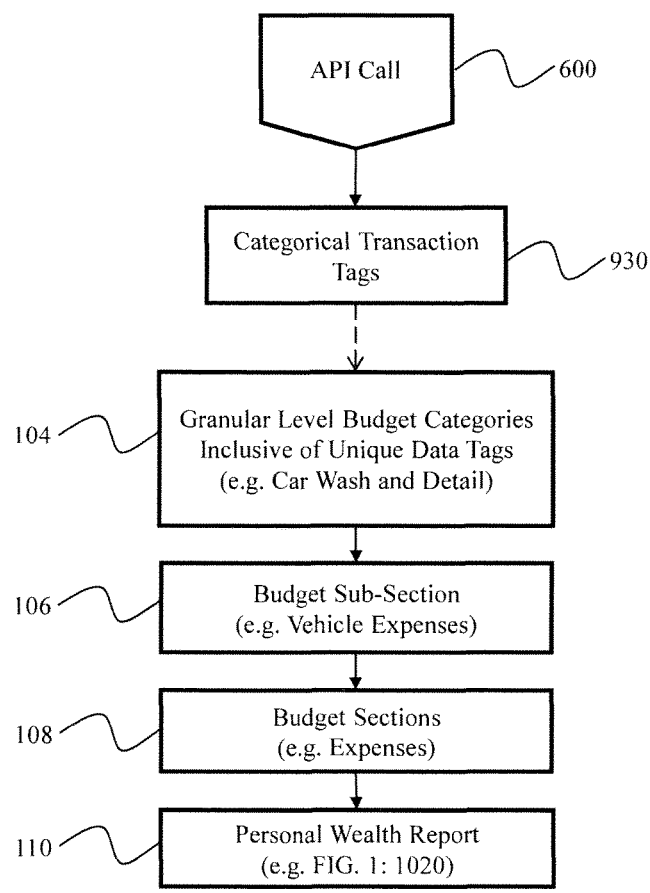
Figure 21, Backend Taxonomy: Retirement/Personal Wealth Management

Figure 22, Category Example: Personal Wealth Management

| Backend Taxonomy: Personal Wealth Management – Car Wash Expense | | | |
|---|---|---|---|
| Categorical Transaction Tags | | | |
| Categorical Transaction Tag Type | Data Flow | | Categorical Transaction Tag Value |
| Categorical Transaction Tags Pulled (934) | No Data Field Required | Services | Services (934) |
| Categorical Transaction Tags Pulled (935) | | Services: *Vehicle* | Vehicle (935) |
| Categorical Transaction Tag Applied (936) | | Services: Vehicle: *Car Wash and Detail* | Car Wash and Detail (936) |
| Data Structure and Data Flow: Car Wash Expense | | | |
| Data Structure Title | Data Bin Title | Data Flow | Unique Data Tags |
| Granular Level Budget Categories Inclusive of Unique Data Tags(104) | *Car Wash* | *Car Wash* | No Data Field Required |
| Budget Sub-Section (106) | *Vehicle Expenses* | Car Wash: *Vehicle Expenses* | |
| Budget Sections (108) | *Expenses* | Car Wash: Vehicle Expenses: *Expenses* | |
| Personal Wealth Report (110) | *Personal Wealth Report* | Car Wash: Vehicle Expenses: Expenses: *Personal Wealth Report* | Car Wash (936) |

Figure 23. Personal Wealth Report: Car Wash Expense

```
                    Personal Wealth Report
                For Month End December 31, 2015

Incomes
         Primary Income
         Interest Income
         Rent/Lease Income
         Misc. Income
Total Income                              $WWW.WW Expenses
         Mortgage Expenses
         Insurance Expenses
         Vehicle Expenses
                  Car Wash
Total Expenses                            $XXX.XX Net Income                                $YYY.YY Existing Savings
Total Savings                             $ZZZ.ZZ Target Savings Progress
         General Savings                  AA%
         Vacation Fund                    BB%
Total Target Savings Progress             CC%

Where Total Revenue = $XXX.XX; Total Expenses = $YYY.YY and Total Net
   Income is equal to Total Revenue – Total Expenses = Total Net Income where
                     Total Net Income = $ZZZ.ZZ
```

Figure 24, Backend Taxonomy: Non-Community Spending Report
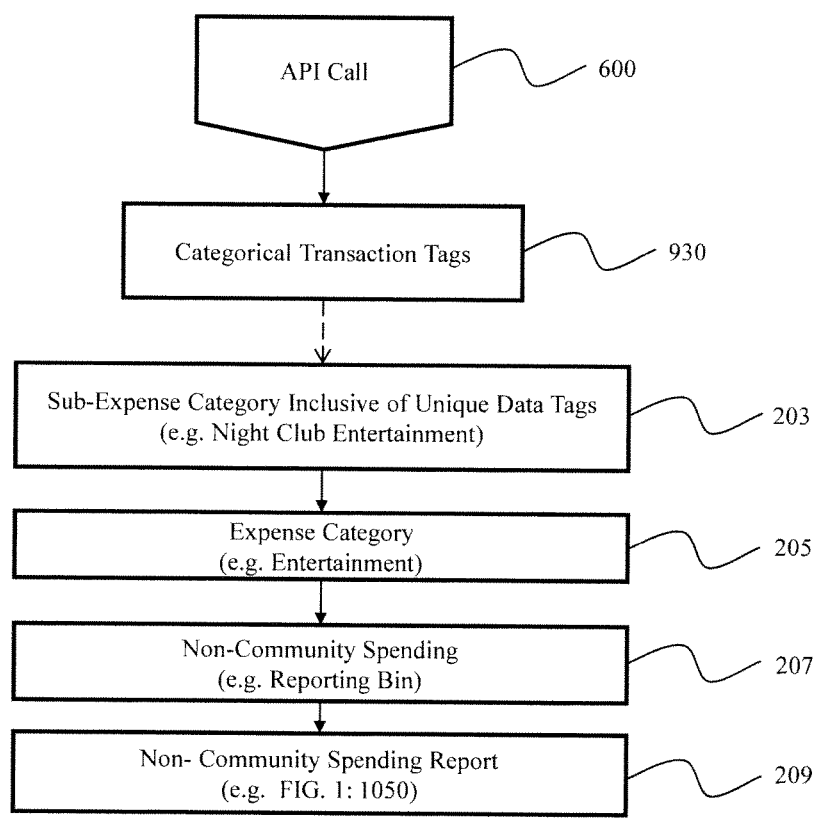

Figure 25, Category Example: Non-Community Spending Report

| Backend Taxonomy: Family Court: Night Club Expense ||||
|---|---|---|---|
| Categorical Transaction Tags ||||
| Categorical Transaction Tag Type | | Data Flow | Categorical Transaction Tag Value |
| Categorical Transaction Tags Pulled (937) | No Data Field Required | *Entertainment* | Entertainment (937) |
| Categorical Transaction Tags Pulled (938) | | Services: *Nightlife* | Nightlife (938) |
| Categorical Transaction Tag Applied (939) | | Services: Entertainment: *Night Clubs* | Night Clubs (939) |
| Data Structure and Data Flow: Night Club Expense ||||
| Data Structure Title | Data Bin Title | Data Flow | Unique Data Tags |
| Sub-Expense Category Inclusive of Unique Data Tags (203) | *Night Clubs* | *Night Clubs* | No Data Field Required |
| Expense Category (205) | *Entertainment* | Night Clubs: *Entertainment* | |
| Non-Community Spending (207) | *Non-Community Expense* | Night Clubs: Entertainment: *Non-Community Expense* | |
| Community Spending Report (209) | *Non-Community Spending Report* | Night Clubs: Entertainment: Non-Community Expense: *Non-Community Spending Report* | Night Clubs (939) |

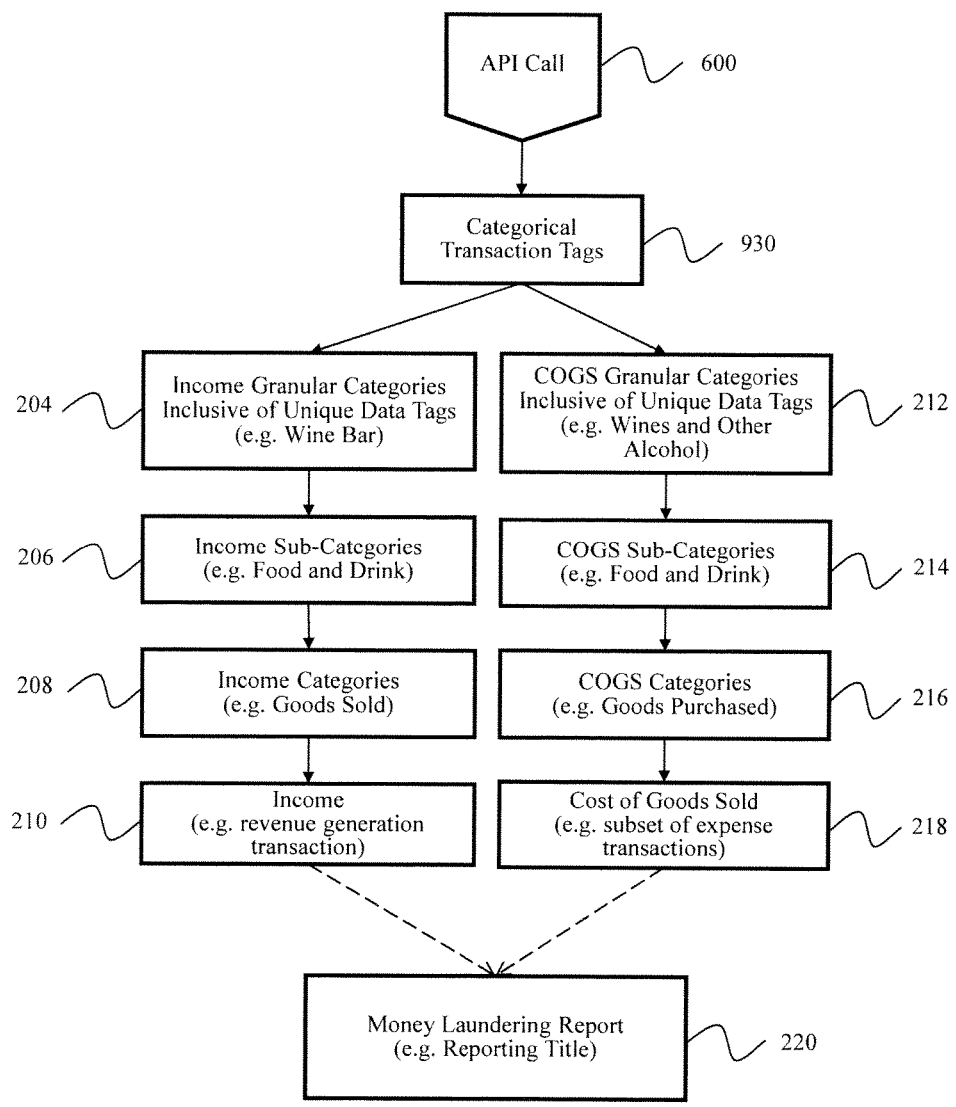
Figure 26, Backend Taxonomy: Money Laundering Report

Figure 27, Category Example: Money Laundering Investigation – Wine Bar Income

| Backend Taxonomy: Money Laundering Investigation: Wine Bar income ||||
|---|---|---|---|
| Categorical Transaction Tags ||||
| Categorical Transaction Tag Type | | Data Flow | Categorical Transaction Tag Value |
| Categorical Transaction Tags Pulled (940) | No Data Field Required | *Goods Sold* | Goods Sold (940) |
| Categorical Transaction Tags Pulled (941) | | Goods Sold: *Food and Drink* | Food and Drink (941) |
| Categorical Transaction Tag Applied (942) | | Goods Sold: Food and Drink: *Wine Bar* | Wine Bar (942) |
| Data Structure and Data Flow: Wine Bar Income ||||
| Data Structure Title | Data Bin Title | Data Flow | Unique Data Tags |
| Income Granular Categories Inclusive of Unique Data Tags (204) | *Wine Bar* | *Wine Bar* | No Data Field Required |
| Income Sub-Categories (206) | *Food and Drink* | Wine Bar: *Food and Drink* | |
| Income Categories (208) | *Goods Sold* | Wine Bar: Food and Drink: *Goods Sold* | |
| Income (210) | *Income* | Wine Bar: Food and Drink: Goods Sold: *Income* | |
| Money Laundering Report (220) | *Money Laundering Report* | Wine Bar: Food and Drink: Goods Sold: Income: *Money Laundering Report* | Wine Bar (942) |

Figure 28, Category Example: Money Laundering Investigation – Wine and Other Alcohol Cost of Goods Sold

| Backend Taxonomy: Money Laundering Investigation: Wine and Other Alcohol cost of goods sold ||||
|---|---|---|---|
| Categorical Transaction Tags ||||
| Categorical Transaction Tag Type | | Data Flow | Categorical Transaction Tags Value |
| Categorical Transaction Tags Pulled (943) | No Data Field Required | Goods Purchased | Goods Purchased (943) |
| Categorical Transaction Tags Pulled (944) | | Goods Purchased: *Food and Drink* | Food and Drink (944) |
| Categorical Transaction Tag Applied (945) | | Goods Purchased: Food and Drink: *Wine and Other Alcohol* | Wine and Other Alcohol (945) |
| Data Structure and Data Flow: Wine and Other Alcohol Cost of Goods Sold ||||
| Data Structure Title | Data Bin Title | Data Flow | Unique Data Tags |
| COGS Granular Categories Inclusive of Unique Data Tags (212) | *Wine and Other Alcohol* | *Wine and Other Alcohol* | No Data Field Required |
| COGS Sub-Categories (214) | *Food and Drink* | Wine and Other Alcohol: *Food and Drink* | |
| COGS Categories (216) | *Goods Purchased* | Wine and Other Alcohol: Food and Drink: *Goods Purchased* | |
| Cost of Goods Sold (218) | *Cost of Goods Sold* | Wine and Other Alcohol: Food and Drink: Goods Purchased: *Cost of Goods Sold* | |
| Money Laundering Report (220) | *Money Laundering Report* | Wine and Other Alcohol: Food and Drink: Goods Purchased: Cost of Goods Sold: *Money Laundering Report* | Wine and Other Alcohol (945) |

Figure 29, Backend Taxonomy: IRS Analysis Report
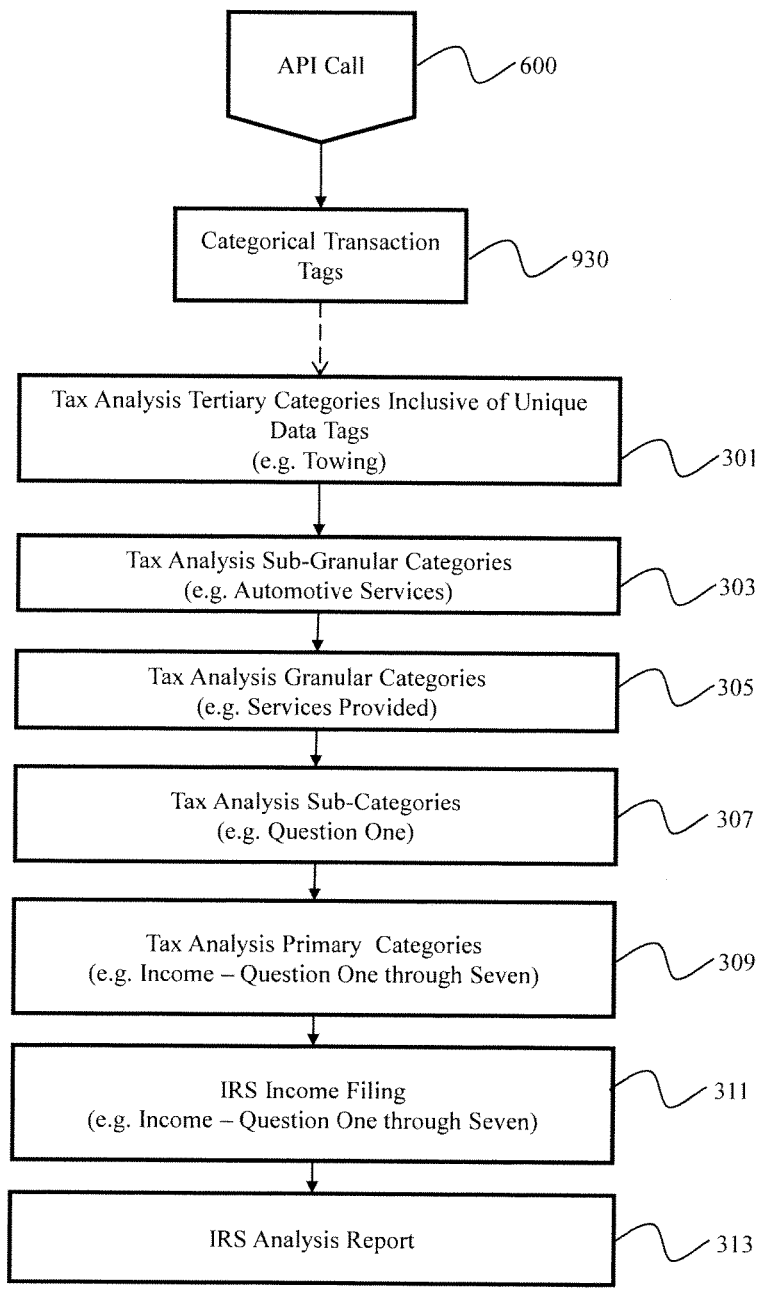

Figure 30, Category Example: IRS Performed Tax Analysis

| Backend Taxonomy: IRS Tax Analysis: Income Generating Transaction for Towing ||||
|---|---|---|---|
| Categorical Transaction Tags ||||
| Categorical Transaction Tag Type | | Data Flow | Categorical Transaction Tag Value |
| Categorical Transaction Tags Pulled (946) | No Data Field Required | *Services Provided* | Services Provided (946) |
| Categorical Transaction Tags Pulled (947) | | Services Provided: *Automotive Services* | Automotive Services (947) |
| Categorical Transaction Tag Applied (948) | | Services Provided: Automotive Services: *Towing* | Towing (948) |
| Data Structure and Data Flow: Income Transaction for Towing ||||
| Data Structure Title | Data Bin Title | Data Flow | Unique Data Tags |
| Tax Analysis Tertiary Category Inclusive of Unique Data Tag (301) | Towing | *Towing* | |
| Tax Analysis Sub-Granular Category (303) | Automotive Services | Towing: *Automotive Services* | |
| Tax Analysis Granular Category (305) | Services Provided | Towing: Automotive Services: *Services Provided* | |
| Tax Analysis Sub-Category (307) | Question One | Towing: Automotive Services: Services Provided: *Question One* | |
| Tax Analysis Primary Category (309) | Income – Questions One through Seven | Towing: Automotive Services: Services Provided: Question One: *Income – Questions One through Seven* | No Data Field Required |
| IRS Income Filing (311) | 2014 1040 Schedule C | Towing: Automotive Services: Services Provided: Question One: Income – Questions One through Seven: *2014 1040 Schedule C* | |
| IRS Analysis Report (313) | IRS Analysis Report | Towing: Automotive Services: Services Provided: Question One: Income – Questions One through Seven: 2014 1040 Schedule C: *IRS Analysis Report* | Towing (948) |

To FIG. 31B

CATEGORICALLY INDUCTIVE TAXONOMY SYSTEM, PROGRAM PRODUCT AND METHOD

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern information technology has allowed for an unprecedented level of data collection and analysis. This has catalyzed substantial developments in the private and public sectors; specifically, the proliferation of Big Data and/or increasingly larger data sets has allowed for the sophistication of predictive analytics, interaction with customers, risk analysis and sustainable urban planning. However, acquiring this data and performing adequate analysis is often extremely costly and necessitates advanced infrastructure and highly skilled experts. Additionally, despite the great effort afforded to Big Data, it can often be plagued with human generated errors originating from inaccurately recording data or recording it inconsistently as well as faulty assumptions of correlation which can lead to inaccurate analysis of inputted data.

A prominent source of inaccuracy in modern information originates from the human and computer data entry process. Specifically, it has been found that approximately 7.4% of all clerical and financial data entered into computer systems is done so erroneously. Additionally, this issue is further compounded as human performed data entry often lacks consistency and homogeneity. Specifically, those performing data entry often record the same or similar data points in dissimilar ways. For example, this can occur when two employees performing data entry record a client's name differently; such as, first name followed by last name verse last name followed by first name. This can translate to a significant disadvantage when making decisions based on data which at some point was entered into a system via human performed data entry.

Similarly, another source of these inaccuracies arises when machines and/or computers are used to read, record, calculate and/or transpose data and figures into a corresponding program or computer system. The nature of these errors arise as machines and computers must be designed and maintained by human engineers or scientists who are themselves prone to error. In the event that the coding or designing assumptions are flawed, an inaccurate program could be created which could lead to the contamination of data and subsequently, create incorrect information. As computers and machines can conduct simple data entry and calculations at extremely fast rates, huge sets of data could be incorrectly recorded and if not appropriately stored or backed up, valuable and perhaps irreplaceable, data could be lost or damaged beyond repair. Similarly, interpreters of data can engage in faulty assumptions of correlation which can lead to the incorrect interpretation of analyzed data. Specifically, these errors occur when a corollary relationship existing between data points or sets is mistaken as an implication of causation between said data points or sets. Errors of this type can result in a multitude of analysis issues such as an insufficient understanding of the true relationship between two or more sets of data or a misunderstanding of the cause and effect between two or more variables.

Additionally, computers and machines as they are presently commercially available often lack the ability to solve even simple problems which require critical thinking or ingenuity. An example would be a computer program designed to input accounting expenses into the general ledger and one of the expenses to be inputted is actually a cost of goods sold. A human inputting this data, with even an elementary understanding of accounting, would identify this error and remedy it. As such, even the most automated computer generated data entry can lead to substantial error when the data being supplied is not entirely free of potential problems which might require critical thinking or ingenuity to solve, such as how to handle mislabeled files.

In speaking to the errors generated by human performed data entry, one solution is to reduce the error rate and inconsistencies associated with data entry by training employees in data entry best practices. However, employee training can often be a costly course of action which does not yield long term benefits for the company. Specifically, individuals who receive training become more highly skilled and are therefore more competitive in the job market. As such, they may find alternate employment with higher pay or other advantages like an office location closer to their home. Ultimately, training is often a disadvantageous option when searching for solutions to lower the error rate and increase consistency or homogeneity of human generated data entry.

In speaking to the errors generated by computers or machines during automated data entry, a solution exists. According to many skilled in the art, improving the accuracy of data entry can be accomplished by limiting human interaction and dependence in this process. As such, machines or computers should be used to read, record, calculate and/or transpose data and figures into appropriate fields which leads to the creation of information. However, if the data entry or analysis program is designed with faulty assumptions, coding errors or data organization which requires critical thinking, the data entry and subsequent information created cannot be treated as correct.

The nature of these two solutions shows an interdependency of failure which impacts the public and private sectors. Human performed data entry and analysis design is often times inaccurate above acceptable error rates due to inaccurate or inconsistent data entry while machines and/or computers cannot solve even basic problems which often arise during data entry. As such, the inventors has determined that the most optimal way to solve this problem is by designing an electronic system to address this granular data entry problem.

The following description is presented to enable any person skilled in the art to make and use the invention, and is provided in the context of several particular applications and their requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Additional objects and advantages of the disclosed embodiments will be set forth in the description which follows, and in part will be obvious from the description, or may be learned from the practice of the disclosed embodiments.

SUMMARY OF THE INVENTION

In embodiments, a method may comprise: retrieving or having retrieved, by one or more computers, financial transaction data for a financial transaction for an entity; receiving or obtaining or having obtained, by the one or more computers, for the financial transaction, a plurality of categorical transaction tags categorizing the financial transaction, and one or more items of financial transaction data selected from the group of transaction amount, account balance, account names, pending status, location, meta score, and geo-coordinates; accessing, by the one or more computers, a taxonomy associated with the entity, wherein the taxonomy comprises a plurality of data structures that are vertical and/or flat, with each of the respective data structures having a progression inductively backwards to an upper level in the data structure, wherein each of the plurality of the data structures comprises a most granular element at a lower level, wherein the taxonomy is based on populating a report desired by a user, and wherein each of the data structures contains a level that references at least one location in the report to be populated; determining, by the one or more computers, an identification code for the financial transaction based at least in part on the plurality of categorical transaction tags, wherein the identification code references a particular one of the data structures in the taxonomy, where the particular one of the data structures comprises a corresponding unique data tag associated with a given level in the particular data structure; selecting, by the one or more computers, one from the plurality of the categorical transaction tags as the most granular element; assigning, by the one or more computers, the unique data tag associated with the given level in the particular data structure to the one categorical transaction tag selected as the most granular element for the financial transaction; organizing, by the one more computers, the financial transaction data based at least in part on the one categorical transaction tag, using one or more algorithms to identify, parse and transform the financial transaction data for use in logical functions that may comprise but not be limited to one selected from the group of inductive data structure propagation, accounting operations, and report creation; executing, by the one or more computers, an inductive algorithm using the one data structure to propagate from the most granular element in the lower level to a higher level in the one data structure via one or more fixed relationships between each level of the one data structure where the fixed relationships are determined according to the unique data tag and the one categorical transaction tag assigned to the transaction, where the fixed relationships are based on inductive propagation; determining, by the one or more computers, the at least one location in the report to be populated based at least in part on results from executing the inductive algorithm; populating or revising the report, by the one or more computers, with data from the financial transaction based at least in part on the at least one location in the report to be populated; and transmitting, by the one or more computers, the report to the user after one or more locations in the report have been populated.

In embodiments of the method, one from the plurality of the categorical transaction tags as the most granular element may be based at least in part on the identification code.

In embodiments of the method, the retrieving step may be via an API call, where the API call includes access credentials to obtain and/or receive the financial transaction data of the entity, and where the API call is designed to categorize the financial transaction data with a plurality of categorical transaction tags.

In embodiments, the method may further comprise: transmitting, by the one or more computers, a notification that a particular one of the locations in the report has been populated with the transaction data, wherein the notification comprises an electronic element for indicating approval or a correction of the populated transaction data at the particular location in the report. In embodiments, of the method the electronic element may comprise an electronic ability to select from a drop-down menu comprising at least one selected from the group of re-categorizing and deleting.

In embodiments of the method, there may be a plurality of taxonomies, and the method may further comprise: executing, by the one or more computers, the operation steps of claim 1 for each of the plurality of taxonomies associated with the entity in order to populate a plurality of reports.

In embodiments of the method, the report may be an accounts payable statement, and the method may further comprise: triggering, by the one or more computers, initiation of a payment based at least in part on the transmission of the report where the payment method is an automated clearing house payment which may be initiated by multi-factor authentication which can be question based, code based, or selection based such that the routing number, and other account identifiers, are stored in a derivative table and accessed via a globally unique access token.

In embodiments of the method, the report may be an accounts receivable report, and the method may further comprise: scanning or inputting a purchase order, by the one or more computers, by employing optical character recognition; and inputting some or all of the information present on the purchase order into a native accounting software for accounts receivable to populate the accounts receivable report.

In embodiments of the method, the report may be a financial statement. In embodiments of the method, the report may be an internal revenue form.

In embodiments, the method may further comprise: executing an API call, by the one or more computers, to retrieve, at least one transaction which has not been previously recorded and to parse a plurality of data points retrieved with that transaction; and store for later use, by the one or more computers, the data points associated with the transaction in a derivative table using globally unique transaction identification codes.

In embodiments, the method may further comprise: organizing, by the one or more computers, the financial transaction data according to a discrete histogram; determining, by the one or more computers, a transactional frequency at which financial transactions for the entity occur; and creating, by the one or more computers, a schedule to execute the API call based at least in part on the transactional frequency of the entity.

In embodiments, the method may further comprise: retrieving a plurality of financial transactions including at least one financial transaction which has not been previously recorded; queuing, by the one or more computers, the plurality of financial transactions; storing, by the one or more computers, the financial transaction data for each of the financial transactions in tables with globally unique transaction identification codes; and executing, by the one or more computers, one or more accounting operations.

In embodiments, the method may further comprise: retrieving, a plurality of financial transactions including at least one financial transaction which has not been previously recorded by configuring a retrieval algorithm, to obtain, when executed, historical transaction data relating to at least one selected from the group of a checking account, a savings account, and a credit account, a mortgage account, a brokerage account, a loan account, or another account; and performing, by the one or more computers, the steps of the method on the historical transaction data; and performing, by the one or more computers, one or more accounting operations.

In embodiments, the method may further comprise: retrieving, when executed, via an API call, an actual balance in an account and a current balance for the account after pending transaction amounts clear for one selected from the group of a checking account, a savings account, and a credit account; populating, by the one or more computers, the actual balance and the current balance into respective locations in the report; and sending, by the one or more computers, via an electronic network, an electronic notification that a particular one of the locations in the report has been populated with the actual balance and the current balance, wherein the notification comprises an electronic element.

In embodiments of the method the financial transaction data may comprise a transaction amount, an account balance, account names, and pending status, and the method may further comprise queuing, by the one or more computers, a plurality of the financial transactions, and parsing the financial transaction data for each of the financial transactions into a table; calculating a new transaction amount, by one or more computers, using one or more transaction amounts in the financial transaction data for at least one location in the report; propagating, by the one or more computers, the new amount calculated throughout higher levels of the one data structure; populating or revising the report, by the one or more computers, with the new amount based at least in part on the at least one location in the report to be populated; and transmitting, by the one or more computers, the report to the user after one or more locations in the report have been populated.

In embodiments of the method, the financial transaction data may be for an expense transaction for which payment was provided digitally, and the method may further comprise subtracting, by the one or more computers, the transaction amount from the account balance; and summing, by the one or more computers, the transaction amount with an amount from the most granular element of the lower element of the one data structure.

In embodiments of the method, the financial transaction data may be for an expense transaction for which payment was provided as cash or check, and the method may further comprise receiving, by the one or more computers, an assignment from the entity, by the one or more computers, of one or more categorical transaction tags; subtracting, by the one or more computers, the transaction amount from the account balance; and summing, by the one or more computers, the transaction amount with the most granular element of the lowest level of the one data structure.

In embodiments of the method, the financial transaction data may be for an income transaction for which payment was provided digitally, and the method may further comprise summing, by the one or more computers, the transaction amount with the account balance; and subtracting, by the one or more computers, the transaction amount from the most granular element of the lowest level of the one data structure.

In embodiments of the method, the financial transaction data may be for an income transaction for which payment was provided as cash or check, and the method may further comprise receiving, by the one or more computers, an assignment from the entity, by the one or more computers, of one or more categorical transaction tags; summing, by the one or more computers, the transaction amount for the income transaction with the account balance; and subtracting, by the one or more computers, the transaction amount from the most granular element of the lowest level of the data structure.

In embodiments of the method, one or more items of financial transaction data may be selected, and the method may further comprise: receiving, by the one or more computers, an assignment from the entity of a remediation amount to remediate a bank error; re-calculating a new amount, by one or more computers, using the remediation amount for at least one location in the report; re-propagating, by one or more computers, the new amount throughout higher levels of the one data structure.

In embodiments of the method, there may be a plurality of financial transactions, and the method may further comprise: placing, by the one or more computers, the plurality of financial transactions into a queue; and running, by the one or more computers, the method on each of the financial transactions in the queue in an order.

In embodiments of the method, the report may be a Personal Wealth Report, and the financial transaction data may comprise multiple of the categorical transaction tags categorizing the financial transaction, an available balance of an account and/or a current balance of the account, and one or more items of financial transaction data selected from the group of transaction amount, account names, pending status, location, meta data, meta score, and geo-coordinates, and the method may further comprise: calculating, by the one or more computers, an existing savings amount in an account based at least in part on the available balance of the account and/or the current balance of the account; and executing, by the one or more computers, a ratio analysis between a target savings amount and the existing savings amount.

In embodiments of the method, the report may be a Non-Community Spending Report.

In embodiments of the method, the report may be a Money Laundering Report, and the financial transaction data may comprise one or more income items from income garnering financial transactions for calculating an income amount, and a plurality of cost items for calculating a cost of goods sold, and the method may further comprise: calculating, by the one or more computers, the income amount based at least in part on the one or more income items, and calculating the cost of goods sold based at least in part on the plurality of cost items; and executing, by the one or more computers, a ratio analysis between the income amount and the cost of goods sold.

In embodiments of the method, the report may be an IRS Analysis Report, and the financial transaction data may comprise a provided IRS answer amount for an IRS filing question and a plurality of transaction amounts used for obtaining the provided IRS answer amount, and the method may further comprise: re-calculating, by the one or more computers, a summation of the plurality of transaction amounts used for obtaining the provided IRS answer amount to obtain a re-calculated answer; determining, by the one or more computers, a ratio between the provided IRS answer amount and the re-calculated answer for the IRS filing question; and generating, by the one or more computers, an electronic notification when the ratio is outside of a threshold.

In embodiments, a system may comprise: one or more computers configured to retrieve or have retrieved, by the one or more computers, financial transaction data for a financial transaction for an entity; to receive or obtain or have obtained, by the one or more computers, for the financial transaction, a plurality of categorical transaction tags categorizing the financial transaction, and one or more items of financial transaction data selected from the group of transaction amount, account balance, account names, pending status, location, meta score, and geo-coordinates; to access, by the one or more computers, a taxonomy associated with the entity, wherein the taxonomy comprises a plurality of data structures that are vertical and/or flat, with each of the respective data structures having a progression inductively backwards to an upper level in the data structure, wherein each of the plurality of the data structures comprises a most granular element at a lower level, wherein the taxonomy is based on populating a report desired by a user, and wherein each of the data structures contains a level that references at least one location in the report to be populated; to determine, by the one or more computers, an identification code for the financial transaction based at least in part on the plurality of categorical transaction tags, wherein the identification code references a particular one of the data structures in the taxonomy, where the particular one of the data structures comprises a corresponding unique data tag associated with a given level in the particular data structure; to select, by the one or more computers, one from the plurality of the categorical transaction tags as the most granular element; to assign, by the one or more computers, the unique data tag associated with the given level in the particular data structure to the one categorical transaction tag selected as the most granular element for the financial transaction; to organize, by the one more computers, the financial transaction data based at least in part on the one categorical transaction tag, using one or more algorithms to identify, parse and transform the financial transaction data for use in logical functions that may comprise but not be limited to one selected from the group of inductive data structure propagation, accounting operations, and report creation; to execute, by the one or more computers, an inductive algorithm using the one data structure to propagate from the most granular element in the lower level to a higher level in the one data structure via one or more fixed relationships between each level of the one data structure where the fixed relationships are determined according to the unique data tag and the one categorical transaction tag assigned to the transaction, where the fixed relationships are based on inductive propagation; to determine, by the one or more computers, the at least one location in the report to be populated based at least in part on results from executing the inductive algorithm; to populate or revise the report, by the one or more computers, with data from the financial transaction based at least in part on the at least one location in the report to be populated; and to transmit, by the one or more computers, the report to the user after one or more locations in the report have been populated.

In embodiments, a non-transitory computer-readable medium may comprise computer-readable program code embodied therein, to be executed by one or more computers, comprising: program code to retrieve or have retrieved, by the one or more computers, financial transaction data for a financial transaction for an entity; program code to receive or obtain or have obtained, by the one or more computers, for the financial transaction, a plurality of categorical transaction tags categorizing the financial transaction, and one or more items of financial transaction data selected from the group of transaction amount, account balance, account names, pending status, location, meta score, and geo-coordinates; program code to access, by the one or more computers, a taxonomy associated with the entity, wherein the taxonomy comprises a plurality of data structures that are vertical and/or flat, with each of the respective data structures having a progression inductively backwards to an upper level in the data structure, wherein each of the plurality of the data structures comprises a most granular element at a lower level, wherein the taxonomy is based on populating a report desired by a user, and wherein each of the data structures contains a level that references at least one location in the report to be populated; program code to determine, by the one or more computers, an identification code for the financial transaction based at least in part on the plurality of categorical transaction tags, wherein the identification code references a particular one of the data structures in the taxonomy, where the particular one of the data structures comprises a corresponding unique data tag associated with a given level in the particular data structure; program code to select, by the one or more computers, one from the plurality of the categorical transaction tags as the most granular element; program code to assign, by the one or more computers, the unique data tag associated with the given level in the particular data structure to the one categorical transaction tag selected as the most granular element for the financial transaction; program code to organize, by the one more computers, the financial transaction data based at least in part on the one categorical transaction tag, using one or more algorithms to identify, parse and transform the financial transaction data for use in logical functions that may comprise but not be limited to one selected from the group of inductive data structure propagation, accounting operations, and report creation; program code to execute, by the one or more computers, an inductive algorithm using the one data structure to propagate from the most granular element in the lower level to a higher level in the one data structure via one or more fixed relationships between each level of the one data structure where the fixed relationships are determined according to the unique data tag and the one categorical transaction tag assigned to the transaction, where the fixed relationships are based on inductive propagation; program code to determine, by the one or more computers, the at least one location in the report to be populated based at least in part on results from executing the inductive algorithm; program code to populate or revise the report, by the one or more computers, with data from the financial transaction based at least in part on the at least one location in the report to be populated; and program code to transmit, by the one or more computers, the report to the user after one or more locations in the report have been populated.

BRIEF DESCRIPTION OF THE DRAWINGS

FIG. 1A is Part 1 of a block diagram of an embodiment of a system consistent with the present invention.

FIG. 1B is Part 2 of and a continuation of the diagram of FIG. 1A of an embodiment of a system consistent with the present invention.

FIG. 2A is a flow diagram for an embodiment of Inductive Data Structure Propagation consistent with the present invention.

FIG. 2B is a continuation of the flow diagram of FIG. 2A for an embodiment of Inductive Data Structure Propagation consistent with the present invention.

FIG. 3 is an exemplary embodiment of category transaction tags, data structure levels and data structure bin titles for an embodiment of Inductive Data Structure Propagation consistent with the present invention—Part 1.

FIG. 4 is an exemplary embodiment of category transaction tags, data structure levels and data structure bin titles for an embodiment of Inductive Data Structure Propagation consistent with the present invention—Part 2.

FIG. 5 is a block diagram for an exemplary embodiment Backend Taxonomy: Business Accounting consistent with the present invention.

FIG. 6A is an exemplary embodiment of category transaction tags for an exemplary embodiment of a backend taxonomy for Business Accounting consistent with the present invention.

FIG. 6B is a continuation of FIG. 6A the exemplary embodiment of category transaction tags for an exemplary embodiment of a data structure for general purpose financial statements consistent with the present invention.

FIG. 7 is an exemplary embodiment of Relevant Portion of Exemplary Profit and Loss Statement consistent with the present invention.

FIG. 8 is a flowchart for an exemplary embodiment for Recording and Settling Accounts Payable According to Accrual Accounting consistent with the present invention.

FIG. 9 is a flowchart for an exemplary embodiment for Recording and Settling Accounts Payable According to CITS consistent with the present invention.

FIG. 10 is a flowchart for an exemplary embodiment for Recording Expenses According to Accrual Accounting consistent with the present invention.

FIG. 11 is a flowchart for an exemplary embodiment for Recording Digital Expenses According to CITS consistent with the present invention.

FIG. 12 is a flowchart for an exemplary embodiment for Recording Expenses Paid with Cash or Hand Written Check According to CITS consistent with the present invention.

FIG. 13 is a flowchart for an exemplary embodiment for Check Transaction when Check Written in Native Accounting Software and Employee Reimbursement Procedure consistent with the present invention.

FIG. 14 is a flowchart for an exemplary embodiment for Recording and Settling Accounts Receivable According to Accrual Accounting consistent with the present invention.

FIG. 15 is a flowchart for an exemplary embodiment for Recording and Settling Accounts Receivable According to CITS consistent with the present invention.

FIG. 16 is a flowchart for an exemplary embodiment for Recording Income According to Accrual Accounting consistent with the present invention.

FIG. 17 is a flowchart for an exemplary embodiment for Recording Digital Income According to CITS consistent with the present invention.

FIG. 18 is a flowchart for an exemplary embodiment for Recording Income Received via Cash or Check According to CITS consistent with the present invention.

FIG. 19 is a prior art example of Reconciliation According to Traditional Accounting Standards.

FIG. 20 is an exemplary embodiment for Auto-Reconciliation consistent with the present invention.

FIG. 21 is an exemplary embodiment for a Backend Taxonomy: Retirement/Personal Wealth Management consistent with the present invention.

FIG. 22 is an exemplary embodiment of category transaction tags for an exemplary embodiment of a backend taxonomy for Personal Wealth Management consistent with the present invention.

FIG. 23 is an exemplary embodiment for a Personal Wealth Report: Car Wash Expense consistent with the present invention.

FIG. 24 is an exemplary embodiment for a Backend Taxonomy: Non-Community Spending Report consistent with the present invention.

FIG. 25 is an exemplary embodiment for a Backend Taxonomy: Non-Community Spending Report consistent with the present invention.

FIG. 26 is an exemplary embodiment for a Backend Taxonomy: Money Laundering Report consistent with the present invention.

FIG. 27 is an exemplary embodiment for a Backend Taxonomy: Money Laundering Investigation—Wine Bar Income consistent with the present invention.

FIG. 28 is an exemplary embodiment for a Backend Taxonomy: Money Laundering Investigation—Wine and Other Alcohol cost of goods sold consistent with the present invention.

FIG. 29 is an exemplary embodiment for a Backend Taxonomy: IRS Analysis Report consistent with the present invention.

FIG. 30 is an exemplary embodiment for a Backend Taxonomy: IRS Performed Tax Analysis consistent with the present invention.

DETAILED SPECIFICATION OF EMBODIMENTS

Figure 31A:
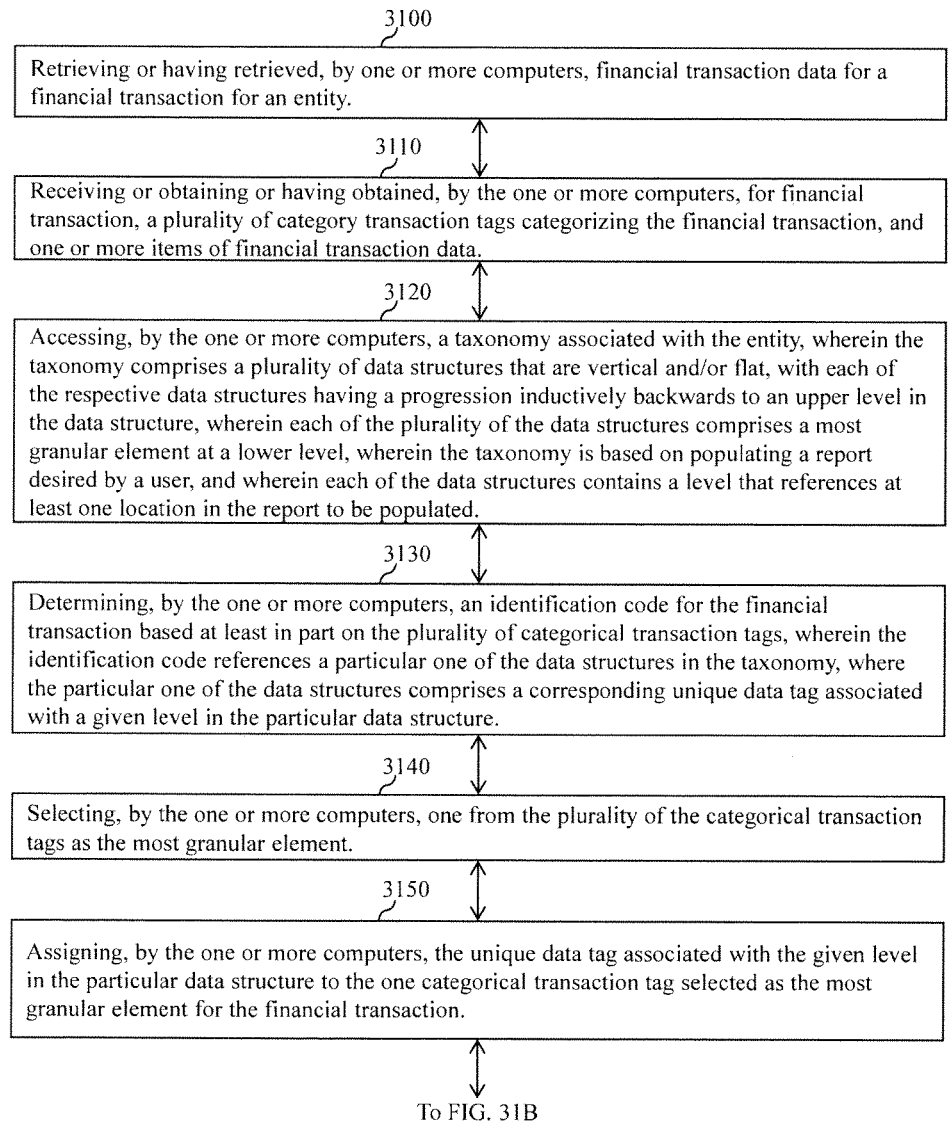
FIG. 31A is a block diagram for embodiments consistent with the present invention.

In embodiments, the invention may be implemented in an electronic system organizes large, potentially divergent or loosely organized, sets of financial transaction data using specific taxonomies such that the data entry associated with each data point of a certain type is done in a homogenous and consistent way without direct human involvement. Accordingly, unique identification tags are ascribed to certain levels of a given taxonomy allowing financial data points to be grouped according to the nature of the expense, income or purchase they represent via algorithmically assigned categories where each successive category delineates an additional layer of specificity. Embodiments are superior to existing financial transaction organization and accounting systems as they rely on defining granular financial transaction information according to an individual assigned to the transaction; for example, a customer or vendor.

Exemplary electronic configurations, embodied as a number of inventive taxonomies coupled with a unique data population approach, allow for unprecedented organization and analysis of granular financial transaction information as assigning transactions to an individual provides very little analytical power as individual names often provide no indication of the nature of the transaction itself. Specifically, virtually all existing accounting and financial analysis methodologies begin or end with the linking of a transaction to an individual name leading to an unintentional obfuscation of the nature of any given transaction at an especially pivotal point in the organization system. For example, the business name Mammut™ lends no indication to the nature of the business operations taking place, which is the production and distribution of rock climbing and mountaineering equipment. Additionally, this superfluous layer of data identification prevents many modern information technology tools from being fully leveraged as many data pulling or gathering mechanisms, such as Application Programming Interfaces (API) calls or financial institution databases, cannot trace a given transaction back to the individuals involved in that transaction with the required consistency to validate these sorts of accounting or analysis methodologies. For example, the name of the individual making a clothing purchase at a small, local boutique when the transaction was settled with cash may not be able to be traced back. Instead, the data pulling or gathering mechanisms of the invention assign categorical organization tags to each transaction such as Bar: Winery or Restaurant: Italian. This reality, coupled with the fact that the individual name itself often confuses the nature of the transaction, acts as a significant indicator that analysis and accounting using individual names as a leading or terminating identification tag rest on unnecessary or misguided assumptions representing prior art which does not fully leverage existing information technology and which is not designed to support the size and breadth of existing data sets, which are often loosely organized or structured according to categories and not individual names.

Categorically Inductive Taxonomy System (CITS) can be employed in a variety of embodiments. The invention is not limited to any particular type of embodiment. The description that follows concerns one of these embodiments. Additionally, section 1.3.8.2 Backup Data details additional embodiments to further demonstrate the spirit and scope of this invention as it is described in Section 4 Detailed Specification and which relates to Financial Investigation (FIG. 1: 200) and Financial Analysis (FIG. 1: 300). It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

CITS is the electronic manipulation of a set of data such that financial transactions, which are a subset of the data, are divided according to a certain taxonomy such that the data included in the taxonomy is validated by the user. This can have various embodiments which can impact the efficacy of financial accounting, data mining and financial transaction analysis in both the public and private sector. Specifically, by organizing data according to a taxonomy developed consistent with the invention, large sets of data can be condensed to only financial transactions and the relevant financial transactions organized according to descriptive identification tags. The raw data itself can be gathered through a variety of mechanisms such as API calls or a direct upload of data into one or more computers from a database. In the following, non-limiting embodiment a commercially available API call may be implemented which can pull information including, but not limited to: transaction amount; account balance; account name; date, time; geo-coordinates; address and one or more algorithmically assigned category indicating the nature of the transaction which is referred to in this document as categorical transaction tags (FIG. 1: 930). These tags act as the assimilation mechanism by which transactions pulled by the API call are identified within CITS and allow for each transaction's corresponding data structure to be identified. It should be noted that this commercially available API call is non-limiting and there exist many substitutes and/or complimentary alternative data gathering and/or pulling mechanisms which will be apparent to those skilled in the art. Additionally, please note, per the API call employed historical financial transaction records for a given user can be pulled. The timeframe for which these transactions can be gathered is variable between financial institutions but usually extends to the two previous years but can extend up to the life of the account at the financial institution. In embodiments, accounts which can pulled from may extend to checking accounts, savings accounts, credit accounts, mortgage accounts, brokerage accounts, loan accounts and other accounts.

1.1 Financial Management (FIG. 1: 100)

Through modern information technology a variety of solutions exist to help expedite the data entry associated with many areas of analysis; including but not limited to, accounting and tax operations. However, as much of this technology is still developing, the data gathered often lacks a certain level of granularity which traditional accounting embodiments find acceptable: specifically, double entry accrual or cash based accounting. The inventors have discovered that these accounting methodologies are outdated, unnecessary for certain types of businesses and do not best leverage existing technological solutions which can almost entirely solve the aforementioned issues as they impact both the private and public sectors. In embodiments, a design of data gathering, entry, amalgamation and analysis is provided that may be implemented in a new electronic configuration to facilitate accounting which distinctly diverges from accrual or cash based accounting and which can be used by businesses or individuals in both the public and private sectors.

FIGS. 1A and 1B are consistent with implementations of the invention. They show a detailed block diagram of CITS. As seen, each system rests on an identified taxonomy (001) inclusive of at least one data structure, e.g. those shown in FIG. 5. The data structure is populated according to information received or gathered from a database, e.g. (FIG. 1: 500), (FIG. 1: 510) or (FIG. 1: 520) via a data pulling mechanism (FIG. 1: 600) such as, but not limited to, an API call such that the periodicity of the data pulling mechanism is governing by Data Interface (FIG. 1: 910). By leveraging one or more computers, demonstrated as Server Operations (FIG. 1: 800) and Database Operations (FIG. 1: 835), the data, which is inclusive of individual transactions (FIG. 1: 400) is passed through the data structures associated with the identified taxonomy (FIG. 1: 001) and manipulated according to the algorithms as defined in Proprietary Algorithms (FIG. 1: 900) such that the output can be confirmed by the user (FIG. 1: 2000). The financial information which has been confirmed by the user then populates or revises Reports and Analysis (FIG. 1: 1000) such that the user can use one or more of these reports to take User Actions (FIG. 1: 3000).

The below sections explore a non-limiting example demonstrating how CITS can be applied to Financial Management (FIG. 1: 100). The embodiment chosen is titled as Business Accounting (FIG. 1: 101) and has been chosen in order to illustrate to those skilled in the art how CITS can be applied to a host of applications in the financial management area of study and analysis.

1.2 Business Accounting (FIG. 1: 101)

The specific embodiment explored here relates to accounting for small to medium sized businesses. It is well known that for these businesses, a variety of errors arise during accounting and tax operations and these errors can adversely affect business. Specifically, businesses are negatively impacted as errors in accounting operations can have a negative impact on the company's cash position; credit rating; relationship with suppliers; timely processing of accurate and legitimate vendor invoices; inaccurate recordings in general ledger accounts; and the inaccurate accrual of obligations and expenses that have not yet been completely processed.

CITS remedies these issues by removing much of the needed human performed data entry by leveraging existing information technology such that the accounting process is distinctly different from accrual or cash based accounting. Specifically, according to embodiments, transactions relating to a given company do not need to be tied to individuals; for example, vendors or customers. Instead, transactions can be tied to specific categories. As will be seen, this change reduces the data entry associated with monitoring financial transactions and the resulting accounting and tax operations to a level unprecedented when employing accrual or cash based accounting practices. When data entry is required, this usually cumbersome process is supplemented with a simplified, intuitive and automated user interface. As such, embodiments effectively service the goals of decreased data entry error rates and increased consistency of data recorded.

For most businesses, accounting operations are not primarily performed to understand the financial position of the business at any great level of detail but instead from a desire to file the necessary Federal income tax forms and schedules and have access to general purpose financial statements. As such, accounting methodologies should be redesigned to accommodate these needs while simultaneously providing structure such that the data input processes and the corresponding information created is as timely and accurate as reasonably possible.

1.2.1 Identification of Taxonomy (FIG. 1: 001)

Each CITS embodiment is based on at least one taxonomy (FIG. 1: 001) which acts to provide the data structures by which gathered financial transaction records are organized such that the data inherent in these transactions can culminate as powerful and valuable information. The structure chosen for these taxonomies is part of the working mechanism by which human dependent data entry is reduced which ultimately leads to the reduction of errors caused by inaccurate or inconsistent data entry inherent in data mining and analysis and also increases the timeliness of reports as unnecessary and superfluous data tags and data entry steps are removed. Accordingly, the taxonomy shown here and the corresponding data structures are representative of the fewest possible categorical delineations thereby eliminating any unnecessary data entry and/or computing system requirements.

The taxonomy in this non-limiting example was chosen for several primary reasons. The first of which was to choose a taxonomy that would allow for accurate, thorough and complete adherence to existing IRS tax code for privately held businesses and be flexible enough to incorporate reasonable IRS tax code changes which could alter the business income tax landscape. The second was to ensure that the taxonomy chosen would eliminate the unnecessary data entry and tagging inherent in accrual and cash based accounting. The third was to choose a taxonomy which was realistically able to employ current information technology and API calls run against financial institution databases.

FIG. 5 shows this taxonomy visually as two independent data structures. The first of these data structures represents the completion of the relevant IRS income filing for a given business and is demonstrated as process steps IRS Income Filing (FIG. 5: 113), Taxonomy Primary Categories (FIG. 5: 111), Taxonomy Sub-Categories (FIG. 5: 109), Taxonomy Granular Categories (FIG. 5: 107), Taxonomy Sub-Granular Categories (FIG. 5: 105) and Taxonomy Tertiary Categories Inclusive of Unique Data Tags (FIG. 5: 103). The second of these data structures represents the completion of financial statements and is demonstrated as process steps General Purpose Financial Statements (FIG. 5: 123) Section (FIG. 5: 121), Sub-Section (FIG. 5: 119), Line Items (FIG. 5: 117) and Granular Level Categories (FIG. 5: 115). The below sections speak directly to the delineation of this taxonomy with an emphasis on how this particular taxonomy accomplishes the aforementioned goals of reduced data entry; data entry error rates associated with incorrect or inconsistent data entry; and enhanced timeliness and accuracy of reports. This section specifically references the flow of information and the ways in which information is collected using data pulling mechanisms, such as the aforementioned API call (FIG. 1: 600).

1.2.1.1 IRS Income Filing (FIG. 5: 113)

In this non-limiting example one of the two data structures shown in this embodiment begins with the IRS income filing (FIG. 5: 113) which pertains to the type of business employing CITS. This filing is chosen as the beginning hierarchy of the taxonomy as it reduces data entry and computing system requirements to the minimum possible level but ensures that thorough, complete and accurate IRS income filings are provided for income tax purposes.

1.2.1.2 Taxonomy Primary Categories (FIG. 5: 111)

The second level of this non-limiting example taxonomy is titled as Taxonomy Primary Category (FIG. 5: 111) which is a broad descriptive tag indicating the nature of the transaction it identifies. For example, these Taxonomy Primary Categories (FIG. 5: 111) would be the delineation of the IRS Income Filing required by the type of business employing a CITS. In the case of a Sole Proprietorship using a 2014 1040 Schedule C these Taxonomy Primary Categories (FIG. 5: 111) would be Income, Expense, Cost of Goods Sold, Vehicle and Other Expenses. Accordingly, each Taxonomy Primary Category (FIG. 5: 111) is made up of the questions which correspond to that Taxonomy Primary Category (FIG. 5: 111). In keeping with the same non-limiting example of a Sole Proprietorship filing a 2014 IRS 1040 Schedule C and relating to the associated Taxonomy Primary Categories (FIG. 5: 111) these would be questions one through seven for Income; eight through thirty-two for Expenses; thirty-three through forty-two for Cost of Goods Sold, forty-three through forty-seven for Vehicle Information and forty-eight for Other Expenses.

1.2.1.3 Taxonomy Sub-Categories (FIG. 5: 109)

The third level of this non-limiting example taxonomy is titled as Taxonomy Sub-Categories (FIG. 5: 109) and is made up of the individual question from the sets of questions defined by the Taxonomy Primary Category (FIG. 5: 111) from the IRS Income Filing (FIG. 5: 113) required for the type of business employing CITS. Specifically, all questions concerning the Taxonomy Primary Category (FIG. 5: 111) titled Income would be contained within the Taxonomy Sub-Categories (FIG. 5: 109). This implies that the Taxonomy Sub-Category (FIG. 5: 109) represents each one of these seven questions in a granular way and as such each one of these sevens questions can be identified as the appropriate data bin of the data flow by employing specific data tags.

1.2.1.4 Taxonomy Granular Categories (FIG. 5: 107)

The fourth level of this non-limiting example taxonomy is titled as Taxonomy Granular Categories (FIG. 5: 107) and is made up of the individual and unique sections which can correspond to a given Taxonomy Sub-Category (FIG. 5: 109). Specifically, in keeping with the same non-limiting example, according to an IRS Income Filing (FIG. 5: 113) which relates to a business which filed 2014 IRS Income Filing 1040 Schedule C and relating to a data point which represents an exemplary transaction for advertising (FIG. 1: 400) for the Taxonomy Primary Category (FIG. 5: 111) Expenses and specifically relating to the Taxonomy Sub-Category (FIG. 5: 109) Question Eight, which is the sum of all advertising expenses, the Taxonomy Granular Category (FIG. 5: 107) would be Services Provided. Accordingly, each Taxonomy Sub-Category (FIG. 5: 109) should contain at least one Taxonomy Granular Category (FIG. 5: 107) which acts to indicate the nature of transactions which should correspond to that specific question, embodied as Taxonomy Sub-Categories (FIG. 5: 109) as it relates to the IRS Income Filing (FIG. 5: 113) pertaining to the type of business employing CITS.

1.2.1.5 Taxonomy Sub-Granular Category (FIG. 5: 105)

The fifth level of this non-limiting example taxonomy is titled as Taxonomy Sub-Granular Categories (FIG. 5: 105) and is made up descriptive identifiers which add an additional layer of definition to the specific transaction (FIG. 1: 400) being analyzed. Specifically, in keeping with the same non-limiting example, according to the 2014 IRS Income Filing 1040 Schedule C (FIG. 5: 113) of the Taxonomy Primary Category titled Expense Questions eight through thirty-two (FIG. 5: 111) of the Taxonomy Sub-Category titled Question 8 Advertising (FIG. 5: 109), of the Taxonomy Granular Categories titled Services Provided (FIG. 5: 107), such that the Taxonomy Sub-Granular Category could be titled Advertising and/or Marketing (FIG. 5: 105). Accordingly, each Taxonomy Granular Category (FIG. 5: 107) should contain at least one Taxonomy Sub-Granular Category (FIG. 5: 105) which acts to indicate the nature of transactions (FIG. 1: 400) which makeup the Taxonomy Granular Categories (FIG. 5: 107).

1.2.1.6 Taxonomy Tertiary Categories Inclusive of Unique Data Tags (FIG. 5: 103)

As such, following the same line of inductive reasoning, each Taxonomy Sub-Granular Category (FIG. 5: 105) should be made up of Taxonomy Tertiary Categories Inclusive of Unique Data Tags (FIG. 5: 103) which represents the final and most detailed delineation of the specific transaction (FIG. 1: 400) being analyzed. Specifically, in keeping with the same non-limiting example, according to the 2014 IRS Income Filing 1040 Schedule C (FIG. 5: 113) of the Taxonomy Primary Category titled Expense Questions eight through thirty-two (FIG. 5: 111) of the Taxonomy Sub-Category titled Question 8 (FIG. 5: 109), of the Taxonomy Granular Categories titled Services Provided (FIG. 5: 107), of the Taxonomy Sub-Granular Category titled Advertising and/or Marketing (FIG. 5: 105) such that the Taxonomy Tertiary Categories Inclusive of Unique Data Tags (FIG. 5: 103) could be Public Relations. As such, this implies that the Unique Data Tag (FIG. 1: 945) associated with each Taxonomy Tertiary Categories Inclusive of Unique Data Tags (FIG. 5: 103) corresponds to a given Categorical Transaction Tag (FIG. 1: 930). As such, it should be clear that each transaction of a given business requires at least one fixed relationship between two identification tags which indicate which specific Taxonomy Tertiary Category Inclusive of Unique Data Tags (FIG. 5: 103) the given transaction (FIG. 1: 400) relates to.

As such, given this non-limiting example, the first data structure associated with this Identified Taxonomy (FIG. 1: 001) is designed to provide users of CITS with accurate, thorough and complete IRS Income Filings (FIG. 5: 113), which in this case is a 2014 1040 Schedule C. This data structure is made up of six levels: IRS Income Filing (FIG. 5: 113), Taxonomy Primary Categories (FIG. 5: 111), Taxonomy Sub-Categories (FIG. 5: 109), Taxonomy Granular Categories (FIG. 5: 107), Taxonomy Sub-Granular Categories (FIG. 5: 105) and Taxonomy Tertiary Categories Inclusive of Unique Data Tags (FIG. 5: 103).

1.2.1.7 General Purpose Financial Statements (FIG. 5: 123)

In this non-limiting example the second of the two data structures in this embodiment begins with General Purpose Financial Statements (FIG. 5: 123) and represents the first level of this data structure. According to this non-limiting example, these General Purpose Financial Statements (FIG. 5: 123) include a Balance Sheet and Profit and Loss Statement. These are shown as they represent a wide enough breadth of information to demonstrate the reaching capabilities of CITS and also as many businesses use these financial statements as primary financial indicators when making business decisions.

1.2.1.8 Section (FIG. 5: 121)

The second level of this non-limiting example data structure is titled as Section (FIG. 5: 121) and is made up of the individual sections of a given General Purpose Financial Statement (FIG. 5: 123); namely, a Balance Sheet and Profit and Loss Statement. For example, the Sections (FIG. 5: 121) as they relate to a Profit and Loss Statement (FIG. 5: 123) would be titled Sections Revenue, Expense and Net Income (FIG. 5: 121).

1.2.1.9 Sub-Sections (FIG. 5: 119)

The third level of this non-limiting example data structure is titled as Sub-Sections (FIG. 5: 119) and represents the nature of the preceding Section (FIG. 5: 121). As such, each Section (FIG. 5: 121) is made up of at least one Sub-Section (FIG. 5: 119) delineating the nature of transactions (FIG. 1: 400) that makeup that Section (FIG. 5: 121). For example, The Expense Section (FIG. 5: 121) of a Profit and Loss Statement (FIG. 5: 123) would be made up of Sub-Sections Business Development; Regular Tangible; Regular Intangible; Rent or Lease and Employees and Independent Contractors (FIG. 5: 119).

1.2.1.10 Line Items (FIG. 5: 117)

The fourth level of this non-limiting exemplary data structure is titled as Line Items (FIG. 5: 117) and is made up of the individual Line Items (FIG. 5: 117) associated with a given Sub-Section (FIG. 5: 119). For example, according to the Expense Section (FIG. 5: 121) of a Profit and Loss Statement (FIG. 5: 123) a Line Item titled Advertising (FIG. 5: 117) would likely be included. Accordingly, it should be clear that in order for CITS to function properly, sufficient Line Items (FIG. 5: 117) for a given business employing CITS should be provided to ensure adequately detailed General Purpose Financial Statements (FIG. 5: 123) for making business decisions.

1.2.1.11 Granular Level Categories Inclusive of Unique Data Tags (FIG. 5: 115)

As such, following the same line of inductive reasoning, each Line Item (FIG. 5: 117) should be made up of Granular Level Categories Inclusive of Unique Data Tags (FIG. 5: 115). Specifically, these Granular Level Categories (FIG. 5: 115) are composed of the most detailed information present in this CITS embodiment. Additionally, like the previously defined data structure, each Granular Level Category Inclusive of Unique Data Tags (FIG. 5: 115) includes Unique Data Tags (FIG. 1: 945) such that the Categorical Transaction Tags (FIG. 1: 930) indicate which transactions (FIG. 1: 400) are associated with the specific and corresponding Line Items (FIG. 5: 117).

For example, a Granular Level Category Inclusive of Unique Data Tags (FIG. 5: 115) of the Advertising Line Item (FIG. 5: 117) of a Business Development Sub-Section (FIG. 5: 119) of the Expense Section (FIG. 5: 121) of a Profit and Loss Statement (FIG. 5: 123) would be titled Public Relations. Similarly, this implies that the Unique Data Tag (FIG. 1: 945) associated with each Granular Level Category Inclusive of Unique Data Tags (FIG. 5: 115) corresponds to a given Categorical Transaction Tag (FIG. 1: 930). As such, it should be clear that each transaction (FIG. 1: 400) of a given business requires at least one fixed relationship between two identification tags which indicate which specific Granular Level Category Inclusive of Unique Data Tags (FIG. 5: 115) that transaction relates to.

Given this non-limiting example, the Identification of the Taxonomy (FIG. 1: 001) consists of one unique taxonomy designed to provide users of CITS with accurate, thorough and complete IRS income filings (FIG. 5: 113) and General Purpose Financial Statements (FIG. 5: 123). This taxonomy is made up of two unique data structures, one to create each set of mentioned reports. The first data structure is made up of six levels: IRS Income Filing (FIG. 5: 113), Taxonomy Primary Categories (FIG. 5: 111), Taxonomy Sub-Categories (FIG. 5: 109), Taxonomy Granular Categories (FIG. 5: 107), Taxonomy Sub-Granular Categories (FIG. 5: 105) and Taxonomy Tertiary Categories Inclusive of Unique Data Tags (FIG. 5: 103). The second data structure, designed to produce users of CITS with complete General Purpose Financial Statements (FIG. 5: 123) has five levels: General Purpose Financial Statements (FIG. 5: 123), Sections (FIG. 5: 121), Sub-Sections (FIG. 5: 119) Line Items (FIG. 5: 117) and Granular Level Categories Inclusive of Unique Data Tags (FIG. 5: 115).

1.2.2 Data Gathering

As the previous section describes how a taxonomy (FIG. 1: 001), and two accompanying data structures are developed to ensure minimal human performed data entry, thereby avoiding errors associated with inaccurate or inconsistent data entry, and fewest possible processing steps, this section explores how this data is gathered (FIG. 1: 600), how the data is populated and manipulated throughout the system (FIG. 1: 700) and how information (FIG. 1: 1000) is created based around an exemplary transaction (FIG. 1: 400). In essence, the taxonomy and data structures, although a pivotal construct, are themselves insufficient to service the aforementioned goals of reduced data entry; reduced data entry error rates such as incorrect or inconsistent data entry; and increased timeliness and accuracy of reports.

1.2.2.1 Individual Transaction Takes Place (FIG. 1: 400)

The data itself is individual transactions (FIG. 1: 400) which take place during business operations. For example, incurring income from the sale of goods or services (FIG. 1: 400) or incurring expenses contributed to cost of goods sold (FIG. 1: 400). Throughout the remainder of this section, a non-limiting example will be referenced which in this case is the purchase of Public Relations Services (FIG. 1: 400), done in a Marketing and/or Advertising effort for an exemplary business which might employ CITS to accomplish accounting and tax operations.

1.2.2.2 Information transferred (FIG. 1: 410) to financial institution database (FIG. 1: 510)

Financial transaction data as referenced in Individual Transaction Takes Place (FIG. 1: 400) is gathered by most financial institutions and stored in their core systems or databases (FIG. 1: 510). The process of gathering this data is demonstrated in FIG. 1, Master Figure, as process step (FIG. 1: 410). In the context of this embodiment the information transfer process to the financial institution (FIG. 1: 410) is conducted by the financial institution itself. This process usually takes place between the merchant database (FIG. 1: 500) and the financial institution's database (FIG. 1: 510). For example, when a user engages in an expense transaction (FIG. 1: 400) and uses a credit card, a record of that transaction is created and stored in the financial institution's database (FIG. 1: 510).

This data can be stored in a variety of formats depending on institutional practices but, in the case of this non-limiting example, the Individual Transaction (FIG. 1: 400) is stored in a financial institution database (FIG. 1: 510). For example, this database (FIG. 1: 510) would be the core record system of Bank of America™.

As such, the financial institution of a respective user has accumulated a financial transaction history for that user for transactions which relate to that financial institution.

1.2.2.3 Connectivity (FIG. 1: 600)

API calls (FIG. 1: 600) which can pull financial transaction data from financial institution database (FIG. 1: 510), are commercially available and can be readily developed or augmented via software developer kits (SDK). In the case of this non-limiting example, the API call (FIG. 1: 600) employed can pull information including, but is not limited to; transaction amount, account balance, account name, date, time, geo-coordinates, address and one or more algorithmically assigned category indicating the nature of the transaction which is referred to in this document as Categorical Transaction Tags (FIG. 1: 930). These tags act as the assimilation mechanism by which transactions pulled by the API call (FIG. 1: 600) are identified within CITS and allow for each transactions (FIG. 1: 400) corresponding data flow to be identified (FIG. 1: 940).

Accordingly, a similar or the same API call may need to be run against multiple financial institutions in order to gather all of the financial transaction data as it relates to the transactions (FIG. 1: 400) of a given user as that user might bank with more than one bank or have credit established with more than one institution or institutions other than the institutions at which they have checkable accounts.

When the API call retrieves a single or a plurality of financial transactions the data points making up each of the financial transactions will be recorded, parsed and stored. The data points which make up a transaction can be, but are not limited to, transaction amount; date and time of transaction; account involved and Categorical Transaction Tag. Specifically, each data point making up a given transaction has a predecessor name or tag which is the working mechanism by which the table and field corresponding to a given data point of the data schema is populated. For example, if the predecessor tag is transaction amount the value will be a number wherein the number will be parsed from the other data points and then stored in a corresponding column of a given table, which could be a derivative table, within the data schema effectively creating a new record in the table corresponding to the said data point, which might be located or populated in a downstream database, wherein creating the record was initiated by a particular data point and/or combination of data points.

Additionally, when the API call retrieves a single or a plurality of financial transactions, wherein at least one transaction has not been previously recorded, the financial transactions may be, but is not limited to, queued into a staging file and/or staging table. An exemplary embodiment of the order of the queue is first in and first out queuing wherein each transaction in the queue is identified via a globally unique transactions identification code. Specifically, according to non-limiting embodiments, there may be three primary statuses usually referred to as waiting, processing and complete wherein the primary purpose of this three step staging mechanism is to ensure that no data point is processed twice or fails to process. Accordingly, this is the working mechanism by which financial transactions are ordered and processed to ensure that accurate and timely user records are created for use in calculation operations, such as accounting operations, and ultimately report creation.

1.2.3 Data Applied to Taxonomy (FIG. 1: 700)

This section explores how financial transaction data embodied as individual income and expense transactions (FIG. 1: 400), which is pulled by the aforementioned API call (FIG. 1: 600), is manipulated on a server, database and algorithmic level (FIG. 1: 700) thereby applying that data to the pre-defined taxonomy (FIG. 1: 001) in such a way that data is turned into meaningful information (FIG. 1: 1000) per the pre-defined data flows shown in FIG. 5 Backend Taxonomy: Business Accounting. This step is pivotal in the CITS embodiments as it is the technical procedure by which the data gathered from the financial institution is manipulated and categorized (FIG. 1: 700) according to the pre-defined taxonomy (FIG. 1: 001) therefore creating valuable information which can be turned into reports (FIG. 1: 1000) allowing users to take action (FIG. 1: 3000) according to the information provided. The information created in this step is inherently more accurate relative to existing data entry processes and is categorized in a superior way relative to existing categorization algorithms as the user can confirm categorization at their discretion by being optionally notified (FIG. 1: 2000) of a given categorization or set of categorizations [(FIG. 1: 945) and/or (FIG. 1: 930)].

1.2.3.1 Server Operations (FIG. 1: 800)

In order to collect and process data according to a given taxonomy, a computing system is required to, amongst other things, execute the described API call or other data pulling mechanism (FIG. 1: 600) and the below defined algorithms Proprietary Algorithms (FIG. 1: 900). The below section explores an exemplary computing system which might be used to facilitate these processes for operations including, but not limited to, storing and processing data per the CITS embodiments provided here.

The operations demonstrated in process steps (FIG. 1: 800) and (FIG. 1: 835) show a typical, but non-limiting, hardware structure for a computing system. The computing system refers to the provider or servicing computer system or the servicing database. These systems may, but are not necessarily required to be, connected via varied communication channels such as, but not limited to, a network of one or more computers or machines. Accordingly, the below exemplary description of a computing system, which can be made up of one or more computers or machines, includes a central processing unit (CPU); interface for input and/or output (I/O); memory or storage system; processor(s); network connection; and an exemplary description of database operations which, according to the non-limiting CITS embodiments demonstrated here, could be constructed as one or more computers or machines with the possibility of this database network being composed partially or totally of virtual or actual machines.

1.2.3.1.1 CPU (FIG. 1: 810)

The portion of the computing system, usually comprised of processors, where instructions from memory are processed and all binary arithmetic and logic based calculations and operations take place. This is the portion of the computing system that runs the operating system and usually any applications. A CPU is constantly taking input, then processing the input to produce output, and may do so, but is not limited to do so, for given operating system and/or application operations.

1.2.3.1.2 I/O Interface (FIG. 1: 815)

This is the system interface or manner in which the computing system communicates between the computing system and any input arising from outside of the computer itself. This input/output can come directly from other computing systems, network connections, mouse, keyboard, modem, network cards or any other method or device that provides input and output or any combination thereof.

1.2.3.1.3 Storage (FIG. 1: 820)

The computing system utilizes memory to store data, instructions and/or any other data or information needed to transform input into output. This storing of data is determined by the instructions provided by, but not limited to the CPU. This is usually, but not always, temporary storage for the CPU which is used to store, distribute and provide data used in collecting input, instructions or any other operation(s) which produce output, data and/or information.

1.2.3.1.4 Processor (FIG. 1: 825)

A processor is the machine component that processes instructions passed from, but not limited to, the CPU via I/O devices, interfaces from other computing system and/or direct user input through input devices or any combination thereof. The processor then processes the instructions on a binary level in response to, but not limited to, the instructions gathered or provided from a CPU. Specifically, a processor acts according to instructions dictated by, but not limited to, binary logic, input, output, graphical, mathematical and logical operations associated with, but not limited to, applications or operating systems.

1.2.3.1.5 Network Connection (FIG. 1: 830)

A network connection is the mechanism by which a series of one or more computers, computing systems, servers, or any other devices designed or used to compute are connected to each other or one another based around a network of connectivity. Through systems or sets of communication channels network connectivity can facilitate the flow or stoppage of, but not limited to, resources, data, information or any other I/O across a wide range of computer system, devices, and/or users. These network connections can be part of, but are not limited to: Local Area Networks (LAN), Personal Area Networks (PAN), Home Area Networks (HAN), Wide Area Networks (WAN), Campus Networks, Metropolitan Area Networks (MAN), Enterprise Private Networks, Internetworks, Backbone Networks (BBN), Global Area Networks (GAN), the Internet, cable networks and/or cellular networks.

1.2.3.1.6 Database Operations (FIG. 1: 835)

A structured or unstructured set of data which can be, but is not limited to be, held, stored and/or archived in a computing system data storage device embodied as a virtual or actual set of one or more computers, or any combination thereof. This data is stored with the intention that it be accessed by one or more computers or machines, or any combination or set thereof, at a single point of time or over a fixed or undetermined period of time. The data is structured such that the governing structure of the database can, but is not limited to, give or take instructions, give or take input from a computer, a machine, or other computing systems, network connections and/or any aforementioned devices, systems or communication channels or any devices and systems or communication channels not mentioned here which could or might act in a similar role whether those devices be virtual or real.

1.2.4 Proprietary Algorithms (FIG. 1: 900)

The below section explores proprietary algorithms which are partially designed to correlate the Categorical Transaction Tags (FIG. 1: 930) of a given transaction (FIG. 1: 400) with Unique Data Tags (FIG. 1: 945) thereby identifying a specific data flow (FIG. 1: 940), where the bins of the data structure to be identified are shown in this embodiment as they relate to the first data structure described as process steps IRS Income Filing (FIG. 5: 113), Taxonomy Primary Category (FIG. 5: 111), Taxonomy Sub-Categories (FIG. 5: 109), Taxonomy Granular Categories (FIG. 5: 107), Taxonomy Sub-Granular Categories (FIG. 5: 105) and Taxonomy Tertiary Categories Inclusive of Unique Data Tags (FIG. 5: 103); and for the second data structure described as process steps General Purpose Financial Statements (FIG. 5: 123), Section (FIG. 5: 121), Sub-Section (FIG. 5: 119), Line Items (FIG. 5: 117) and Granular Level Categories Inclusive of Unique Data Tags (FIG. 5: 115) which are, as previously explained, two separate data structures which are hierarchically dictated given the Identification of Taxonomy (FIG. 1: 001).

1.2.4.1 Data Interface (FIG. 1: 910)

The Data Interface (FIG. 1: 910) is a mechanism, to be conducted via one or more computers, which dictates the frequency at which the above described API call (FIG. 1: 600) is run and once this schedule is set executes the necessary commands for the API call (FIG. 1: 600) to take place. The Data Interface (FIG. 1: 910) itself can be structured via human input embodying specific relationships or data structures or can be the output of a secondary heuristic computing system, programmed to operate according to a system of one more computers.

In the context of this non-limiting example, the aforementioned API call (FIG. 1: 600) will be required to gather financial transaction data concerning the financial transactions (FIG. 1: 400) of the user. As such, there will be variability between users with regards to the frequency at which the API call (FIG. 1: 600) is run. For instance, a user which engages in many transactions (FIG. 1: 400) will have this API call (FIG. 1: 600) executed more often relative to a user which engages in only a few transactions (FIG. 1: 400). Additionally, the time of day in which the user usually engages in transactions (FIG. 1: 400) will have a higher frequency of API calls (FIG. 1: 600) relative to the time of day in which the user does not engage in transactions (FIG. 1: 400).

According to a specific, but non-limiting example, if the user is the owner of a lunch boutique in a business park there will be a high frequency of transactions (FIG. 1: 400) taking place during the hours of 11:00 a.m. through 2:00 p.m. which would likely be for the purchases of meals. Conversely, the user will not engage in many transactions (FIG. 1: 400) outside of this block of time besides special events such as catering; buying supplies or paying employees.

In embodiments of the Data Interface (FIG. 1: 910), these trends may be identified by dividing the hours over the course of a given day into a discreet histogram thereby creating 24 discreet bins. The amount of transactions (FIG. 1: 400) which occur within each of these bins will dictate the API call (FIG. 1: 600) frequency over the course of a given hour. Similarly, this same discrete histogram model, algorithmically developed to infer financial transaction trends, could be employed by dividing the months of a given year into twelve bins. This would be especially advantageous for cyclical or seasonal businesses. In keeping with the same non-limiting example, if the lunch boutique had most of its seating on an outdoor patio it could be expected that the transaction frequency would decrease during colder months.

This Data Interface (FIG. 1: 910) is designed such that the user is best served based off their financial transaction trends while simultaneously reducing the computing and/or system requirements needed to employ CITS, for instance, if the API call (FIG. 1: 600) was executed for all users once an hour regardless of financial transaction activity trends.

1.2.4.2 Data Point Identified (FIG. 1: 920)

Each API call can pull a number of transactions; however, it is important for teaching purposes to demonstrate a single data point, which should be considered a single transaction, as it is augmented by operations inherent in CITS and specifically as that data point is manipulated and categorized per Data Applied to Taxonomy (700). As such, in the context of this non-limiting example, a single data point as it operates within CITS will be described. Specifically, in keeping with the previous mentioned non-limiting example which, in this case, is the purchase of Public Relations Services (FIG. 1: 400), done in a Marketing and/or Advertising effort, for an exemplary business which might employ CITS to accomplish accounting and tax operations.

However, it is technically feasible and advantageous to run these defined operations against many data points simultaneously. As such, it should be noted, that a practical CITS system which services a single or many users should have the capacity to identify many data points simultaneously and pass these data points through defined data structures associated with a larger Identification of Taxonomy (FIG. 1: 001) to ensure timeliness of reports.

It should be noted, the technical method by which a Data Point Identified (FIG. 1: 920) operates according to this non-limiting example is through globally unique identifiers which correspond to each Categorical Transaction Tag Applied (FIG. 1: 930) thereby denoting the given Categorical Transaction Tag Applied (FIG. 1: 930) to a data point pulled via the API call (FIG. 1: 600) where the API call (FIG. 1: 600) is facilitated by the Data Interface (FIG. 1: 910). At this step, the algorithms associated with Data Point Identified (FIG. 1: 920) also cache the other granular level information relevant to financial information creation which is also pulled by the API call such as, but not limited to, transaction amount, account balance, account name, pending status and location.

It is important from a teaching perspective that a single data point be identified and explained as each data point gathered could have a unique set of Categorical Transaction Tags Applied (FIG. 1: 930) corresponding to a Unique Data Tag (FIG. 1: 945) and therefore a unique Data Flow Identified (FIG. 1: 940) within the data structure based on the Identification of Taxonomy (FIG. 1: 001). Such is the power of CITS, through the algorithms (FIG. 1: 900) employed to delineate financial transaction data according to a given taxonomy based on a series of fixed relationships between Categorical Transaction Tags Applied (FIG. 1: 930) and Unique Data Tags (FIG. 1: 945) a Data Flow is Identified (FIG. 1: 940) and therefore any financial transaction (FIG. 1: 400) can be inputted into a given system, recorded and manipulated into information such that the nature of the transaction is clear and therefore the aggregated information, confirmed by the user (FIG. 1: 2000), can be used for reporting purposes (FIG. 1: 1000) such that the user can engage User Action (FIG. 1: 3000) where action taken or decisions made partially relates to the Reports and Analysis (FIG. 1: 1000).

1.2.4.3 Categorical Transaction Tags Applied (FIG. 1: 930)

As a result of the nature of the aforementioned commercially available API call (FIG. 1: 600), up to, but not limited to, three descriptive categories are algorithmically assigned to a given transaction and are referred to as Categorical Transaction Tags (FIG. 1: 930). An exemplary embodiment of Categorical Transaction Tags (FIG. 1: 930), keeping with the specific and non-limiting example described above, is shown in FIGS. 6A and 6B, Category Example: Business Accounting, as Service (FIG. 6: 931), Advertising and/or Marketing (FIG. 6: 932) and Public Relations (FIG. 6: 933). These tags act as the assimilation mechanism by which transactions (FIG. 1:400) pulled by the API call (FIG. 1: 600) are identified within CITS and allow for each transaction's corresponding data structure to be identified.

A rather granular description is provided to the transaction given these categories. However, the data which is being described via Categorical Transaction Tags Applied (FIG. 1: 930) needs to be matched with a Unique Data Tag (FIG. 1: 945) relating to a specific level of a given data structure to begin the integration of the data point into the pre-defined data structure, dictated by the given taxonomy (FIG. 1: 001). In this process the coupling point between the Categorical Transaction Tags Applied (FIG. 1: 930) and the Unique Data Tag (FIG. 1: 945) is characterized by the most detailed and granular Categorical Transaction Tags Applied (FIG. 1: 930) available. According to this non-limiting example, the most detailed and granular Categorical Transaction Tags Applied (FIG. 1: 930) available is Public Relations (FIG. 6: 933). As such, Public Relations (FIG. 6: 933) is the Categorical Transaction Tag Used (FIG. 1: 933) to this given transaction, as opposed to the Categorical Transaction Tags Pulled as referenced in FIGS. 6A and 6B. Accordingly, it is now clear to one skilled in the art that the preceding, higher level, Categorical Transaction Tags Pulled (FIG. 1: 931 & FIG. 1: 932) are now superfluous in this non-limiting example as the information inherent in these Categorical Transaction Tags Pulled (FIG. 1: 931 & FIG. 1: 932) can be determined via inductive fixed relationship algorithms which are shown as Inductive Data Structure Propagation (FIG. 1: 950). Specifically, as it relates to the data structure which provides General Purpose Financial Statements (FIG. 5: 123), the Granular Level Category Inclusive of Unique Data Tags, Public Relations (FIG. 6: 115) must, by its very nature, be preceded by the Line Item, Advertising and/or Marketing (FIG. 6: 117) and Advertising and/or Marketing must, by its very nature, be preceded by Sub-Section, Business Development (FIG. 6: 119) and Business Development must, by its very nature, be preceded by Section, Expenses and Expenses (FIG. 6: 121) must, by its very nature, relate to a predictable section of a given Financial Statement (FIG. 6: 123), for example, the Expense Section (FIG. 6: 121) of a Profit and Loss Statement (FIG. 6: 123). Please see FIG. 7 Relevant Portion of Exemplary Profit and Loss Statement for a visual embodiment of these line items exemplary shown on a Profit and Loss Statement for a business which might employ CITS. Additionally, see FIGS. 6A and 6B, Category Example: Business Accounting for a table illustrating the Data Structure Titles, Data Bin Titles, Data Flow, Unique Data Tags and Categorical Transaction Tags as they relate to this non-limiting example.

1.2.4.4 Data Flow Identified (FIG. 1: 940) Via Unique Data Tag (FIG. 1: 945)

The algorithms which execute and provide this corollary relationship are designed to operate based on a fixed relationship between the Categorical Transaction Tags Applied (FIG. 1: 930) and the Unique Data Tag (FIG. 1: 945). Specifically, the algorithms referenced here are capable of distilling each known combination of Categorical Transaction Tags Applied (FIG. 1: 930) to the most detailed and granular Categorical Transaction Tag (FIG. 1: 930) assigned to a given transaction via the commercially available API call (FIG. 1: 600). Accordingly, each most detailed and granular level category of a given data structure, associated with a given taxonomy (FIG. 1: 001), is also mapped with at least one Unique Data Tag (FIG. 1: 945). As such, it should be clear that this is the assimilation mechanism by which transactions pulled via the aforementioned API call (FIG. 1: 600) are tied to a given section of a given data structure arising from a given taxonomy (FIG. 1: 001). As previously noted, the Data Flow Identified (FIG. 1: 940) is then mapped as when considering the most detailed and granular Categorical Transaction Tag Applied (FIG. 1: 930) and its relationship to a Unique Data Tag (FIG. 1: 945) only one series of logical and predictable inductive data propagation steps is available given a fixed data structure. In keeping with the same example, and relating to the second data structure discussed which is designed to provide users with General Purpose Financial Statements (FIG. 5: 123) the Granular Level Category Inclusive of Unique Data Tags, Public Relations (FIG. 6: 115) must, by its very nature, be preceded by the Line Item, Advertising and/or Marketing (FIG. 6: 117) and Advertising and/or Marketing must, by its very nature, be preceded by Sub-Section, Business Development (FIG. 6: 119) and Business Development must, by its very nature, be preceded by Section, Expenses (FIG. 6: 121) and Expenses must, by its very nature, relate to a predictable section of a given Financial Statement (FIG. 6: 123). In the context of this non-limiting example, when considering any other inductive data structure path besides the one presented the data pulled via the API call (FIG. 1: 600) from the Financial Institution Database (FIG. 1: 510) cannot be transformed into valuable information without including superfluous data tags or data bins.

It should be noted, this assimilation mechanism and its associated algorithms are one of the driving forces in uniting data pulled from a Financial Institution Data Base (FIG. 1: 510) to a user's desired reports (FIG. 1: 1000); in keeping with this example, General Purpose Financial Statements (FIG. 5: 123) and a completed IRS Income Filing (FIG. 5: 113). As such, as this assimilation process is totally automated and free of required user involvement the data entry associated with any accounting or tax operation which previously required human performed data entry in operations such as, but not limited to, inputting expense and income records into a given accounting system, are made unnecessary by the exemplary embodiment of CITS shown here.

1.2.4.5 Inductive Data Structure Propagation (FIG. 1: 950)

In keeping with this non-limiting example, the Categorical Transaction Tag (FIG. 1: 930) once coupled with an associated Unique Data Tag (FIG. 1: 945) dictates a specific Data Flow Identified (FIG. 1: 940). As this data flow is designed according to a series of fixed relationships, the population of the most specific and granular level of a given data structure is sufficient to populate all of the preceding levels of that data structure. As such, the inductive data propagation (FIG. 1: 950) described here affects the remainder of the preceding data structure levels associated with a given data structure by populating each with an accurate and descriptive tag which indicates to a given CITS user the report (FIG. 1: 1000) the nature, on a granular and highly descriptive level, of a given transaction or a given grouping of transactions.

To expand on this concept, for the first data structure described, and keeping with FIG. 6, Category Example: Business Accounting beginning with IRS Income Filing (FIG. 6: 113), contains the data flow steps of IRS Income Filing (FIG. 6: 113), Taxonomy Primary Categories (FIG. 6: 111), Taxonomy Sub-Categories (FIG. 6: 109), Taxonomy Granular Categories (FIG. 6: 107), Taxonomy Sub-Granular Categories (FIG. 6: 105) and Taxonomy Tertiary Categories Inclusive of Unique Data Tags (FIG. 6: 103) which are directly related and information updated on a lower level of this data structure will impact the higher levels with additional data population given fixed relationship algorithms thereby creating powerful and valuable financial information which does not require end user involvement or participation on any level. Similarly, in keeping with FIGS. 6A and 6B, the second data structure described beginning with General Purpose Financial Statements (FIG. 6: 123), contains the data flow steps of General Purpose Financial Statements (FIG. 6: 123), Section (FIG. 6: 121), Sub-Section (FIG. 6: 119), Line Items (FIG. 6: 117) and Granular Level Categories (FIG. 6: 115) which are directly related and information updated on a lower level of this data structure will impact the higher levels with additional data population given fixed relationship algorithms thereby creating powerful and valuable financial information which does not require end user involvement or participation on any level. For example, the single data point being discussed here relating to the purchase of Public Relations Services (FIG. 1: 400), done in a Marketing and/or Advertising effort, once described via a Categorical Transaction Tag (FIG. 1: 930) and coupled to a Unique Data Tag (FIG. 1: 945) populates the Granular Level Category Inclusive of Unique Data tags (FIG. 5: 115) of the data structure beginning with General Purpose Financial Statements (FIG. 5: 123) thereby leading to an inductive propagation of the remainder of the data structure. Specifically, this inductive propagation is as follows and is demonstrated as Data Bin Titles as seen on FIG. 6, column "Data Bin Title" and shown as a data flow under column "Data Flow": Public Relations (FIG. 6: 115), Advertising and/or Marketing (FIG. 6: 117), Business Development (FIG. 6: 119), Expenses (FIG. 6: 121) and Profit and Loss Statement (FIG. 6: 123). Similarly, in keeping with the same example and FIGS. 6A and 6B, the single data point being discussed here relating to the purchase of Public Relations Services (FIG. 1: 400), done in a Marketing and/or Advertising effort, once described via a Categorical Transaction Tag (FIG. 1: 930) and coupled to a Unique Data Tag (FIG. 1: 945) populates the Taxonomy Tertiary Category Inclusive of Unique Data tags (FIG. 6: 103) thereby leading to an inductive propagation of the remainder of the data structure. Specifically, this inductive propagation is as follows: Taxonomy Tertiary Category Inclusive of Unique Data tags (FIG. 6: 103), Taxonomy Sub-Granular Categories (FIG. 6: 105), Taxonomy Granular Categories (FIG. 6: 107), Taxonomy Sub-Categories (FIG. 6: 109), Taxonomy Primary Categories (FIG. 6: 111) and the IRS Income Filing (FIG. 6: 113) associated with the type of business employing CITS.

In summary of these data structures as they operate according to Inductive Data Structure Propagation (FIG. 1: 950), given the fixed set of relationships between Unique Data Tags (FIG. 1: 945) and Categorical Transaction Tags (FIG. 1: 930), programmed algorithms (FIG. 1: 900) inherent in CITS inductively propagate the data structure from the most specific level of the data structure towards the most generalized level of the data structure, and therefore taxonomy, such that human performed data entry and categorization inherent in financial analysis, including tax and accounting operations, is entirely removed and automated.

It is most optimal to perform this operation using inductive population as Public Relations must, by its very nature, be preceded by Advertising and/or Marketing and Advertising and/or Marketing must, by its very nature, be preceded by Business Development and Business Development must, by its very nature, be preceded by Expense. When considering this process using deductive reasoning it is now clear that algorithms cannot be created which consistently and accurately predict subsequent and lower levels of a given taxonomy as fixed relationships of this nature do not exist without employing superfluous data tags or additional data structure levels.

As such, it should be clear that given the most detailed and granular Categorical Transaction Tag (FIG. 1: 930) algorithms (FIG. 1: 900) inherent in CITS and the associated data structures and taxonomies eliminate the tedious and error prone task of data entry and categorization as it relates to accounting and tax operations.

1.2.5 Potential User Involvement (FIG. 1: 2000)

There are a variety of ways in which the user may become involved in this process to confirm categorization and data flow (FIG. 1: 2000). One non-limiting example is the user being optionally notified via a Digital Notification (FIG. 1: 2020) that a new transaction, or a group of transactions, has been categorized and the corresponding data has been manipulated and turned into useable information which is manifested on Completed General Purpose Financial Statements (FIG. 1: 1030), Completed Company Books (FIG. 1: 1010) and Completed Tax Filings (FIG. 1: 1040).

This optional notification may act as a mechanism by which the user can ensure that the categorization chosen is correct (FIG. 1: 2010). As such, user involvement of this nature can ensure that the transaction categorization was completed successfully and that the resulting updates impacting the Completed Financial Statements (FIG. 1: 1030) and Completed Tax Filing (FIG. 1: 1040) reflect accurate financial record keeping as determined by the user.

Similarly, the user may wish to be optionally notified of a given transaction categorization, or set of categorization, to monitor spending habits of a given nature. This could act as a mechanism by which business management could become more involved in financial control thereby increasing fiduciary responsibility.

1.2.6 Reports Provided for Analysis (FIG. 1: 1000) to User

The below sections provide a description of Reports (FIG. 1: 1000) which can be provided to the user for analysis used in financial decisions making and to submit complete, thorough and accurate IRS income tax filings (FIG. 1: 1040).

1.2.6.1 Completed Company Books (FIG. 1: 1010)

The first report which the user may choose to analyze could be the completed company books. These would be a reflection of all of the incomes and expenses earned over the relevant time period. Businesses analyzing their books often do so to gain a deeper understanding of their financial position as it might relate to cash position, solvency or the tracing of costs to certain business activities, for example, overhead expenses verse cost of goods sold.

The user will experience the completion of their company books (FIG. 1: 1010) according to reduced data entry and higher accuracy relative to existing or prior art employing double entry accrual or cash based accounting especially when considering the User Confirmation (FIG. 1: 2000) potentially inherent in this process.

1.2.6.2 Completed Financial Statement (FIG. 1: 1030)

Another set of reports which the user could analyze in order to understand the financial health of the company and/or make fiduciary decisions would be Completed General Purpose Financial Statements (FIG. 1: 1030). According to this non-limiting example, the general purpose financial statements would be a balance sheet and profit and loss statement.

The user will experience the completion of their Financial Statements (FIG. 1: 1030) according to reduced data entry and higher accuracy relative to existing or prior art employing double entry accrual or cash based accounting especially when considering the User Confirmation (FIG. 1: 2000) potentially inherent in this process.

1.2.6.3 Completed Tax Filings (FIG. 1: 1040)

Another report which the user could use to satiate IRS requirements would be the Completed Tax Filings (FIG. 1: 1040). This report would be predominantly used to satiate US law such that the business employing CITS pay the appropriate amount of tax dues required per their corresponding IRS income filing and relevant IRS Code and US tax law.

Additionally, this report can also serve a secondary purpose. Specifically, the user would be aware of their coming tax dues essentially in real time throughout the tax year. This would allow for better financial planning in regards to coming tax dues, an expense which can often destabilize some small and medium sized businesses as this expense is often not considered in financial planning in entities of this type.

As seen in FIGS. 1A and 1B, there are a number of other report options. These reports, and those shown above, are non-limiting examples of potential reports which might be created and implemented via CITS. Additionally, the reports not listed above relate to the Backup Data sections which are shown below in Section 1.3.8.2 Backup Data. Additional reporting options could be known or become apparent to those skilled in the art upon practical employment of Inductive Data Structure Propagation or further analysis of the art shown in this document.

1.2.7 User Action (FIG. 1: 3000)

As a result of the reports created, the user could take a number of Actions (FIG. 1: 3000) to better develop their business and exercise superior financial planning Specifically, the user may use the Completed Company Books (FIG. 1: 1010) to better understand the financial position of the company and perform ratio analysis (FIG. 1: 3000) which might be helpful in determining fiduciary decisions such as if it is advantageous or strategic to expand or contract operations. The user may also use Completed Financial Statements (FIG. 1: 1030) to understand (FIG. 1: 3000) the cash position of the business or identify segments which generate more revenue or profit relative to other segments. Another possible action the User may take would be to submit (FIG. 1: 3000) the Completed Tax Filings (FIG. 1: 1040) to the IRS. By employing CITS the IRS filing report would be highly accurate, thorough, timely and complete.

1.3 Example and Comparison of Primary Accounting Operations

To illustrate the substantial decrease of data entry; decrease of errors originating from incorrect and/or inconsistent data entry; superior categorization of financial transactions; and enhanced information creating process when employing CITS, specific, but non-limiting, examples are provided below for each primary accounting operation.

For clarity, each of these primary accounting operations are firstly demonstrated according to the process inherent in accrual accounting and, after which, each of these primary accounting operations are demonstrated according to the process inherent in CITS. This structure should provide, to those skilled in the art, a comparison of this new art relative to prior art. Accordingly, the benefits and inventive nature of CITS should become obvious as it relates to these non-limiting and exemplary primary accounting operations which are namely: Accounts Payable; Expenses Paid Digitally; Expenses Paid with Cash or Check; Check Transactions when Check Written in Native Accounting Software and Employee Reimbursement Procedure; Accounts Receivable; Income Received Digitally; Income Received via Cash or Check and Reconciliation.

1.3.1 Example and Comparison: Accounts Payable (A/P)

Traditionally, the (A/P) process usually involves reviewing an enormous amount of detail to ensure that only legitimate and accurate amounts are entered in the accounting system. The sources where this information originates from are usually, but not limited to: purchase orders, receiving reports, invoices from vendors and contracting or other agreements. This process is further influenced by human performed data entry; timely processing of accurate and legitimate vendor invoices and accurate recording in the appropriate general ledger accounts. Depending on the size and complexity of a given transaction, accounts payable can require dozens of steps all influenced and conducted by human performed data entry in conjunction with some level of computer automation.

This process is of paramount importance as in virtually all scenarios the accuracy and completeness of financial statements are dependent, at least in part, on the accounts payable process. The accounts payable process is also vital as a business's cash position, credit rating and relationship with suppliers can be heavily influenced, if not determined, by accounts payable practices.

A simplified example of a single accounts payable process begins with a liability created through goods or services being acquired on credit, usually as shown on a vendor invoice. When the company receiving these goods or services pays down this credit the account is debited to a lesser balance, zero or a negative balance in some incidents indicating an existing credit. The completion of this cycle indicates that for a given vendor the company has no debt, outstanding balances, or remaining payments for the time period in question.

FIG. 8, Recording and Settling Accounts Payable According to Accrual Accounting, shows a basic visual example of the A/P process when accrual accounting is employed.

In speaking to a non-limiting example of an A/P process when CITS is employed, when an individual making a purchase on behalf of the company engages in a transaction (FIG. 1: 400) via A/P such that the expense is carried on an open account the data associated with that transaction, such as, but not extending or limiting to: amount, date, and Categorical Transactions Tags (FIG. 1: 930) is pulled by the API call (FIG. 1: 600). Once the API call (FIG. 1: 600) is executed the associated data is verified and organized on backend servers and databases (FIG. 1: 900) according to the previously defined proprietary data structure and programmed algorithms (FIG. 1: 700) designed to facilitate and support CITS.

This data structure and associated algorithms explained (FIG. 1: 700) can operate such that each Data Point Identified (FIG. 1: 920) from a given execution of the API call (FIG. 1: 600) is updated into tables and fields corresponding to a specific and unique user identification code. These fields, and ultimately tables, are used to populate General Purpose Financial Statements (FIG. 5: 123) and the corresponding IRS Income Filing (FIG. 5: 113) using the predefined Inductive Data Structure Propagation (FIG. 1: 950). The data pulled during the API call (FIG. 1: 600) and its corresponding changes, resulting from the defined programmed algorithms and data structures (FIG. 1: 700) impacts General Purpose Financial Statements (FIG. 5: 123) such that the A/P liability is inputted and the necessary debits and credits of relevant accounts is executed without human performed data entry or manipulation.

A/P liabilities incurred as well as the related debit of a corresponding account, often an inventory account, per traditional accounting standards, must be attributed to a specific source. In the case of CITS, this source is Granular Level Categories Inclusive of Unique Data Tags (FIG. 5: 115) and/or Taxonomy Tertiary Categories Inclusive of Unique Data Tags (FIG. 5: 103) depending on the report type desired by the user.

Below is a description of this process shown through an exemplary transaction (FIG. 1: 400) in which a user purchases goods and/or services on credit thereby servicing an open account with that user's vendor. This single embodiment is not intended to be binding but instead illustrative in regards to instructive purposes.

The data is organized according to a proprietary data structure. This data structure is the governing matrix for all user information; however, each user's information is delineated according to globally unique identifiers such as user identification code. This data structure operates such that the new information pulled from each API call (FIG. 1: 600) is updated into tables and fields corresponding to a specific user identification code. The API call (FIG. 1: 600) and its corresponding changes impacting General Purpose Financial Statements (FIG. 5: 123) is sufficient to indicate and execute debits and credits of accounts and show the status of accounts payable as settled or outstanding.

The increase in accounts payable (FIG. 9: 4010), per traditional accounting standards and IRS requirements, must be attributed to a specific source. In the case of CITS, this source is a category and in this case is Granular Level Categories Inclusive of Unique Data Tags (FIG. 5: 115) and/or Taxonomy Tertiary Categories Inclusive of Unique Data Tags (FIG. 5: 103) depending on the report type desired by the user. As such, accounts payable is composed of many sub-accounts, specifically Granular Level Categories Inclusive of Unique Data Tags (FIG. 5: 115) and/or Taxonomy Tertiary Categories Inclusive of Unique Data Tags (FIG. 5: 103) depending on the report type desired by the user, which are created and when aggregated represent A/P in its entirety. Specifically, when a user engages in a transaction (FIG. 1: 400) the sub-account, relating to Granular Level Categories Inclusive of Unique Data Tags (FIG. 5: 115) and/or Taxonomy Tertiary Categories Inclusive of Unique Data Tags (FIG. 5: 103) depending on the report type desired by the user, is credited which results in the total outstanding balance of accounts payable increasing by an equal amount.

When a user engages in the corresponding transaction (FIG. 9: 4030) which leads to settling, perhaps partially, accounts payable this is again detected by the API call (FIG. 1: 600). This instance of the API call detects that funds, either through an increase of a credit card balance or decrease of a cash balance (FIG. 9: 4040), have been spent and that outlay of funds corresponds to a given Granular Level Categories Inclusive of Unique Data Tags (FIG. 5: 115) and/or Taxonomy Tertiary Categories Inclusive of Unique Data Tags (FIG. 5: 103) depending on the report type desired by the user. Because each transaction is algorithmically assigned a given Categorical Transaction Tag (FIG. 1: 930), the existing balance of the specific sub-category of the broader category, accounts payable, is decreased according to the amount of the transaction which therefore decreases accounts payable by the same amount (FIG. 9: 4050). This is accompanied by a credit, usually, in the cash account (FIG. 8: 4040). As the typical accounting operations are complete the General Purpose Financial Statements (FIG. 5: 123) are adjusted (FIG. 9: 4070) reflecting the decrease of the cash account, the settling of accounts payable and frequently a change in an inventory account. Similarly, the IRS Income Filing (FIG. 5: 113) is adjusted (FIG. 9: 4080) with the corresponding and necessary accounting information generated as a result of the given A/P transaction.

If the user has not fully settled accounts payable for the relevant time period they may choose to restart the process at (FIG. 9: 4030). As a result of the extensive data pulled through the API call (FIG. 1: 600), the nature of CITS, proprietary program algorithms and the corresponding data structures (FIG. 1: 700), the human performed data entry shown in FIG. 8, Recording and Settling Accounts Payable According to Accrual Accounting is significantly decreased from seven or more potential touch points to a single touch point, creating the purchase order. Additionally, data entry error rates as a result of incorrectly or inconsistently entered data and the data itself is categorization according to transaction type in a superior way relative to existing art.

As a result of the report provided to the user indicating the outstanding balance of accounts payable, the user could be triggered to settle, perhaps partially or totally, the balance of accounts payable. The payment method used would be an automated clearing house payment which was initiated with the financial institution using multi-factor authentication which could be question based, code based, or selections based. Upon the user satiating the multi-factor authentication with the relevant financial institution the relevant account information would be gathered and stored, perhaps in a derivative table, wherein the relevant account information could extend, but not be limited, to routing numbers or other transfer related account identifiers.

FIG. 9, Recording and Settling Accounts Payable According to CITS is a visual demonstration of the A/P process as previously explained.

The user has no guaranteed point in the series of operations demonstrated in FIG. 9 where human performed data entry or manipulation is needed besides the initial creation of the purchase order (FIG. 9: 4000). This culminates in a user experience by which the user can receive a notification (FIG. 9: 4060), digitally delivered, that informs the user that the accounting associated with a given A/P item is completed and this new data has been inputted into General Purpose Financial Statements (FIG. 5: 123) and/or IRS Income Filing (FIG. 5: 113). The user can choose to examine the changes by viewing and/or interacting with Completed Company Books (FIG. 1: 1010), Completed Financial Statements (FIG. 1: 1030) and/or Completed Tax Filings (FIG. 1: 1040). Conversely, the user may also dismiss the notification.

1.3.1.1 Improvements when Using CITS for Accounts Payable Relative to Accrual or Cash Accounting This is a distinct improvement as no digital transaction requires human performed data entry or manipulation in the accounts payable processes after the purchase order is created and issued. As such, a significant time savings is created while simultaneously reducing the error rate associated with human performed data entry and/or manipulation which can originate from incorrectly or inconsistently entered information. Similarly, the financial transaction themselves are categorized in a superior way as the nature of the transaction itself becomes obvious without superfluous or unnecessary data tags such as tying the data point to an individual name.

1.3.2 Example and Comparison: Expenses Paid Digitally

Traditionally, the expense process has required that the individual making the purchase on behalf of the company keep the receipt or vendor invoice to allow its data to be manually entered at a later time. This typically results in a credit of the cash account and a debit of an account relating to the goods or services purchased, often an inventory or expense account. This leads to changes of General Purpose Financial Statements and IRS Income Filings.

For example, in keeping with the same embodiment, this would take place when an individual on behalf of the company engages in the purchase of an advertising service for public relations using a debit card. FIG. 10 Recording Expenses According to Accrual Accounting shows a basic visual example of the expense process when accrual based accounting is employed.

In speaking to the process of inputting and recording digital expenses according to CITS, and taking a non-limiting example, which is an individual making a purchase on behalf of the company engaging in a transaction (FIG. 1: 400) for advertising expenses the data associated with that transaction, such as, but not extending or limiting to: amount, date, and Categorical Transactions Tags (FIG. 1: 930) is pulled by the API call (FIG. 1: 600). Once the API call (FIG. 1: 600) is executed the associated data is verified and organized on backend servers and databases (FIG. 1: 900) according to the previously defined proprietary data structure and programmed algorithms (FIG. 1: 700) designed to facilitate and support CITS.

This data structure and associated algorithms explained (FIG. 1: 700) can operate such that each Data Point Identified (FIG. 1: 920) from a given execution of the API call (FIG. 1: 600) is updated into tables and fields corresponding to a specific and unique user identification code. These fields, and ultimately tables, are used to populate General Purpose Financial Statements (FIG. 5: 123) using the pre-defined Inductive Data Structure Propagation (FIG. 1: 950). The data pulled during the API call (FIG. 1: 600) and its corresponding changes, resulting from the defined programmed algorithms and data structures (FIG. 1: 700) impacts General Purpose Financial Statements (FIG. 5: 123) such that the expense is inputted and the necessary debits and credits of relevant accounts is executed without human performed data entry or manipulation.

Expenses incurred, per traditional accounting standards and IRS requirements, must be attributed to a specific source. In the case of CITS, this source is Granular Level Categories Inclusive of Unique Data Tags (FIG. 5: 115) or Taxonomy Tertiary Categories Inclusive of Unique Data tags (FIG. 5: 103).

As the user engages in an expense transaction (FIG. 1: 400) which is settled at a single point of time, only one instance of the API call (FIG. 1: 600) is required to credit (FIG. 11: 4100) and debit (FIG. 11: 4110) the affected accounts; adjust general purpose financial statements (FIG. 11: 4120) and update IRS Income Filings (FIG. 11: 4130) per the programmed algorithms and data structures (FIG. 1: 700) previously defined. To ensure accuracy, the user is optionally sent a digital notification (FIG. 1: 2020) which ensures that the category algorithmically assigned (FIG. 1: 2010) is accurate and therefore the associated data entry has been correctly completed. As such, CITS, as it is embodied here, employs a direct user interface (FIG. 1: 2000) by which the user can provide feedback to ensure that categorization (FIG. 1: 950), or other automated data entry and/or categorization, is completed correctly and in a superior way relative to existing transaction categorization algorithms and methods.

As a result of the extensive data pulled through the API call (FIG. 1: 600), the nature of CITS and the pre-defined programmed algorithms and data structures (FIG. 1: 700), the human performed data entry shown in FIG. 10 is entirely removed and the process is instead completed in a totally automated fashion.

FIG. 11, Recording Digital Expenses According to CITS is a visual demonstration of the expense transaction, keeping with the same embodiment, process when governed by CITS.

1.3.2.1 Improvement when Using CITS for Expenses Paid Digitally Relative to Accrual or Cash Accounting Employing CITS over accrual accounting is a distinct improvement as the exemplary expense transaction discussed (FIG. 1: 400) requires no human performed data entry or manipulation. When using accrual based accounting this process would have required up to, but not necessarily limited to, five human dependent data entry steps. As such, a significant time savings is created while simultaneously reducing the error rate associated with human performed and/or computer aided data entry and/or manipulation. As such, a significant time savings is created while simultaneously reducing the error rate associated with human performed data entry and/or manipulation which can originate from incorrectly or inconsistently entered information. Similarly, the financial transaction themselves are categorized in a superior way as the nature of the transaction itself becomes obvious without superfluous or unnecessary data tags such as tying the data point to an individual name.

The processes totally free of human performed data entry and manipulation, in the context of this single embodiment, extends to: gathering and inputting relevant financial data (FIG. 1: 600); crediting (FIG. 11: 4100) and debiting (FIG. 11: 4110) relevant accounts; adjusting general purpose financial statements (FIG. 11: 4120) and inputting relevant information into IRS Income Filings (FIG. 11: 4130).

1.3.3 Example and Comparison: Expenses Paid with Cash or Hand Written Check

Referring to FIG. 12, in the event the user has an expense transaction (FIG. 12: 4200) which was conducted via a transaction where payment was exchanged by cash or check the process gains one human dependent data entry point. However, the technical source of this data entry point is different for cash and check expense transactions.

When a user withdraws cash (FIG. 12: 4210) the API call (FIG. 1: 600) pulls data which once passed through programmed algorithms (FIG. 1: 900) detects where this withdrawal took place, what time and how much money was withdrawn. However, this leaves the cash withdrawn not tied to a specific transaction therefore there is no algorithmically assigned Granular Level Categories Inclusive of Unique Data Tags (FIG. 5: 115) and/or Taxonomy Tertiary Categories Inclusive of Unique Data Tags (FIG. 5: 103). As a result the user will receive a digital notification (FIG. 12: 4220) which will request the user to provide two levels of needed financial information. The first question will ask the user if a split option is required. The second question will ask the user to assign a Granular Level Categories Inclusive of Unique Data Tags (FIG. 5: 115) and/or Taxonomy Tertiary Categories Inclusive of Unique Data Tags (FIG. 5: 103), depending on the report type desired by the user, for which that cash expenditure was attributed to.

Similarly, when a check which is written (FIG. 12: 4210) for an expense transaction clears after cashing or deposit, the API call (FIG. 1: 600) pulls data which once is subjected to the process steps inherent in Data Applied to Taxonomy (FIG. 1: 700) detects when the check was cashed and how much the check was. As the API call (FIG. 1: 600) does not tie the cash account credit to a specific transaction and therefore does not provide an algorithmically assigned Granular Level Categories Inclusive of Unique Data Tags (FIG. 5: 115) and/or Taxonomy Tertiary Categories Inclusive of Unique Data Tags (FIG. 5: 103), depending on the report type desired by the user, the user will receive a digital notification (FIG. 12: 4220) in which the user selects a split option, if necessary, and inputs the Granular Level Categories Inclusive of Unique Data Tags (FIG. 5: 115) and/or Taxonomy Tertiary Categories Inclusive of Unique Data Tags (FIG. 5: 103), depending on the report type desired by the user. This process is visually shown as FIG. 12, Recording Expenses Paid with Cash or Hand Written Check According to CITS.

Once the user responds to the digital notification (FIG. 12: 4220), the appropriate cash account is credited (FIG. 12: 4230), the associated expense account is debited (FIG. 12: 4240), Completed Financial Statements (FIG. 1: 1030) are adjusted (FIG. 12: 4250) and Completed Tax Filings (FIG. 1: 1040) are adjusted (FIG. 12: 4260) after which the process is complete.

1.3.4 Example and Comparison: Check Transaction when Check Written in Native Accounting Software and Employee Reimbursement Procedure Referring to FIG. 13, when an individual making a purchase on behalf of the company engages in an expense transaction (FIG. 13: 4310) in which the payment method was check and the check was created in an accounting software natively designed to facilitate CITS (FIG. 13: 4300) there is a different series of operations relative to FIG. 11 and FIG. 12.

The user begins this operation according to the well-known process of creating a check which usually involves inputting the amount, date, payee and memo; however, diverging from the typical steps involved in this process the user will also assign a Categorical Transaction Tag (FIG. 1: 930) indicating the nature of the transaction (FIG. 13: 4300).

At this point, the expense has been inputted into an accounting software natively designed to facilitate CITS and the Categorical Transaction Tag (FIG. 1: 930) has been assigned. Subsequently, when the check is cashed by the payee the API call (FIG. 1: 600) will pull this information; however, the specific transaction has no algorithmically assigned Categorical Transaction Tag (FIG. 1: 930) matching it to the check created. As a result, the user will receive a digital notification (FIG. 13: 4320) where they can either assign a Categorical Transaction Tag (FIG. 1: 930) or match the expense to a previously written check corresponding the relevant transaction which was pulled by the API call (FIG. 1: 600). It should be noted, the transactions represented by written checks but not assigned a specific Categorical Transaction Tag (FIG. 1: 930) as it relates to a specific transaction pulled by the API call (FIG. 1: 600) do not impact accounting operations until that check is assigned to a given transaction pulled by the API call (FIG. 1: 600).

Similarly, as it relates to employee reimbursement, in the event an employee purchases goods or services on behalf of the company using his/her personal funds, the employee will need to be reimbursed. The user can facilitate this process by conducting the same series of process steps previously defined, namely, process steps Check Written and Categorical Transaction Tag Applied (FIG. 13: 4300) and user Receives Digital Notification and Matches Transaction to Corresponding Check (FIG. 13: 4320). A split option is also included to allow the user to compensate the employee for multiple purchases which do not relate to the same Categorical Transaction Tag (FIG. 1: 930).

Once the user responds to the digital notification (FIG. 13: 4320), the process steps demonstrated as Data Applied to Taxonomy (FIG. 1: 700), are executed. Accordingly, the appropriate cash account is credited (FIG. 13: 4330), the associated expense account is debited (FIG. 13: 4340), the Completed Financial Statements (FIG. 1: 1030) are adjusted (FIG. 13: 4350), and the Complete Tax Filings (FIG. 1: 1040) are adjusted (FIG. 13: 4360) after which the process is complete.

This process is visually demonstrated below as FIG. 13, Check Transaction when Check Written in Native Accounting Software and Employee Reimbursement Procedure.

1.3.4.1 Improvement when Using CITS for Expenses Paid in a Using Cash or Check Relative to Accrual or Cash Accounting As seen by the discrepancies associated with these two separate accounting methodologies which are illustrated across different types of expense embodiments, CITS is highly advantageous. By changing the nature of the data entry, aggregation and calculation processes and instituting an API call (FIG. 1: 600), a significant portion of the human performed data entry and calculation processes present in accrual or cash accounting has been eliminated. Removing the data entry process alleviates the previously described problematic nature of data entry whether executed by a computer or a human; specifically, high incorrect or inconsistent data entry error rates. Similarly, the interdependent failure of using only human dependent data entry or only computer generated data entry has been overcome as the algorithmically assigned Categorical Transaction Tags (FIG. 1: 930) coupled with a Unique Data Tag (FIG. 1: 945), which is verified by the user (FIG. 1: 2000), provides for a computer's lack of ingenuity and critical thinking while the removal of the individual tied to the transaction eliminates much of the human generated sources of error during data entry. Accordingly, a significant time savings is created while simultaneously reducing the error rate associated with human performed data entry and/or manipulation which can originate from incorrectly or inconsistently entered information. Similarly, the financial.

1.3.5 Example and Comparison: Accounts Receivable (A/R)

Accounts Receivable is the process by which a company engages in transactions such that they provide goods and/or services on credit thereby servicing an open account with that customer. A simplified example of accounts receivable takes place when the company sells goods or services on credit affectively servicing that customer's open account. The transaction amount is considered an asset therefore a debit of the amount is applied to accounts receivable and a credit of the same amount applied to a revenue account.

FIG. 14, Recording and Settling Accounts Receivable According to Accrual Accounting demonstrates a basic example visually of A/R when governed according to accrual accounting.

In speaking to the A/R process when CITS is employed, and similar to accrual accounting, A/R is characterized such that receiving money is one of the last steps. As a result, as it relates to CITS, photo documentation, employing a screen crawler, has been implemented to facilitate automation and to supplement the API call (FIG. 1: 600). The data pulled from the photo documentation process is organized according to a proprietary data structure and programmed algorithms developed using a commercially available software developer's kit as it relates to screen crawling and photo documentation.

This data structure operates such that the new information gathered from the photo documentation is updated into tables and fields corresponding to a specific user identification number. These fields, and ultimately tables, are used to populate General Purpose Financial Statements (FIG. 5: 123). The photo documentation and its corresponding changes impacting General Purpose Financial Statements (FIG. 5: 123) is sufficient to execute the necessary debits and credits of relevant accounts.

Per traditional accounting standards and IRS requirements, increases in accounts receivable and the corresponding credit applied to income must be attributed to a specific source. In the case of CITS this source is a Granular Level Categories Inclusive of Unique Data Tags (FIG. 5: 115) and/or Taxonomy Tertiary Categories Inclusive of Unique Data Tags (FIG. 5: 103). As such, accounts receivable is composed of many sub accounts which are created around Granular Level Categories Inclusive of Unique Data Tags (FIG. 5: 115) and Taxonomy Tertiary Categories Inclusive of Unique Data Tags (FIG. 5: 103). For example, when a user engages in a transaction the sub-account, created for a specific Categorical Transaction Tag (FIG. 1: 930), is debited which results in the total balance of accounts receivable increasing by an equal amount.

Referring to FIG. 15, specifically considering this process according to an exemplary but non-limiting example, when a user receives a purchase order (FIG. 15: 4400) it needs to be inputted into the native accounting system designed to facilitate CITS. This is accomplished by the user directly interfacing with this native accounting system and inputting the purchase order using the previously described photo documentation process facilitated by a screen crawler (FIG. 15: 4405). Accordingly, the user would then provide the customer with the goods or services (FIG. 15: 4410) and similarly an Invoice is sent to customer (FIG. 15: 4415). As the relevant financial information was provided by receiving the purchase order (FIG. 15: 4400) and inputting it into the native accounting software via photo documentation (FIG. 15: 4405), accounts receivable is debited (FIG. 15: 4420) and a credit is applied to income (FIG. 15: 4425) according to the financial information provided. Accordingly, when the customer engages in the corresponding transaction (FIG. 15: 4430) which leads to settling, perhaps partially, accounts receivable this is detected by the regular execution of the API call (FIG. 1: 600) according to the pre-defined Data Interface (FIG. 1: 910). The API call (FIG. 1: 600) detects that funds, through an increase of the cash account, have been earned on behalf of a specific Categorical Transaction Tag (FIG. 1: 930) which represents a Granular Level Categories Inclusive of Unique Data Tags (FIG. 5: 115) and/or Taxonomy Tertiary Categories Inclusive of Unique Data Tags (FIG. 5: 103) which corresponds to a given subcategory of A/R. Because each transaction is algorithmically assigned to a specific Categorical Transaction Tag (FIG. 1: 930) the existing balance tied to that sub-account of A/R is credited (FIG. 15: 4435) according to the amount of the transaction and income is debited by the same amount (FIG. 15: 4440). As the typical accounting operations are completed the Completed Financial Statements (FIG. 1: 1030) are adjusted (FIG. 15: 4445) reflecting the increase of the cash account, the settling of accounts receivable and frequently a decrease of an inventory account. Similarly, the Completed Tax Filings (FIG. 1: 1040) are adjusted (FIG. 15: 4450) to reflect current liabilities. The user can be optionally notified that the accounting operations have been executed via a digital notification (FIG. 15: 4455).

As a result of the extensive data pulled through the API call (FIG. 1: 600) and the nature of CITS the human performed data entry shown in FIG. 14, Recording and Settling Accounts Receivable According to Accrual Accounting is reduced to a single point, inputting the purchase order into the native accounting software designed to facilitate CITS (FIG. 15: 4405).

FIG. 15, Recording and Settling Accounts Receivable According to CITS is a visual demonstration of the A/R process when governed according to CITS.

1.3.5.1 Improvements when Using CITS for Accounts Payable Relative to Accrual or Cash Accounting This is a distinct improvement as much of the human performed data entry and manipulation associated with accounts receivable is eliminated. As such, a significant time savings is created while simultaneously reducing the error rate associated with human performed data entry and/or manipulation.

As such, a significant time savings is created while simultaneously reducing the error rate associated with human performed data entry and/or manipulation which can originate from incorrectly or inconsistently entered information. Similarly, the financial transaction themselves are categorized in a superior way as the nature of the transaction itself becomes obvious without superfluous or unnecessary data tags such as tying the data point to an individual name.

The processes totally free of human performed data entry and manipulation extends to crediting and debiting relevant accounts; adjusting general purpose financial statements and the reporting of tax return income.

Inputting the purchase order is also improved as customized optical character recognition software is employed to eliminate the often error prone process of human performed data entry.

1.3.6 Example and Comparison: Income Received Digitally

Income garnering transactions are those in which goods or services are provided by the company to a customer and the payment thereof is settled within a single transaction. This typically results in a debit of the cash account and a credit of an account relating to the good or service purchased, usually an inventory account.

Traditionally, this process has required that the individual making the sale on behalf of the company keep the receipt to allow its data to be manually entered into an invoice at a later time. However, CITS accomplishes this data entry by pulling data from the previously described API call (FIG. 1: 600) and then manipulating it according to CITS leading to Completed Financial Statements (FIG. 1: 1030) and Completed Tax Filings (FIG. 1: 1040).

For example, this would take place when a customer purchases goods or services from a company and pays for them using a debit card or cash. FIG. 16, Recording Income According to Accrual Accounting shows a basic visual example of the income process.

In speaking to the process of inputting and recording digital incomes according to CITS, and taking a non-limiting example, which is an individual making a sale on behalf of the company (FIG. 1: 400), the data associated with that transaction, such as, but not extending or limiting to: amount, date, and Categorical Transaction Tags (FIG. 1: 930) is pulled by the API call (FIG. 1: 600). Once the API call (FIG. 1: 600) is executed the associated data is verified and organized on backend servers and databases according to Data Applied to Taxonomy (FIG. 1: 700) designed to facilitate and support CITS.

The Data Applied to Taxonomy (FIG. 1: 700) as explained can operate such that each Data Point Identified (FIG. 1: 920) from a given execution of the API call (FIG. 1: 600) is updated into tables and fields corresponding to a specific and unique user identification code. These fields, and ultimately tables, are used to populate General Purpose Financial Statements (FIG. 5: 123) using the pre-defined Inductive Data Structure Propagation (FIG. 1: 950). The data pulled during the API call (FIG. 1: 600) and its corresponding changes, resulting from the Data Applied to Taxonomy (FIG. 1: 700) impacts general purpose financial statements such that the expense is inputted and the necessary debits and credits of relevant accounts is executed without human performed data entry or manipulation.

Incomes realized, per traditional accounting standards and IRS requirements, must be attributed to a specific source. In the case of CITS, this source is Granular Level Categories Inclusive of Unique Data Tags (FIG. 5: 115) and/or Taxonomy Tertiary Categories Inclusive of Unique Data Tags (FIG. 5: 103).

Referring to FIG. 17, specifically to further expand on the recording of digitally received income when goods or services are sold on behalf of the company (FIG. 14: 4500), payment is immediately tendered. After payment is provided, it is detected via the previously defined API call (FIG. 1: 600) according to the Data Interface (FIG. 1: 910) and the information associated with that transaction is pulled.

This data structure associated operates such that the new information pulled from each API call (FIG. 1: 600) is updated into tables and fields corresponding to a specific user identification number. These fields, and ultimately tables, are used to populate General Purpose Financial Statements (FIG. 5: 123) and IRS Income Filings (FIG. 5: 113). The API call (FIG. 1: 600) and its corresponding changes impacting general purpose financial statements (FIG. 5: 123) is sufficient to input the income and indicate and execute relevant debits and credits of accounts.

Specifically, the income realized (FIG. 17: 4500), per traditional accounting standards and IRS requirements, must be attributed to a specific source. In the case of CITS, this source is a Granular Level Categories Inclusive of Unique Data Tags (FIG. 5: 115) and/or Taxonomy Tertiary Categories Inclusive of Unique Data Tags (FIG. 5: 103). As such, the general income account is composed of many income sub-accounts which are created around these categories. Specifically, when a user engages in an income garnering transaction (FIG. 17: 4500) the income sub-account, created for a specific Granular Level Categories Inclusive of Unique Data Tags (FIG. 5: 115) and/or Taxonomy Tertiary Categories Inclusive of Unique Data Tags (FIG. 5: 103) is tied to a corresponding Categorical Transactions Tag (FIG. 1: 930), is debited which results in the general income account increasing by an equal amount (FIG. 17: 4510) and the associated account, usually an inventory account, is credited (FIG. 17: 4520).

As the user is engaging in an income transaction which is settled at a single point of time, only one instance of the API call (FIG. 1: 600) is required to debit (FIG. 17: 4510) and credit (FIG. 17: 4520) the affected accounts; adjust general purpose financial statements (FIG. 17: 4530) and update IRS Income Filings and Schedules (FIG. 17: 4540). This API call detects that funds, through an increase of the cash account, have been realized for a specific Categorical Transaction Tag (FIG. 1: 930). The user can optionally be notified that (FIG. 17: 4550) via a digital notification that the transaction has been successfully recorded into the company's Completed Company Books (FIG. 1: 1010), Completed Financial Statements (FIG. 1: 1030) and Completed Tax Filings (FIG. 1: 1040).

As a result of the extensive data pulled through the API call (FIG. 1: 600) and the nature of CITS the human performed data entry shown in FIG. 16, Recording Income According to Accrual Accounting is completed in a totally automated fashion the user is not involved in.

FIG. 17, Recording Digital Income According to CITS is a visual demonstration of the income transaction process when governed by CITS.

1.3.6.1 Improvement when Using CITS for Income Received Digitally Relative to Accrual or Cash Accounting This is a distinct improvement as no digital transaction requires human performed data entry or manipulation in the income transaction operation or associated invoicing processes. As such, a significant time savings is created while simultaneously reducing the error rate associated with human performed data entry and/or manipulation.

This is a distinct improvement as much of the human performed data entry and manipulation associated with incomes is entirely eliminated. As such, a significant time savings is created while simultaneously reducing the rate associated with human performed data entry and/or manipulation. As such, a significant time savings is created while simultaneously reducing the error rate associated with human performed data entry and/or manipulation which can originate from incorrectly or inconsistently entered information. Similarly, the financial transaction themselves are categorized in a superior way as the nature of the transaction itself becomes obvious without superfluous or unnecessary data tags such as tying the data point to an individual name.

The processes totally free of human performed data entry and manipulation extends to crediting and debiting relevant accounts; adjusting General Purpose Financial Statements (FIG. 5: 123) and inputting relevant information into IRS Income Filings (FIG. 5: 113).

1.3.7 Example and Comparison: Income Received via Cash or Check

In the event the user has an income garnering transaction (FIG. 1: 400) which was conducted via a transaction where payment was made by cash or check, the process gains one human performed data entry point.

Referring to FIG. 18, specifically to expand on this concept, when goods and/or services are sold on behalf of the company and payment is received from the customer via cash or check (FIG. 18: 4600) and, subsequently, when the user deposits cash from the transaction (FIG. 18: 4610) or cashes the check received as payment (FIG. 18: 4610), the previously described API call pulls (FIG. 1: 600) where this deposit took place; the date and time and how much money was deposited. However, this leaves the cash deposited not tied to a specific transaction therefore there is no algorithmically assigned Categorical Transaction Tag (FIG. 1: 930) and the user must instead assign this Categorical Transaction Tag (FIG. 1: 930). When the API call (FIG. 1: 600) is run and a cash deposit or check clearing is detected the user will receive a digital notification (FIG. 18: 4620) which will request the user to provide two levels of needed financial information. The first question will ask the user if a split option is required. The second question will ask the user to assign the Categorical Transaction Tag (FIG. 1: 930) which that cash deposit or check clearing was attributed to. After the user inputs the necessary information the account associated with the income transaction, usually an inventory account, is credited (FIG. 18: 4630) and the income account is debited (FIG. 18: 4640). After which, the General Purpose Financial Statements (FIG. 5: 123) are adjusted (FIG. 18: 4650) and the IRS Income Filings (FIG. 5: 113) are adjusted (FIG. 18: 4660) to reflect current liabilities.

This process is visually demonstrated, titled as FIG. 18, Recording Income Received via Cash or Check According to CITS.

1.3.8 Example and Comparison: Reconciliation

Using traditional accounting practices a company's general ledger account is made up of a record of all transactions which took place that involved that company's checking account. Similarly, the banking institution where that checking account is housed also creates a record of the same checking account concerning checks, deposits, service charges and other items are processed.

Reconciliation usually takes place shortly after the close of each month when the bank statement is received by the company. At this point, the bank statement is compared to the general ledger for discrepancies, errors and inaccuracies; this comparison and error remediation step is usually referred to as balance per books. This process is focused on verifying the amount on the bank statement with the amount shown on the general ledger, usually the cash account. The benefit to this process is ensuring the amount of cash shown on the company's books is equal to the amount of cash shown on the bank statement.

Reconciling the amount shown on the general ledger and the bank statement can be very time consuming and may even constitute hundreds of individual steps each requiring human performed data entry and/or manipulation. Difficulties always arise in specific instances such as the bank decreasing the company's bank account without informing the company—this usually takes place when a bank charges a service fee which is deducted at the end of the month, companies do not become aware of these until receiving the bank statement at the beginning of the following month. Additional sources of difficulty arise from errors in human performed data entry and manipulation such as incorrectly inputting an income or expense. Many instances like this may arise but they each are problematic as it will cause the bank statement and general ledger to be inconsistent relative to one another.

These inaccuracies lead to the necessity of adjusting transactions which were recorded in error or correcting any items missing from the bank statement. This process constitutes adjusting the Company's general ledger, usually the cash account, so that it reflects a true balance.

FIG. 19, Reconciliation According to Traditional Accounting Standards shows an example table of this accounting process as it has traditionally been accomplished.

CITS automates this process as it has access to all information that is on a bank statement by pulling that information via the previously described API call (FIG. 1: 600). As discussed, data for each transaction is mined directly from the financial institution's database (FIG. 1: 510) via this API call (FIG. 1: 600).

Referring to FIG. 20, demonstrated below are several applications of this method pertaining to the sources which generate the need for adjustments, namely: Bank service charges (FIG. 20: 4700), Not sufficient funds (FIG. 20: 4710), Interest earned (FIG. 20: 4720), Deposits in transit (FIG. 20: 4730), Bank errors (FIG. 20: 4740) and Errors in the Company's general ledger (FIG. 20: 4750). It is unnecessary for the user to take action as the process is facilitated in an automated fashion with only one source of information: the banking institution itself.

Bank service charges (FIG. 20: 4700), usually only apparent upon viewing the bank statement, are now ready to be credited against the general ledger's cash account as soon as they register within the financial institution's core system: an operation usually rendering instant updates once the charge is applied. As such, there is no need for the user to credit the cash account—it is done according to the automation described in above sections.

Not sufficient funds (FIG. 20: 4710) checks and fees render a decrease of the checking account by the amount of the check plus any applicable fees. Typically, this bounced check is not known until the bank statement arrives. Again, because of having access to the Financial Institution Database (FIG. 1: 510) via the previously described API call (FIG. 1: 600), CITS becomes aware of this data through API call and decreases the general ledger's cash account by the actual amounts reflecting a true balance.

Interest earned (FIG. 20: 4720) is again identified in the Financial Institution Database (FIG. 1: 510) virtually as soon as it is applied. When the previously defined API call (FIG. 1: 600) detects this debit to the checking account this change is passed along to the user's general ledger providing a true balance with no manual adjustment required.

Deposits in transit (FIG. 20: 4730) are no longer a source of adjustment as the general ledger itself is generated from the Financial Institution Database (FIG. 1: 510). As such, as soon as the funds are apparent in the banking system they will be, per the data structure and programmed algorithms mentioned in the previous section, applied to the general ledger. This virtually ensures that deposits in transit no longer represent a discrepancy between the general ledger and bank statement.

Bank errors (FIG. 20: 4740) are mistakes made by the bank and usually arise when the bank statement is being compiled; however, as the previously described API call (FIG. 1: 600) runs against the Financial Institution Database (FIG. 1: 510) the frequency at which these errors are detected is improved and more immediate resolution actions can be taken.

Errors in the Company's general ledger (FIG. 20: 4750) usually arise from human performed data entry and manipulation errors. As none of the above reconciliation processes; accounts payable, accounts receivable, incomes or expenses require human performed data entry, outside of assigning categories and inputting purchase order, these sorts of errors are greatly reduced.

If the user has a personal expense which has been paid for using a business account it can be deleted. This adjusts this expense such that it is allocated to a draw or loan account instead of a business expense Category. This eliminates any inaccuracies arising from misuse of business funds.

FIG. 20, Auto-Reconciling According to CITS shows a visual representation of this accounting process.

1.3.8.1 Improvement when Using CITS Auto-Reconciliation Relative to Traditional Reconciliation This is a distinct improvement as it results in a user experience such that the reconciliation process, for both balance per books and balance per bank, is entirely independent of human performed data entry or manipulation. As such, a significant time savings is created while simultaneously reducing the error rate associated with human performed data entry and/or manipulation.

1.3.8.2 Backup Data

The below section contains additional embodiments of CITS. This section is a further explanation as to the systematic implementation of CITS beyond the aforementioned description and implementation of business accounting and tax operations.

1.4 Retirement/Personal Wealth Management (FIG. 1: 102)

Referring to FIG. 21, the specific embodiment explored here relates to Personal Wealth Management (FIG. 1: 102) for retirement and budgetary purposes. It is well known that for many individuals engaged in personal wealth management a variety of errors can arise during the monitoring of income and expense habits and the associated data creation and manipulation process which leads to the creation of personal financial reports. These inaccuracies can lead to issues such as an individual misunderstanding their cash position, spending habits or ability to retire given a certain lifestyle; the majority of these issues usually culminate as some form of financial hardship.

CITS remedies these issues by removing much of the required human performed data entry by leveraging existing information technology such that the wealth management process is almost entirely free of human generated data entry and/or manipulation. Again, according to embodiments, transactions (FIG. 1: 400) do not need to be tied to individuals, e.g. storefront name or employer name. Instead, transactions can be tied to specific categories which is advantageous as linking a given transaction to an individual name leads to an unintentional obfuscation of the nature of any given transaction, usually at an especially pivotal point in the organization system. As will be seen, this change reduces the data entry associated with monitoring financial transactions and the resulting wealth management operations to an unprecedented level. When data entry is required, this usually cumbersome process is supplemented with a simplified and automated user interface (FIG. 1: 2000).

As Personal Wealth Management (FIG. 1: 102) is included in the Financial Management (FIG. 1: 100) branch of FIG. 1 which is also inclusive of Business Accounting (FIG. 1: 101) many of the systems, methods and technical procedures are closely related when comparing Personal Wealth Management (FIG. 1: 102) and Business Accounting (FIG. 1: 101). As such, it should be clear to those skilled in the art that the processes, systems and methodologies included in the previous sections as part of the non-limiting example Business Accounting (FIG. 1: 101) can be employed in a similar or identical fashion in the context of this embodiment, namely, Personal Wealth Management (FIG. 1: 102). As such, the following sections will not be included in the description of Retirement/Personal Wealth Management (FIG. 1: 102) and these sections are assumed to be conducted according to the same spirit and scope as defined in Business Accounting (FIG. 1: 101) and are namely: Individual Transaction Takes Place (FIG. 1: 400); Information Transferred (FIG. 1: 410) to Financial Institution Database (FIG. 1: 510); Connectivity (FIG. 1: 600); Server Operations (FIG. 1: 800); CPU (FIG. 1: 810); I/O Interface (FIG. 1: 815); Storage (FIG. 1: 820); Processor (FIG. 1: 825); Network Connection (FIG. 1: 830) and Database Operations (FIG. 1: 835). It should also be noted that a variety of different embodiments obvious to those skilled in the art can be ascribed to the sections not included here which may be applied to this or other embodiments and applications without departing from the spirit and scope of the present invention. Thus, the present invention is not limited to the embodiments shown, but is to be accorded the widest scope consistent with the principles and features disclosed herein. As such, the sections which remain are those which dictate the predominant changes between one CITS embodiment and another.

1.4.1 Identification of Taxonomy (FIG. 1: 001)

Each CITS embodiment rests on at least one taxonomy (FIG. 1: 001) which acts as the data structure by which gathered financial transaction records are organized such that the data inherent in these transactions can culminate as powerful and valuable information. The structure chosen for these taxonomies is part of the working mechanism by which human dependent data entry is reduced which ultimately leads to the reduction of errors in data mining and analysis while increasing the timeliness of reports as unnecessary and superfluous data tags and data entry steps are removed. Accordingly, the taxonomy shown here and the corresponding data structures are representative of an embodiment of a fewest possible categorical delineations thereby eliminating any unnecessary data entry and/or computing system requirements.

The taxonomy in this non-limiting example was chosen for several primary reasons. The first of which was to choose a taxonomy such that the unnecessary data entry and tagging inherent in existing personal wealth management was eliminated to the greatest possible degree thereby decreasing a leading source of financial analysis and management error. The second was to choose a taxonomy which was realistically able to employ current information technology and API calls run against financial institution databases.

FIG. 21, Backend Taxonomy: Retirement/Personal Wealth Management shows this taxonomy visually as a single data structure. This data structure represents the completion of a Personal Wealth Report (FIG. 1: 1020) for a given individual and/or family and is demonstrated as process steps Personal Wealth Report (FIG. 21: 110), Budget Sections (FIG. 21: 108), Budget Sub-Sections (FIG. 21: 106), and Granular Level Budget Categories Inclusive of Unique Data Tags (FIG. 21: 104). The below sections speak directly to the delineation of this taxonomy with an emphasis on how this particular taxonomy accomplishes the aforementioned goals of reduced data entry, data entry error rates and enhanced timeliness and accuracy of reports. This section specifically references the flow of information and the ways in which information is collected using data pulling mechanisms, such as the aforementioned API call (FIG. 1: 600). The way in which the algorithmically assigned categories dictate where information collects within this taxonomy is included in the (FIG. 1: 700) series process steps titled Data Applied to Taxonomy.

1.4.1.1 Personal Wealth Report (FIG. 21: 110)

In this non-limiting example the data structure begins with Personal Wealth Report (FIG. 21: 110) and represents the last level of the data structure. According to this non-limiting example, this Personal Wealth Report (FIG. 21: 110) is made up of a granular level analysis of a person's financial activities including expenses, income, existing savings and target savings progress. These reporting topics are shown as they represent a wide enough breadth of information to demonstrate the reaching capabilities of CITS and also as it should serve as sufficient information for many individuals and families to plan and budget according to certain financial goals or a specific standard of living. Additionally, the breadth of the reporting topics shown here should be sufficient to act as primary financial indicators when making financial decisions as they relate to personal budgeting or retirement planning.

1.4.1.2 Budget Sections (FIG. 21: 108)

The second level of this non-limiting example data structure is titled as Budget Sections (FIG. 21: 108) and is made up of the individual sections of a Personal Wealth Report (FIG. 21: 110); namely, Incomes, Expenses, Net Income, Existing Savings and Target Savings Progress.

1.4.1.3 Budget Sub-Sections (FIG. 21: 106)

The third level of this non-limiting example data structure is titled as Budget Sub-Sections (FIG. 21: 106) and represents the nature of the parent Budget Section (FIG. 21: 108). As such, each Budget Section (FIG. 21: 108) is made up of at least one Budget Sub-Section (FIG. 21: 106) delineating the nature of transactions (FIG. 1: 400) that makeup that Budget Section (FIG. 21: 108). For example, The Budget Section titled Incomes (FIG. 21: 108) of a Personal Wealth Report (FIG. 21: 110) would be made up of Budget Sub-Sections (FIG. 21: 106) Primary Income, Interest Income, Rent and/or Lease Income and Miscellaneous Income.

1.4.1.4 Granular Level Budget Categories Inclusive of Unique Data Tags (FIG. 21: 104)

As such, following the same line of inductive reasoning, each Budget Sub-Section (FIG. 21: 106) should be made up of Granular Level Budget Categories Inclusive of Unique Data Tags (FIG. 21: 104). Specifically, these Granular Level Budget Categories Inclusive of Unique Data Tags (FIG. 21: 104) are composed of the most detailed information present in this CITS embodiment. Additionally, like the previously defined data structures represented in Business Accounting (FIG. 1: 101), each one of these Granular Level Budget Categories Inclusive of Unique Data Tags (FIG. 21: 104) has a Unique Data Tag (FIG. 1: 945) associated with it such that the Categorical Transaction Tags (FIG. 1: 930) indicate which transactions are associated with the specific and corresponding Granular Level Budget Categories Inclusive of Unique Data Tags (FIG. 21: 104).

For example, a Granular Level Budget Category Inclusive of Unique Data Tags (FIG. 21: 104) of a Budget Sub-Section, Vehicle Expenses (FIG. 21: 106) of the Expense Budget Section (FIG. 21: 108) of a Personal Wealth Report (FIG. 21: 110) would be titled Car Wash. Similarly, this implies that the Unique Data Tag (FIG. 1: 945) associated with each Granular Level Budget Category Inclusive of Unique Data Tags (FIG. 21: 104) corresponds to a given Categorical Transaction Tag (FIG. 1: 930). As such, it should be clear that each transaction requires at least one fixed relationship between two identification tags which indicate which specific Granular Level Budget Category Inclusive of Unique Data Tags (FIG. 21: 104) that transaction relates to.

As such, given this non-limiting example, the Identification of the Taxonomy (FIG. 1: 001) consists of one unique taxonomy designed to provide users of CITS with accurate, thorough and complete Personal Wealth Reports (1020). This taxonomy is made up of one unique data structure used to create the Personal Wealth Report (FIG. 21: 110). This data structure, designed to provide users of CITS with a complete Personal Wealth Report (FIG. 21: 110), has four levels: Personal Wealth Report (FIG. 21: 110), Budget Sections (FIG. 21: 108), Budget Sub-Sections (FIG. 21: 106) and Granular Level Budget Categories Inclusive of Unique Data Tags (FIG. 21: 104).

1.4.2 Data Gathering

As the previous section describes how a taxonomy (FIG. 1: 001), and an accompanying data structure, FIG. 21, Backend Taxonomy: Retirement/Personal Wealth Management are developed to ensure minimal data entry and fewest possible processing steps, this section explores how this data is gathered (FIG. 1: 600), how the data is populated and manipulated throughout the system (FIG. 1: 700) and how information (FIG. 1: 1000) is created based around an example transaction (FIG. 1: 400). In essence, the taxonomy and data structures, although a pivotal construct, are themselves insufficient to service the aforementioned goals of reduced data entry, reduced data entry error rates and increased timeliness and accuracy of reports leading to greater individual and/or family wealth management.

1.4.3 Data Applied to Taxonomy (FIG. 1: 700)

This section explores how financial transaction data embodied as individual income and expense transactions (FIG. 1: 400), are pulled by the aforementioned API call (FIG. 1: 600), and is manipulated on a server, database and algorithmic level thereby applying that data to the pre-defined taxonomy (FIG. 1: 001) and data structure, Personal Wealth Reports (FIG. 1: 102), in such a way that data is turned into meaningful information (FIG. 1: 1000) per the pre-defined data flows shown in FIG. 21, Backend Taxonomy: Retirement/Personal Wealth Management. This step is pivotal in CITS embodiments as it is the technical procedure by which the data gathered from the financial institution is manipulated according to the Identified Taxonomy (FIG. 1: 001) therefore creating valuable information which can be turned into reports (FIG. 1: 1000) allowing users to take action (FIG. 1: 3000) according to the information provided. The information created in this step is inherently more accurate relative to existing data entry processes and is categorized in a superior way relative to existing categorization algorithms as the user can confirm categorization at their discretion by being optionally notified (FIG. 1: 2000) of a given categorization or set of categorizations [(FIG. 1: 945) and/or (FIG. 1: 930)].

1.4.3.1 Proprietary Algorithms (FIG. 1: 900)

The below section explores proprietary algorithms which are partially designed to correlate the Categorical Transaction Tags (FIG. 1: 930) of a given transaction (FIG. 1: 400) with Unique Data Tags (FIG. 1: 945) thereby identifying a specific data flow, shown in this embodiment as process steps Personal Wealth Report (FIG. 21: 110), Budget Sections (FIG. 21: 108), Budget Sub-Section (FIG. 21: 106) and Granular Level Budget Categories Inclusive of Unique Data Tags (FIG. 21: 104) which are, as previously explained, the components of a single data structure which is hierarchically dictated given the Identification of Taxonomy (FIG. 1: 001).

1.4.3.2 Data Interface (FIG. 1: 910)

The Data Interface (FIG. 1: 910) is a mechanism, to be conducted via one or more computers or machine systems, which dictates the frequency at which the above described API call (FIG. 1: 600) is run and once this schedule is set executes the necessary commands for the API call (FIG. 1: 600) to take place. The Data Interface (FIG. 1: 910) itself can be structured via human input embodying specific relationships or data structures or can be the output of a secondary heuristic computing system, programmed to operate according to a system of one more computers or machines.

In the context of this non-limiting example, the aforementioned API call (FIG. 1: 600) will be required to gather financial transaction data concerning the financial transactions (FIG. 1: 400) of the user. As such, there will be variability between users with regards to the frequency at which the API call (FIG. 1: 600) is run. For instance, a user which engages in many transactions (FIG. 1: 400) will have this API call (FIG. 1: 600) executed more often relative to a user which engages in only a few transactions (FIG. 1: 400). Additionally, the time of day in which the user usually engages in transactions (FIG. 1: 400) will have a higher frequency of API calls (FIG. 1: 600) relative to the time of day in which the user does not engage in transactions (FIG. 1: 400).

According to a specific, but non-limiting example, if the user is an employee in a corporate setting where working hours are usually 8:00 am through 5:00 pm there will be a lower frequency of transactions (FIG. 1: 400) taking place during these hours which would likely be a result of that user being at work and unable to engage in frequent purchases for goods and/or services using personal funds. Conversely, the user will likely engage in most transactions (FIG. 1: 400) outside of this block of time besides special events such as holidays.

In embodiments of the algorithms that may be used in Data Interface (FIG. 1: 910) these trends will be identified by dividing the hours over the course of a given day into a discreet histogram thereby creating 24 discreet bins. The amount of transactions (FIG. 1: 400) which occur within each of these bins will dictate the API call (FIG. 1: 600) frequency over the course of a given hour. Similarly, this same discrete histogram model, algorithmically developed to infer financial transaction trends, could be employed by dividing the months of a given year into twelve bins. This would be especially advantageous for cyclical spending habits which usually arise as a result of seasonal changes, for example, the holiday season.

This Data Interface (FIG. 1: 910) is designed such that the user is best served based off their financial transaction trends while simultaneously reducing the computing and/or system requirements needed to employ CITS, for instance, if the API call (FIG. 1: 600) was executed for all users once an hour regardless of financial transaction activity trends.

1.4.3.3 Data Point Identified (FIG. 1: 920)

Each API call (FIG. 1: 600) can pull a number of financial transactions (FIG. 1: 400); however, it is important for teaching purposes to demonstrate a single data point, which should be considered a single transaction (FIG. 1: 400), as it is augmented by operations inherent in CITS. As such, in the context of this non-limiting example, a single data point as it operates within CITS will be described. Specifically, in keeping with the previous mentioned non-limiting example which, in this case, is the purchase of a Car Wash (FIG. 1: 400), according to the data structure by which the Personal Wealth Report (FIG. 21: 110) contains an Expense Budget Section (FIG. 21: 108) which contains a Vehicle Expenses Budget Sub-Section (FIG. 21: 106) which contains the Granular Level Budget Category Inclusive of Unique Data Tags (FIG. 21: 104), Car Wash for an exemplary individual or family which might employ CITS to accomplish personal wealth management.

However, it is technically feasible and advantageous to run these defined operations against many data points simultaneously. As such, it should be noted, that a practical CITS system which services a single or many users should have the capacity to identify many data points simultaneously and pass these data points through the defined data structure associated with the Identification of Taxonomy (FIG. 1: 001).

It is important from a teaching perspective that a single data point be identified and explained as each data point gathered could have a unique set of Categorical Transaction Tags Applied (FIG. 1: 930) corresponding to a Unique Data Tag (FIG. 1: 945) and therefore a unique data flow within the data structure based on the Identified Taxonomy (FIG. 1: 001). Such is the power of CITS, through the defined algorithms (FIG. 1: 900) employed to delineate financial transaction data according to a given taxonomy based on a series of fixed relationships between Categorical Transaction Tags Applied (FIG. 1: 930) and Unique Data Tags (FIG. 1: 945) a data flow is identified and therefore any financial transaction can be inputted into a given system, recorded and manipulated into information such that the nature of the transaction is clear and therefore the aggregated information, confirmed by the user (FIG. 1: 2000), can be used for reporting purposes (FIG. 1: 1000) and User Action (FIG. 1: 3000).

1.4.3.4 Categorical Transaction Tags Applied (FIG. 1: 930)

As a result of the nature of the aforementioned commercially available API call (FIG. 1: 600), up to, but not limited to, three descriptive tags are algorithmically assigned to a given transaction (FIG. 1: 400) and are referred to as Categorical Transaction Tags Applied (FIG. 1: 930). An exemplary embodiment of Categorical Transaction Tags Applied (FIG. 1: 930), keeping with the specific and non-limiting example described above, is shown in FIG. 22 Category Example: Personal Wealth Management, as Services (FIG. 22: 934), Vehicle (FIG. 22: 935) and Car Wash and Detail (FIG. 22: 936). These tags act as the assimilation mechanism by which financial transactions (FIG. 1: 400) pulled by the API call (FIG. 1: 600) are identified within CITS and allow for each transaction's unique corresponding data structure to be identified.

A rather granular description is provided to the transaction given these categories. However, the data which is being described via Categorical Transaction Tags Applied (FIG. 1: 930) needs to be matched with a Unique Data Tag (FIG. 1: 945) relating to a specific level of a given data structure to begin the integration of the data point into the pre-defined data structure, dictated by the given taxonomy (FIG. 1: 001). In this process the coupling point between the Categorical Transaction Tags Applied (FIG. 1: 930) and the Unique Data Tag (FIG. 1: 945) is characterized by the most detailed and granular Categorical Transaction Tags Applied (FIG. 22: 936) available. According to this non-limiting example, the most detailed and granular Categorical Transaction Tags Applied (FIG. 22: 936) available is Car Wash and Detail (FIG. 22: 936). As such, Car Wash and Detail (FIG. 22: 936) is the Categorical Transaction Tag Applied (FIG. 1: 930) to this given transaction (FIG. 1: 400). Accordingly, it should be apparent to one skilled in the art that the preceding, higher level, Categorical Transaction Tags Pulled [(FIG. 22: 934) & (FIG. 22: 935)] are now superfluous in this non-limiting example as the information inherent in these Categorical Transaction Tags Applied (FIG. 1: 930) can be determined via fixed relationships. Specifically, the Granular Level Budget Category Inclusive of Unique Data Tags, Car Wash (FIG. 21: 104) must, by its very nature, be preceded by the Budget Sub-Section, Vehicle Expenses (FIG. 21: 106) and Vehicle Expenses must, by its very nature, be preceded by Budget Section Expense (FIG. 21: 108) which must, by its very nature, be preceded by a predictable section of the Personal Wealth Report (FIG. 21: 110). Please see FIG. 21, Backend Taxonomy: Retirement/Personal Wealth Management for a visual embodiment of these line items exemplary shown on a Personal Wealth Report for an individual or family which might employ CITS. Also, please see FIG. 22 Category Example: Personal Wealth Management for a table illustrating the Categorical Transaction Tags, Data Structure Titles, Data Bin Titles, Data Flow, and Unique Data Tags as they relate to this non-limiting example.

1.4.3.5 Data Flow Identified (FIG. 1: 940) Via Unique Data Tag (FIG. 1: 945)

The algorithms which execute and provide this corollary relationship are designed to operate based on a fixed relationship between the Categorical Transaction Tag Applied (FIG. 1: 930) and the Unique Data Tag (FIG. 1: 945). Specifically, the algorithms referenced here are capable of distilling each known combination of Categorical Transaction Tags to the most detailed and granular Categorical Transaction Tag thereby providing the Categorical Transaction Tag Applied (FIG. 1: 930) assigned to a given transaction via the commercially available API call (FIG. 1: 600). Accordingly, each most detailed and granular level category of a given data structure, associated with an Identified Taxonomy (FIG. 1: 001), is also mapped with at least one Unique Data Tag (FIG. 1: 945). As such, it should be clear that this is the assimilation mechanism by which transactions pulled via the aforementioned API call (FIG. 1: 600) are tied to a given section of a given data structure arising from an Identified Taxonomy (FIG. 1: 001). As previously noted, the Data Flow Identified (FIG. 1: 940) is then mapped as when considering the most detailed and granular Categorical Transaction Tag Applied (FIG. 1: 930) and its relationship to a Unique Data Tag (FIG. 1: 945) only one series of logical and predictable inductive data population steps is available given a fixed data structure. In keeping with the same example, and per the information shown in FIG. 22, the Granular Level Budget Category Inclusive of Unique Data Tags Car Wash (FIG. 22: 104) must, by its very nature, be preceded by the Budget Sub-Section Vehicle Expenses (FIG. 22: 106) and Vehicle Expenses must, by its very nature, be preceded by Budget Section Expense (FIG. 22: 108) which must, by its very nature, be preceded by Personal Wealth Report (FIG. 22: 110). In keeping with FIG. 22, the column titled Unique Data Tags shows the exemplary, but non-limiting, data tag mapped to the most detailed and granular level category of the given data structure which is exemplary shown in FIG. 22 as Granular Level Budget Categories Inclusive of Unique Data Tags (FIG. 22: 104).

It should be noted, this assimilation mechanism and its associated algorithms are one of the driving forces in uniting data pulled from a Financial Institution Data Base (FIG. 1: 510) to a user's desired reports (FIG. 1: 1000), in keeping with this example, Personal Wealth Report (FIG. 1: 1020). As such, as this assimilation process is totally automated and free of required user involvement the data entry associated with any wealth management operation which previously required human performed data entry in operations such as, but not limited to, inputting expense and income records into a given financial tracking system, are made unnecessary by the exemplary embodiment of CITS shown here.

1.4.3.6 Inductive Data Structure Propagation (FIG. 1: 950)

In keeping with this non-limiting example, the Categorical Transaction Tag Applied (FIG. 1: 930) once coupled with an associated Unique Data Tag (FIG. 1: 945) dictates a specific Data Flow Identification (FIG. 1: 940). As this data flow is designed according to a series of fixed relationships, the population of the most specific and granular level of a given data structure is sufficient to populate all of the preceding levels of that data structure. As such, the inductive data propagation (FIG. 1: 950) described here affects the remainder of the preceding data structure levels associated with a given data structure by populating each with an accurate and descriptive tag which indicates to the consumer of a given CITS report (FIG. 1: 1000) the nature, on a granular and highly descriptive level, of a given transaction or a given grouping of transactions.

To expand on this concept, for the data structure described, and keeping with FIG. 22 Category Example: Personal Wealth Management beginning with Personal Wealth Report (FIG. 22: 110) contains the data flow steps of Personal Wealth Report (FIG. 22: 110), Budget Sections (FIG. 22: 108), Budget Sub-Section (FIG. 22: 106) and Granular Level Budget Categories Inclusive of Unique Data Tags (FIG. 22: 104) which are directly related and information updated on a lower level of this data structure will impact the higher levels with additional data population given fixed relationship algorithms thereby creating powerful and valuable financial information which does not require end user involvement or participation on any level. For example, the single data point being discussed here relating to the purchase of a Car Wash (FIG. 1: 400), once described via a Categorical Transaction Tag Applied (FIG. 1: 930) and coupled to a Unique Data Tag (FIG. 1: 945) populates the Granular Level Budget Category Inclusive of Unique Data Tags (FIG. 22: 104) of the data structure beginning with Personal Wealth Report (FIG. 22: 110) thereby leading to an inductive propagation of the remainder of the data structure. Specifically, this inductive propagation is as follows and is demonstrated a Data Bin Title as seen on FIG. 22, column "Data Bin Title" and shown as a data flow under column "Data Flow": Car Wash and Detail (FIG. 22: 104), Vehicle Expenses (FIG. 22: 106), Expenses (FIG. 22: 108) and Personal Wealth Report (FIG. 22: 110). Similarly, in keeping with the same example and FIG. 22, the single data point being discussed here relating to the purchase of a Car Wash and Detail (FIG. 1: 400), once described via a Categorical Transaction Tag Applied (FIG. 1: 930) and coupled to a Unique Data Tag (FIG. 1: 945) populates the Granular Level Budget Category Inclusive of Unique Data Tags (FIG. 22: 104) thereby leading to an inductive propagation of the remainder of the data structure. Specifically, this inductive propagation is as follows: Granular Level Budget Category Inclusive of Unique Data Tags (FIG. 22: 104), Budget Sub-Section (FIG. 22: 106), Budget Sections (FIG. 22: 108) and Personal Wealth Report (FIG. 22: 110) associated with the individual or family employing CITS.

In summary of these data structures as they operate according to Inductive Data Structure Propagation (950), given the fixed set of relationships between Unique Data Tags (945) and Categorical Transaction Tags, programmed algorithms inherent in CITS inductively propagate the data structure from the most specific level of the data structure towards the most generalized level of the data structure, and therefore taxonomy, such that human performed data entry inherent in financial analysis, including wealth management operations, is entirely removed via automation which is free of potential user touch points.

It is most optimal to perform this operation using inductive population as Car Wash and Detail must, by its very nature, be preceded by Vehicle Expenses and Vehicle Expenses must, by its very nature, be preceded by Expenses and Expenses must, by its very nature, be preceded by Personal Wealth Report. When considering this process using deductive reasoning it is now clear that algorithms cannot be created which consistently and accurately predict subsequent and lower levels of a given taxonomy as fixed relationships of this nature do not exist.

As such, it should be clear that given the most detailed and granular Categorical Transaction Tag (FIG. 1: 930) Proprietary Algorithms (FIG. 1: 900) inherent in CITS and the associated data structures and taxonomies eliminate the tedious and error prone task of data entry as it relates to personal wealth operations.

1.4.4 Potential User Involvement (FIG. 1: 2000)

There are a variety of ways in which the user may become involved in this process. One non-limiting example is the user being optionally notified that a new transaction, or a group of transactions, has been categorized and the corresponding data has been manipulated and turned into useable information which is manifested as a Personal Wealth Report (FIG. 1: 1020).

This optional notification may act as a mechanism by which the user can ensure that the categorization chosen is correct (FIG. 1: 2010). As such, user involvement of this nature can ensure that the transaction categorization was completed successfully and that the resulting updates impacting the Personal Wealth Report (FIG. 1: 1020) reflect accurate financial record keeping as determined by the user.

Similarly, the user may wish to be optionally notified of a given transaction categorization, or set of categorization, to monitor spending habits of a given nature. This could act as a mechanism by which individuals or families could become more aware of spending habits which otherwise may have gone unnoticed.

1.4.5 Reports Provided for Analysis (FIG. 1: 1000) to User

The below sections provides a description of Reports (FIG. 1: 1000) which can be provided to the User for analysis used in financial decisions making as it related to personal wealth management for budgetary and/or retirement purposes.

1.4.5.1 Personal Wealth Report (1020)

The Personal Wealth Report (FIG. 1: 1020) provided in this non-limiting embodiment demonstrates to a family or individual employing CITS the nature of income and expenses across a detailed categorical report as well as a ratio summary of existing savings and target savings. This report could be used to better understand the financial position of a given budget and also analyze progress towards financial goal achievement, such as saving for retirement. As such, it is the ultimate goal of this report to provide users of CITS with a more accurate and detailed financial understanding of their budget and monetary goals without the need for data entry or manipulation.

1.4.6 User Action (3000)

As a result of the reports created the User could take a number of actions (FIG. 1: 3000) to better develop their financial position and exercise superior financial planning in relation to retirement planning or budgetary planning Specifically, the user may use the retirement planning to better understand their financial position to determine if it is advantageous to decrease spending or increase revenue. This decision could be based off of the ratio analysis provided that related to existing savings and target savings. Accordingly, the user could identify categories to decrease spending by analyzing each Budget Sub-Section (FIG. 21: 106) and the accompanying Granular Level Budget Categories Inclusive of Unique Data Tags (FIG. 21: 104) to identify where unnecessary or discretionary spending is occurring.

1.5 Financial Investigation (FIG. 1: 200)

In modern litigation the discovery process has become increasingly digital and almost always involves computer records. This type of legal discovery is called electronic discovery or e-discovery. There are several instances within e-discovery in which it would be advantageous to employ CITS and a brief explanation of these embodiments follows to serve as non-limiting examples. The primary reason for providing these brief descriptions is to illustrate other possible embodiments of CITS outside of the Business Accounting (FIG. 1: 101) and Personal Wealth Management (FIG. 1: 102) embodiments already described.

This process, like most legal discovery, has specific protocols set forth by the Department of Justice which must be observed. Because e-discovery is a relatively new component of the discovery process there is still some issue with developing software that adheres to the protocol given the incredible breadth of information that can be found during e-discovery.

The challenging nuances of e-discovery are demonstrated in recent cases. One exemplary embodiment is the case United States v. Briggs WL 4017886. This case involved a multi-defendant drug conspiracy in Buffalo, N.Y. During the discovery process, the United States Attorney's Office's lawyers produced wiretap data from the DEA software, Voicebox and another software commonly used by the United States Attorney's office, IPRO, which organized the remainder of the data, some of which was financial in nature. The defendants disputed the use of IPRO as the tagged image file format employed could not be sorted or searched. Because there was such a wealth of information provided via Voicebox and IPRO it was impossible to correctly analyze the information and the defendants requested the information in different file formats which would allow for more powerful sorting and searching. The Magistrate Judge enforced Federal Rule of Civil Procedures 34(B)(2)(E)(ii) which required the prosecutors to render the Voicebox and IPRO files in a portable document format which could be better searched and organized.

If the data associated with the IPRO files, which was financial in nature, could have been extracted and organized per the CITS system it would have been prepared, for both the prosecution and defense, in an organized fashion according to an Identified Taxonomy (FIG. 1: 001) which could be developed for this case in particular or cases of this nature. This would have decreased the cost and time required to bring United States v. Briggs to a close.

1.6 Family Court: Divorce Litigation (FIG. 1: 201)

In one embodiment, CITS could be employed in family court. This would be advantageous as there is often financial dispute during divorce trials. These disputes are often further compounded by community and non-community spending. Community spending is that which can be defined as for the betterment or the maintenance of the household or typical continuation of a given standard of living for the couple seeking divorce. It is known to occur that during or prior to a divorce, funds which should be intended for community spending, are funneled away from joint accounts to a personal account by one member of the couple or spent in a non-community spirit.

In keeping with the same embodiment, a specific example would be when one member of a couple seeking divorce spends community funds from a joint account on a non-community item, such as by purchasing a new Harley Davidson motorcycle. An expense of this nature could be disputed by the other partner as an intended attempt to deplete community funds which otherwise would have been split, perhaps equally, among the two members of the couple.

CITS could be applied to this example as an inventive embodiment as during the e-discovery process one member of the couple seeking divorce could provide bank account credentials or financial records which would allow for the financial information to be organized according to a taxonomy which delineates community and non-community spending. Specifically, in keeping with this embodiment, community spending could be defined as purchases such as, but not limited to, groceries, rent and flood insurance and all other spending would be classified as non-community in nature. Once the couple's financial records are obtained, the data could be applied to the CITS framework by uploading the data into a database. The data would then be organized according to a taxonomy delineating community and non-community spending. Spending which is categorized as community would be set aside as legitimate and spending not categorized as community would be ready for analysis by the appropriate legal personnel.

In a similar situation, CITS, employing a similar taxonomy could identify regular transfers of funds between joint accounts. For instance, from a couple's joint checking account to their joint savings account. Again, it is known to happen that during or prior to a divorce, funds which should be intended for a joint account, can be inappropriately transferred to a private account belonging only to one member of the couple. A transfer of this nature could be disputed by the other partner as an intentional attempt to funnel community funds away from joint accounts without appropriate agreement. This could be interpreted as a deliberate attempt to reduce available funds which otherwise would have been split, perhaps equally, among the two members of the couple.

As Family Court (FIG. 1: 201) is related to the Financial Management (FIG. 1: 100) branch of FIG. 1, many of the systems, methods and technical procedures are closely related when comparing Financial Management (FIG. 1: 100) and Family Court (FIG. 1: 201). As such, it should be clear to those skilled in the art that the processes, systems and methodologies included in the previous sections apart of the non-limiting example Financial Management (FIG. 1: 100) can be employed in a similar or identical fashion in the context of this embodiment, namely, Non-Community Spending Report (FIG. 1: 201). As such, the following sections will not be included in the description of Non-Non-Community Spending Report (FIG. 1: 201) and these sections are assumed to be conducted according to the same spirit and scope as defined in Business Accounting (FIG. 1: 101) and are namely: Individual Transaction Takes Place (FIG. 1: 400); Information Transferred (FIG. 1: 410) to Financial Institution Database (FIG. 1: 510); Connectivity (FIG. 1: 600); Server and Database Operations (FIG. 1: 800); CPU (FIG. 1: 810); I/O Interface (FIG. 1: 815); Storage (FIG. 1: 820); Processor (FIG. 1: 825); Network Connection (FIG. 1: 830) and Database Operations (FIG. 1: 835). It should also be noted that a variety of different embodiments obvious to those skilled in the art can be ascribed to the sections not included here which may be applied to this or other embodiments and applications without departing from the spirit and scope of the present invention. Thus, the present invention is not limited to the embodiments shown, but is to be accorded the widest scope consistent with the principles and features disclosed herein. As such, the sections which remain are those which dictate the predominant changes between one CITS embodiment and another.

1.6.1 Identification of Taxonomy (FIG. 1: 001)

Each CITS embodiment rests on at least one Identified Taxonomy (FIG. 1: 001) which acts as the data structure by which gathered financial transaction records are organized such that the data inherent in these transactions can culminate as powerful and valuable information. The structure chosen for these taxonomies is part of the working mechanism by which human dependent data entry is reduced which ultimately leads to the reduction of errors in data mining and analysis while increasing the timeliness of reports as unnecessary and superfluous data tags and data entry steps are removed. Accordingly, the taxonomy shown here and the corresponding data structure is representative of the fewest possible categorical delineations thereby eliminating any unnecessary data entry and/or computing system requirements.

The taxonomy in this non-limiting example was chosen for several primary reasons. The first of which was to choose a taxonomy such that the unnecessary data entry and tagging inherent in existing e-discovery software was eliminated to the greatest possible degree thereby decreasing a leading source of financial analysis and investigative error. The second was to choose a taxonomy which was realistically able to employ current information technology and API calls run against financial institution databases. The third was to choose a taxonomy such that the available data could be turned into information which could be easily searched and organized by relevant legal personnel.

FIG. 24, Backend Taxonomy: Non-Community Spending Report shows this taxonomy visually as a single data structure. This data structure, resulting as a Non-Community Spending Report (FIG. 24: 209) represents the completion of Aggregated E-Discovery Information (FIG. 1: 1050) for a given couple seeking divorce and is demonstrated as process steps Non-Community Spending Report (FIG. 24: 209), Non-Community Spending (FIG. 24: 207), Expense Category (FIG. 24: 205), and Sub-Expense Category (FIG. 24: 203). The below sections speak directly to the delineation of this taxonomy with an emphasis on how this particular taxonomy accomplishes the aforementioned goals of reduced data entry; data entry error rates; enhancement of search and organization functions and enhanced timeliness and accuracy of reports. This section specifically references the flow of information and the ways in which information is collected using data pulling mechanisms, such as the aforementioned API call (FIG. 1: 600).

1.6.1.1 Non-Community Spending Report (FIG. 24: 209)

In this non-limiting example the data structure begins with Non-Community Spending Report (FIG. 24: 209) and represents the last level of the data structure and the reporting output framework. According to this non-limiting example, this Non-Community Spending Report (FIG. 24: 209) is made up of a granular level analysis of a given couples financial activities which includes an analysis of expenses delineated according to non-community spending with a categorical breakdown of each given expense.

1.6.1.2 Non-Community Spending (FIG. 24: 207)

The second level of this non-limiting example data structure is Non-Community Spending (FIG. 24: 207) and is designed to act as a data receptacle by which transactions matching the definition of non-community spending collect. Specifically, in keeping with this embodiment, non-community spending could be defined as purchases such as, but not limited to, items which are purchased by one member of the couple without consent of the other, or expenses realized by one partner which could be construed as an attempt to deplete community funds which otherwise would have been split, perhaps equally, among the two members of the couple.

In keeping with the same embodiment, a specific example would be when one member of a couple seeking divorce spends community funds from a joint account on a non-community item, such as by purchasing a new Harley Davidson motorcycle.

1.6.1.3 Expense Category (FIG. 24: 205)

The third level of this non-limiting example data structure is titled as Expense Category (FIG. 24: 205) and represents the nature of the expense being analyzed. As such, the Expense Category (FIG. 24: 205) level of the data structure is made up of a number of categories which act to indicate the nature of the specific transactions which make up that Expense Category (FIG. 24: 205). For example, these categories could extend to examples such as Automotive; Entertainment and Food and Drink.

1.6.1.4 Sub-Expense Category Inclusive of Unique Data Tags (FIG. 24: 203)

The fourth level of this non-limiting example data structure is titled as Sub-Expense Category Inclusive of Data Tags (FIG. 24: 203) and represents the nature of the corresponding and preceding Expense Category (FIG. 24: 205). As such, each Expense Category (FIG. 24: 205) is made up of at least one Sub-Expense Category Inclusive of Unique Data Tags (FIG. 24: 203) delineating the nature of the transactions (FIG. 1: 400) that makeup that Expense Category (FIG. 24: 205). For example, the Expense Category (FIG. 24: 205) titled Entertainment would be made up of the Sub-Expense Categories (FIG. 24: 203) Night Club, Karaoke and Hookah Lounges. Additionally, like the previously defined data structures represented in Financial Management (FIG. 1: 100), each one of these Sub-Expense Categories Inclusive of Unique Data Tags (FIG. 24: 203) has a Unique Data Tag (FIG. 1: 945) associated with it such that the Categorical Transaction Tags Applied (FIG. 1: 930) indicates which transactions are associated with the specific and corresponding Sub-Expense Category Inclusive of Unique Data Tags (FIG. 24: 203). Similarly, this implies that the Unique Data Tag (FIG. 1: 945) associated with each Sub-Expense Category Inclusive of Unique Data Tags (FIG. 24: 203) corresponds to a given Categorical Transaction Tag (FIG. 1: 930). As such, it should be clear that each transaction (FIG. 1: 400) of a given couple or individual of that couple requires at least one fixed relationship between two identification tags which indicate which specific Sub-Expense Category Inclusive of Unique Data Tags (FIG. 24: 203) that transaction relates to.

As such, given this non-limiting example, the Identification of the Taxonomy (FIG. 1: 001) consists of one unique taxonomy made up of a single data structure designed to provide users of CITS with accurate, thorough and complete Aggregated E-Discovery Information (FIG. 1: 1050). This taxonomy is made up of one unique data structure used to create the Non-Community Spending Report (FIG. 24: 209) which is shown as a completed report as, Aggregated E-Discovery Information (FIG. 1: 1050).

1.6.2 Data Gathering

As the previous section describes how an Identified Taxonomy (FIG. 1: 001), and an accompanying data structure are developed to ensure minimal data entry and fewest possible processing steps, this section explores how this data is gathered (FIG. 1: 600), how the data is populated and manipulated throughout the system (FIG. 1: 700) and how information (FIG. 1: 1000) is created based around an example transaction (FIG. 1: 400). In essence, the taxonomy and data structures, although a pivotal construct, are themselves insufficient to service the aforementioned goals of reduced data entry; reduced data entry error rates; enhanced search and organization functions and increased timeliness and accuracy of reports leading to enhanced aggregated e-discovery procedures and output.

1.6.3 Data Applied to Taxonomy (FIG. 1: 700)

This section explores how financial transaction data embodied as individual expense transactions (FIG. 1: 400), are pulled by the aforementioned API call (FIG. 1: 600), and is manipulated on a server, database and algorithmic level thereby applying that data to the Identification of Taxonomy (FIG. 1: 001) and data structure in such a way that data is turned into meaningful information (FIG. 1: 1000) per the pre-defined data flows shown in FIG. 24, Backend Taxonomy: Non-Community Spending Report. This step is pivotal in the CITS embodiments as it is the technical procedure by which the data gathered from the Financial Institution Database (FIG. 1: 510) or Personal Records Database (FIG. 1: 520) is manipulated according to the predefined taxonomy (FIG. 1: 001) therefore creating valuable information which can be turned into reports (FIG. 1: 1000) allowing users to take action (FIG. 1: 3000) according to the information provided. The information created in this step is inherently more accurate relative to existing data entry processes and is categorized in a superior way relative to existing categorization algorithms as the user can confirm categorization at their discretion by being optionally notified (FIG. 1: 2000) of a given categorization or set of categorizations [(FIG. 1: 945) and/or (FIG. 1: 930)].

1.6.3.1 Proprietary Algorithms (FIG. 1: 900)

The below section explores proprietary algorithms which are partially designed to correlate the Categorical Transaction Tags (FIG. 1: 930) of a given transaction (FIG. 1: 400) with Unique Data Tags (FIG. 1: 945) thereby identifying a specific data flow, shown in this embodiment as process steps Non-Community Spending Report (FIG. 24: 209), Non-Community Spending (FIG. 24: 207), Expense Category (FIG. 24: 205), and Sub-Expense Category (FIG. 24: 203) which are, as previously explained, the components of a single data structure which is hierarchically dictated given the taxonomy identified (FIG. 1: 001).

1.6.3.2 Data Interface (FIG. 1: 910)

The Data Interface (FIG. 1: 910) is a mechanism, to be conducted via one or more computers or machine systems, which dictates the frequency at which the above described API call (FIG. 1: 600) is run and once this schedule is set executes the necessary commands for the API call (FIG. 1: 600) to take place. The Data Interface (FIG. 1: 910) itself can be structured via human input embodying specific relationships or data structures or can be the output of a secondary heuristic computing system, programmed to operate according to a system of one more computers or machines.

In the context of this non-limiting example, the aforementioned API call (FIG. 1: 600) will be required to gather financial transaction data concerning the financial transactions (FIG. 1: 400) of the user and usually only expense transactions (FIG. 1: 400). As such, there will be variability between users with regards to the frequency at which the API call (FIG. 1: 600) is run. For instance, a couple which has already separated their finances and one member of that couple is seeking reparations in regards to spending (FIG. 1: 400) which took place before the finances were separated will have this API call (FIG. 1: 600) executed fewer times, perhaps only once, relative to a couple which is yet to separate their finances.

As such, this Data Interface (FIG. 1: 910) is designed such that the user is best served based off their financial transaction trends while simultaneously reducing the computing and/or system requirements needed to employ CITS, for instance, if the API call was executed continuously for a couple which has already separated their finances.

1.6.3.3 Data Point Identified (FIG. 1: 920)

Each API call (FIG. 1: 600) can pull a number of transactions (FIG. 1: 400); however, it is important for teaching purposes to demonstrate a single data point, which should be considered a single transaction, as it is augmented by operations inherent in CITS. As such, in the context of this non-limiting example, a single data point as it operates within CITS will be described. Specifically, in keeping with a non-limiting example which, in this case, is the purchase of Night Club Entertainment (FIG. 1: 400), according to the data structure by which the Non-Community Spending Report (FIG. 24: 209) contains a Non-Community Spending (FIG. 24: 207) such that an included Expense Category contains an Entertainment Section (FIG. 24: 205) such that the Sub-Expense Category Inclusive of Unique Data Tag includes the section Night Clubs (FIG. 24: 203) for an exemplary divorcing couple which might employ CITS to accomplish e-discovery.

It is technically feasible and advantageous to run these defined operations against many data points simultaneously. As such, it should be noted, that a practical CITS system which services a single or many users should have the capacity to identify many data points simultaneously and pass these data points through the defined data structure associated with the Identified Taxonomy (FIG. 1: 001).

It is important from a teaching perspective that a single data point be identified and explained as each data point gathered could have a unique set of Categorical Transaction Tags Applied (FIG. 1: 930) corresponding to a Unique Data Tag (FIG. 1: 945) and therefore a unique data flow within the data structure based on the Identified Taxonomy (FIG. 1: 001). Such is the power of CITS, through the defined algorithms employed to delineate financial transaction data according to a given taxonomy based on a series of fixed relationships between Categorical Transaction Tags Applied (FIG. 1: 930) and Unique Data Tags (FIG. 1: 945) a data flow is identified and therefore any financial transaction (FIG. 1: 400) can be inputted into a given system, recorded and manipulated into information such that the nature of the transaction is clear and therefore the aggregated information, confirmed by the user through User Action (FIG. 1: 3000), can be used for reporting purposes (FIG. 1: 1000).

1.6.3.4 Categorical Transaction Tags Applied (FIG. 1: 930)

As a result of the nature of the aforementioned commercially available API call (FIG. 1: 600), up to, but not limited to, three descriptive categories are algorithmically assigned to a given transaction and are referred to as Categorical Transaction Tags Applied (FIG. 1: 930). An exemplary embodiment of Categorical Transaction Tags Applied (FIG. 1: 930), keeping with the specific and non-limiting example described above, is shown in FIG. 25 Category Example: Non-Community Spending Report, as Entertainment (FIG. 25: 937), Nightlife (FIG. 25: 938) and Night Clubs (FIG. 25: 939). These tags act as the assimilation mechanism by which transactions pulled by the API call (FIG. 1: 600) are identified within CITS and allow for each transaction's unique, corresponding data structure to be identified.

A rather granular description is provided to the transaction given these categories. However, the data which is being described via Categorical Transaction Tags Applied (FIG. 1: 930) needs to be matched with a Unique Data Tag (FIG. 1: 945) relating to a specific level of a given data structure to begin the integration of the data point into the pre-defined data structure, dictated by the given taxonomy (FIG. 1: 001). In this process the coupling point between the Categorical Transaction Tag Applied (FIG. 1: 930) and the Unique Data Tag (FIG. 1: 945) is characterized by the most detailed and granular Categorical Transaction Tags Applied (FIG. 1: 930) available. According to this non-limiting example, the most detailed and granular Categorical Transaction Tags Applied (FIG. 1: 930) available is Night Clubs (FIG. 25: 939). As such, Night Clubs (FIG. 25: 939) is the Categorical Transaction Tag Applied (FIG. 1: 930) to this given transaction (FIG. 1: 400). Accordingly, it is now clear to one skilled in the art that the preceding, higher level, Categorical Transaction Tags Pulled [(FIG. 25: 937) & (FIG. 25: 938)] are now superfluous in this non-limiting example as the information inherent in these Categorical Transaction Tags Applied (FIG. 1: 930) can be determined via a fixed relationship. Specifically, the Sub-Expense Category Inclusive of Unique Data Tags, Night Clubs (FIG. 25: 203) must, by its very nature, be preceded by the Expense Category, Entertainment (FIG. 25: 205) and Entertainment must, by the very nature of the Unique Data Tag, be preceded by Non-Community Spending (FIG. 25: 207), and Non-Community Spending, by the construction of the reporting data structure, must be preceded by a predictable section of the Non-Community Spending Report (FIG. 25: 209). Please see FIG. 25, Backend Taxonomy: Non-Community Spending Report for visual embodiment of the defined data structure with exemplary data bin titles. Also, please see FIG. 25 Category Example: Non-Community Spending Report for a table illustrating the Categorical Transaction Tags, Data Structure Titles, Data Bin Titles, Data Flow, and Unique Data Tags as they relate to this non-limiting example.

1.6.3.5 Data Flow Identified (FIG. 1: 940) Via Unique Data Tag (FIG. 1: 945)

The algorithms which execute and provide this corollary relationship are designed to operate based on a fixed relationship between the Categorical Transaction Tag (FIG. 1: 930) and the Unique Data Tag (FIG. 1: 945). Specifically, the algorithms referenced here are capable of distilling each known combination of Categorical Transaction Tags (FIG. 1: 930) to the most detailed and granular Categorical Transaction Tag (FIG. 1: 930) assigned to a given transaction via the commercially available API call (FIG. 1: 600). Accordingly, each most detailed and granular level category of a given data structure, associated with an Identified Taxonomy (FIG. 1: 001), is also mapped with at least one Unique Data Tag (FIG. 1: 945). As such, it should be clear that this is the assimilation mechanism by which transactions pulled via the aforementioned API call (FIG. 1: 600) are tied to a given section of a given data structure arising from a given taxonomy (FIG. 1: 001). As previously noted, the Data Flow Identified (FIG. 1: 940) is then mapped as when considering the most detailed and granular Categorical Transaction Tag Applied (FIG. 1: 930) and its relationship to a Unique Data Tag (FIG. 1: 945) only one series of logical and predictable inductive data population steps is available given a fixed data structure. In keeping with the same example, the Sub-Expense Category Inclusive of Unique Data Tags, Night Clubs (FIG. 25: 939) must, by the very nature of the Unique Data Tag (FIG. 1: 945), be preceded by the Expense Category Entertainment and Entertainment must, by the data structure provided, be preceded by Non-Community Spending which is preceded by a predictable section of the Non-Community Spending Report.

It should be noted, this assimilation mechanism and its associated algorithms are one of the driving forces in uniting data pulled from a Financial Institution Data Base (FIG. 1: 510) or a personal Records Database (FIG. 1: 520) to a user's desired reports (FIG. 1: 1000), in keeping with this example, Aggregated E-Discovery (FIG. 1: 1050). As such, as this assimilation process is totally automated and free of required user involvement the data entry associated with the demonstrated e-discovery operations which previously required human performed data entry in operations such as, but not limited to, inputting expenses and identifying which are community and non-community in nature, are made unnecessary by the exemplary embodiment of CITS shown here.

1.6.3.6 Inductive Data Structure Propagation (FIG. 1: 950). See FIGS. 2A and 2B.

In keeping with this non-limiting example, the Categorical Transaction Tag Applied (FIG. 25: 939) once coupled with an associated Unique Data Tag (FIG. 1: 945) dictates a specific Data Flow Identification (FIG. 1: 940). As this data flow is designed according to a series of fixed relationships, the population of the most specific and granular level of a given data structure is sufficient to populate all of the preceding levels of that data structure without any additional descriptive tags or human input. As such, the inductive data propagation described here affects the remainder of the preceding data structure levels associated with a given data structure by populating each with an accurate and descriptive tag which indicates to the consumer of a given CITS report the nature, on a granular and highly descriptive level, of a given transaction or a given grouping of transactions.

To expand on this concept, for the non-limiting data structure described, and keeping with FIG. 25 Category Example: Non-Community Spending Report, resulting as a Non-Community Spending Report (FIG. 25: 209), contains the data flow steps of Non-Community Spending Report (FIG. 25: 209), Non-Community Spending (FIG. 25: 207), Expense Category (FIG. 25: 205) and Sub-Expense Categories Inclusive of Unique Data Tags (FIG. 25: 203) which are directly related and information updated on a lower level of this data structure will impact the higher levels with additional data population given fixed relationship algorithms thereby creating powerful and valuable financial information which does not require end user involvement or participation on any level. For example, the single data point being discussed here relating to an expense at a Night Club (FIG. 1: 400), once described via a Categorical Transaction Tag (FIG. 25: 939) and coupled to a Unique Data Tag (FIG. 1: 945) populates the Sub-Expense Category Inclusive of Unique Data Tags (FIG. 25: 203) of the defined data structure thereby leading to an inductive propagation of the remainder of the data structure. Specifically, this inductive propagation is as follows and is demonstrated as Data Bin Titles as seen on FIG. 25, column "Data Bin Title": Night Club (FIG. 25: 203), Entertainment (FIG. 25: 205), Non-Community Expense (FIG. 25: 207) and Non-Community Spending Report (FIG. 25: 209). Similarly, in keeping with the same example, the single data point being discussed here relating to an expense at a Night Club (FIG. 1: 400), once described via a Categorical Transaction Tag (FIG. 1: 930) and coupled to a Unique Data Tag (FIG. 1: 945) populates the Sub-Expense Category Inclusive of Unique Data Tags (FIG. 25: 203) thereby leading to an inductive propagation of the remainder of the data structure. Specifically, this inductive propagation is as follows and is demonstrated as Data Flow as seen on FIG. 25, column "Data Flow" where each additional level of propagation, facilitated by fixed relationship algorithms, is Sub-Expense Category Inclusive of Unique Data Tags: Night Clubs (FIG. 25: 203), Expense Category: Entertainment (FIG. 25: 205), Non-Community Spending (FIG. 25: 207) and Non-Community Spending Report (FIG. 25: 209) associated with the body investigating potential non-community fund expenditures.

In summary of these data structures as they operate according to Inductive Data Structure Propagation (FIG. 1: 950), given the fixed set of relationships between Unique Data Tags (FIG. 1: 945) and Categorical Transaction Tags (FIG. 1: 930), programmed algorithms inherent in CITS inductively propagate the data structure from the most specific level of the data structure towards the most generalized level of the data structure, and therefore taxonomy, such that human performed data entry inherent in Financial Investigation (FIG. 1: 200), including Family Court (FIG. 1: 201) operations, is entirely removed.

It is most optimal to perform this operation using inductive population as the Sub-Expense Category Inclusive of Unique Data Tags, Night Clubs (FIG. 25: 203) must, by the very nature of the Unique Data Tag (FIG. 1: 945), be preceded by the Expense Category, Entertainment (FIG. 25: 205) and Entertainment must, by the data structure provided, be preceded by Non-Community Spending (FIG. 25: 207) is preceded by a predictable section of the Non-Community Spending Report (FIG. 25: 209). When considering this process using deductive reasoning it is now clear that algorithms cannot be created which consistently and accurately predict subsequent and lower levels of a given taxonomy as fixed relationships of this nature do not exist.

As such, it should be clear that given the most detailed and granular Categorical Transaction Tag (FIG. 1: 930) algorithms inherent in CITS and the associated data structures and taxonomies eliminate the tedious and error prone task of data entry as it relates to Family Court operations 1.6.4 Potential User Involvement (FIG. 1: 2000)

There are a variety of ways in which the user may become involved in this process. One non-limiting example is the user being optionally notified that a new transaction, or a group of transactions, has been categorized and the corresponding data has been manipulated and turned into useable information which is manifested as a Non-Community Spending Report (FIG. 24: 209). The nature of these notifications could relate to only transactions which are classified as Non-Community Spending (FIG. 24: 207) or transactions classifications which are known to require further analysis.

This optional notification may act as a mechanism by which the user can ensure that the categorization chosen is correct. As such, user involvement of this nature can ensure that the transaction categorization was completed successfully and that the resulting updates impacting the Aggregated E-Discovery Information (FIG. 1: 1050) reflect accurate financial investigation as determined by the user, which may be one or both members of the couple; the attorneys or the judge for a given case.

1.6.5 Reports Provided for Analysis (FIG. 1: 1000) to User (FIG. 1: 2000)

The below sections provide a description of Reports (FIG. 1: 1000) which can be provided to the User (FIG. 1: 2000) for analysis used in financial decisions making as it related to a Non-Community Spending Report (FIG. 1: 201) and Aggregated E-Discovery Information (FIG. 1: 1050).

1.6.5.1 Aggregated E-Discovery Information (FIG. 1: 1050)

As suggested, the compiled financial transaction data could be used to create aggregated e-discovery which could show that one member of a couple either prior to or during a divorce process was engaged in non-community spending in an attempt to reduce available funds which otherwise would have been split, perhaps equally, between the two partners.

In modern family court this is an incredibly tedious process usually completed in Microsoft Excel. As such, the advancement in art described herein would greatly speed up this process and reduce timely and costly data entry and its accompanying error rates.

1.6.6 User Action (FIG. 1: 3000)

As a result of the reports created the user could take a number of actions to arrive at a more equitable agreement between the two members of the couple. Specifically, the user could use the information to reach a settlement outside of court as the evidence prepared could be overwhelming against the party engaging in non-community spending.

Alternatively, the reports created could also be used by the user during litigation to help in the process of awarding appropriate financial damages.

1.7 Money Laundering Investigation (FIG. 1: 202)

In the event an individual involved in a criminal or civil investigation is served a search warrant or other official decision requiring documents to be furnished to appropriate legal bodies, CITS could be applied in a number of instances. Specifically, CITS could be applied in situations in which money laundering was suspected.

If the investigative body gains access to an individual's bank records or credentials, a taxonomy could be applied using CITS such that expenses and incomes are organized according to the incomes and expenses corresponding to the individual's supposed business. This could be used in such a way that the total income and expenses of a business for a given time period, composed of all transactions and organized categorically, could become known in an extremely rapid fashion.

Because all expenses would be organized according to expense categories it would be evident if a shell business, which has a primary purpose of laundering money, was present as the income could far exceed the outflow of cash which would usually correspond to a business of the given industry and nature. Specifically, upon analyzing the cost of goods sold of the suspected shell business, which would be amalgamated and presented as categorical spending, the lacking of cost of goods sold which should correspond to goods actually created and sold or services rendered could be an indicator the suspected shell business is indeed designed for money laundering.

As Money Laundering Investigation (FIG. 1: 202) is related to the Financial Management (FIG. 1: 100) and Family Court (FIG. 1: 201) shown on FIG. 1, Master Figure many of the systems, methods and technical procedures are closely related when comparing Money Laundering Investigation (FIG. 1: 202) with these other embodiments. As such, it should be clear to those skilled in the art that the processes, systems and methodologies included in the previous sections can be employed in a similar or identical fashion in the context of this embodiment, namely, Money Laundering Investigation (FIG. 1: 202). As such, the following sections will not be included in the description of Money Laundering Investigation (FIG. 1: 202) and these sections are assumed to be conducted according to the same spirit and scope as defined in Business Accounting (FIG. 1: 101) as well as Family Court (FIG. 1: 201) and are namely: Individual Transaction Takes Place (FIG. 1: 400); Information Transferred (FIG. 1: 410) to Financial Institution Database (FIG. 1: 510); Connectivity (FIG. 1: 600); Server and Database Operations (FIG. 1: 800); CPU (FIG. 1: 810); I/O Interface (FIG. 1: 815); Storage (FIG. 1: 820); Processor (FIG. 1: 825); Network Connection (FIG. 1: 830) and Database Operations (FIG. 1: 835). It should also be noted that a variety of different embodiments obvious to those skilled in the art can be ascribed to the sections not included here which may be applied to this or other embodiments and applications without departing from the spirit and scope of the present invention. Thus, the present invention is not limited to the embodiments shown, but is to be accorded the widest scope consistent with the principles and features disclosed herein. As such, the sections which remain are those which dictate the predominant changes between one CITS embodiment and another.

1.7.1 Identification of Taxonomy (FIG. 1: 001)

Each CITS embodiment rests on at least one taxonomy (FIG. 1: 001) which acts as the data structure by which gathered financial transaction records are organized such that the data inherent in these transactions can culminate as powerful and valuable information. The structure chosen for these taxonomies is part of the working mechanism by which human dependent data entry is reduced which ultimately leads to the reduction of errors in data mining and analysis while increasing the timeliness of reports as unnecessary and superfluous data tags and data entry steps are removed. Accordingly, the taxonomy shown here and the corresponding data structure is representative of an embodiment of a fewest possible categorical delineations thereby eliminating any unnecessary data entry and/or computing system requirements.

The taxonomy in this non-limiting example was chosen for several primary reasons. The first of which was to choose a taxonomy such that unnecessary data entry and tagging was eliminated to the greatest possible degree thereby decreasing a leading source of financial investigation error. The second was to choose a taxonomy which was realistically able to employ current information technology and API calls run against financial institution, merchant and/or personal record databases. The third was to choose a taxonomy such that the available data could be turned into information which could be easily searched and organized by relevant legal personnel and also provide the foundation for a ratio analysis which might lead to or indicate illegal money laundering activities.

FIG. 26, Backend Taxonomy: Money Laundering Report shows this taxonomy visually as two data structures. These data structures act to facilitate the completion of the Money Laundering Report (FIG. 26: 220) for a given legal body seeking to investigate potential money laundering activities and is demonstrated as two primary data structures with the first being shown as process steps Income (FIG. 26: 210), Income Categories (FIG. 26: 208), Income Sub-Categories (FIG. 26: 206), and Income Granular Categories Inclusive of Unique Data Tags (FIG. 26: 204) and the second being shown as COGS (FIG. 26: 218), COGS Category (FIG. 26: 216), COGS Sub-Category (FIG. 26: 214) and COGS Granular Categories Inclusive of Unique Data Tags (FIG. 26: 212). The below sections speak directly to the delineation of this taxonomy with an emphasis on how this particular taxonomy accomplishes the aforementioned goals of reduced data entry; data entry error rates; enhancement of search and organization functions and enhanced timeliness and accuracy of reports. This section specifically references the flow of information and the ways in which information is collected using data pulling mechanisms, such as the aforementioned API call (FIG. 1: 600).

1.7.1.1 Income (FIG. 26: 210)

In this non-limiting example the first of the two data structures in this embodiment is titled at its highest level as Income (FIG. 26: 210) which represents the income of the business suspected of money laundering which is being investigated and CITS is being employed in that investigation. Income is chosen as the beginning hierarchy of this first data structure as it is ultimately the broadest, yet most relevant, categorical data bin or tag required in a money laundering investigation.

1.7.1.2 Income Categories (FIG. 26: 208)

The second level of this non-limiting example data structure is titled as Income Categories (FIG. 26: 208) and is made up of broad categories delineating Income (FIG. 26: 210). These categories act as a mechanism by which the nature of the transactions included in Income (FIG. 26: 210) can be readily apparent for searching and/or organizing relevant financial transactions (FIG. 1: 400) and the corresponding data points. The two broadest categories included in Income Categories (FIG. 26: 208) are Goods Sold and Services Provided thereby indicating the nature of the transactions contained within each of these categories which ultimately makes up the broader category, Income (FIG. 26: 210).

1.7.1.3 Income Sub-Categories (FIG. 26: 206)

The third level of this non-limiting example data structure is titled as Income Sub-Categories (FIG. 26: 206) and represents the nature of the preceding Income Category (FIG. 26: 208). As such, each Income Category (FIG. 26: 208) is made up of at least one Income Sub-Category (FIG. 26: 206) which delineates the nature of the transactions (FIG. 1: 400) that make up the corresponding Income Category (FIG. 26: 208). Specifically, the Income Category (FIG. 26: 208) titled Services Provided, linked to the parent category, Income (FIG. 26: 210), would be made up of the Income Sub-Categories (FIG. 26: 206) which describe the nature of the service being provided. For example, these could be titled automotive, business services, construction, Entertainment and/or home improvement.

1.7.1.4 Income Granular Categories Inclusive of Unique Data Tags (FIG. 26: 204)

As such, following the same line of inductive reasoning, each Income Sub-Category (FIG. 26: 206) should be made up of Income Granular Categories Inclusive of Unique Data Tags (FIG. 26: 204). Specifically, these Income Granular Categories Inclusive of Unique Data Tags (FIG. 26: 204) are composed of the most detailed information present in this CITS embodiment. Additionally, like the previously defined data structures represented in Financial Management (FIG. 1: 100) and Non-Community Spending Report (FIG. 1: 201), each one of these Income Granular Categories Inclusive of Unique Data Tags (FIG. 26: 204) has a Unique Data Tag (FIG. 1: 945) associated with it such that the Categorical Transactions Tags (FIG. 1: 930) indicate which transactions are associated with a specific and corresponding Income Granular Categories Inclusive of Unique Data Tags (FIG. 26: 204).

For example, the Income Granular Categories Inclusive of Unique Data Tags (FIG. 26: 204) of the Income Sub-Categories, Food and Drink (FIG. 26: 206) of the Income Categories, Goods Sold (FIG. 26: 208) of the parent category, Income (FIG. 26: 210) would be titled Wine Bar. Similarly, this implies that the Unique Data Tag (FIG. 1: 945) associated with each Income Granular Category Inclusive of Unique Data Tags (FIG. 26: 204) corresponds to a given Categorical Transaction Tag (FIG. 1: 930). As such, it should be clear that each transaction of a given business being investigated for money laundering requires at least one fixed relationship between two identification tags which indicate which specific Income Granular Category Inclusive of Unique Data Tags (FIG. 26: 204) that transaction relates to.

1.7.1.5 Cost of Goods Sold (FIG. 26: 218)

In this non-limiting example the second of the two data structures in this embodiment is titled at its highest level as COGS which represents the expenses of the business suspected of money laundering which are designated as COGS. COGS is chosen as the beginning hierarchy of this second data structure as it is ultimately the broadest, yet most relevant, categorical data tag required in a money laundering investigation.

1.7.1.6 COGS Categories (FIG. 26: 216)

The second level of this non-limiting example data structure is titled as COGS Categories (FIG. 26: 216) and is made up of broad categories delineating COGS (FIG. 26: 218). These categories act as a mechanism by which the nature of the transactions included in Cost of Goods Sold (FIG. 26: 218) can be readily apparent for searching and/or organizing relevant financial transactions (FIG. 1: 400) and the corresponding data points. The two broadest categories included in COGS Categories (FIG. 26: 216) are Goods Purchased and Services Acquired thereby indicating the nature of the transactions contained within each of these categories which ultimately makes up the broader category, Cost of Goods Sold (FIG. 26: 218).

1.7.1.7 COGS Sub-Categories (FIG. 26: 214)

The third level of this non-limiting example data structure is titled as COGS Sub-Categories (FIG. 26: 214) and represents the nature of the preceding COGS Category (FIG. 26: 216). As such, each COGS Category (FIG. 26: 216) is made up of at least one COGS Sub-Category (FIG. 26: 214) which delineates the nature of the transactions (FIG. 1: 400) that make up the corresponding COGS Category (FIG. 26: 216). Specifically, the COGS Category (FIG. 26: 216) titled Goods Purchased, linked to the parent category, Cost of Goods Sold (FIG. 26: 218), would be made up of the COGS Sub-Categories (FIG. 26: 214) which describe the nature of the service being provided. For example, these could be titled automotive parts, construction materials and/or Food and Drink.

1.7.1.8 COGS Granular Categories Inclusive of Unique Data Tags (FIG. 26: 212)

As such, following the same line of inductive reasoning, each COGS Sub-Category (FIG. 26: 214) should be made up of COGS Granular Categories Inclusive of Unique Data Tags (FIG. 26: 212). Specifically, these COGS Granular Categories Inclusive of Unique Data Tags (FIG. 26: 212) are composed of the most detailed information present in this CITS embodiment. Additionally, like the previously defined data structures represented in Financial Management (FIG. 1: 100) and Non-Community Spending Report (FIG. 1: 201) and the preceding data structure of this section, each one of these COGS Granular Categories Inclusive of Unique Data Tags (FIG. 26: 212) has a Unique Data Tag (FIG. 1: 945) associated with it such that the Categorical Transactions Tags (FIG. 1: 930) indicate which transactions are associated with a specific and corresponding COGS Granular Categories Inclusive of Unique Data Tags (FIG. 26: 212).

For example, COGS Granular Categories Inclusive of Unique Data Tags (FIG. 26: 212) of the COGS Sub-Categories, Food and Drink (FIG. 26: 214) of the COGS Categories, Goods Purchased (FIG. 26: 216) of the parent category, Cost of Goods Sold (FIG. 26: 218) would be titled Wine and Other Alcohol. Similarly, this implies that the Unique Data Tag (FIG. 1: 945) associated with each COGS Granular Category Inclusive of Unique Data Tags (FIG. 26: 212) corresponds to a given Categorical Transaction Tag (FIG. 1: 930). As such, it should be clear that each transaction of a given business being investigated for money laundering requires at least one fixed relationship between two identification tags which indicate which specific COGS Granular Category Inclusive of Unique Data Tags (FIG. 26: 212) that transaction relates to.

As such, given this non-limiting example, the Identification of the Taxonomy (FIG. 1: 001) consists of one unique taxonomy designed to provide users of CITS with an accurate, thorough and complete Money Laundering Report inclusive of the cost of goods sold and incomes for the given business being investigated for money laundering and this report is shown as Money Laundering Report (FIG. 26: 220). This taxonomy is made up of two unique data structures, one to identify and amalgamate income and the second to identify and amalgamate cost of goods sold. The first data structure, designed to provide users of CITS with the income for a business being investigated (FIG. 26: 210) is made up of four levels: Income (FIG. 26: 210), Income Categories (FIG. 26: 208), Income Sub-Categories (FIG. 26: 206) and Income Granular Categories Inclusive of Unique Data Tags (FIG. 26: 204). The second data structure, designed to produce users of CITS with the cost of goods sold for a business being investigated (FIG. 26: 218) is made up of four levels: Cost of Goods Sold (FIG. 26: 218), COGS Categories (FIG. 26: 216), COGS Sub-Categories (FIG. 26: 214) and COGS Granular Categories Inclusive of Unique Data Tags (FIG. 26: 212).

1.7.2 Data Gathering

As the previous section describes how a taxonomy (FIG. 1: 001), and two accompanying data structures, are developed to ensure minimal data entry and the fewest possible processing steps, this section explores how this data is gathered (FIG. 1: 600), how the data is populated and manipulated throughout the system (FIG. 1: 700) and how information (FIG. 1: 1000) is created based around an example transaction (FIG. 1: 400). In essence, the taxonomy and data structures, although a pivotal construct, are themselves insufficient to service the aforementioned goals of reduced data entry; reduced data entry error rates; enhanced search and organization functions and increased timeliness and accuracy of reports leading to greater investigative analysis as it relates to suspected money laundering.

1.7.2.1 Data Applied to Taxonomy (FIG. 1: 700)

This section explores how financial transaction data embodied as individual income and expense transactions (FIG. 1: 400), are pulled by the aforementioned API call (FIG. 1: 600), and is manipulated on a server, database and algorithmic level thereby applying that data to the pre-defined taxonomy (FIG. 1: 001) and data structures in such a way that data is turned into meaningful information (FIG. 1: 1000) per the pre-defined data flows shown in FIG. 26, Backend Taxonomy: Money Laundering Report. This step is pivotal in the CITS embodiments as it is the technical procedure by which the data gathered from the financial institution is manipulated according to the predefined taxonomy (FIG. 1: 001) therefore creating valuable information which can be turned into reports (FIG. 1: 1000) allowing users to take action (FIG. 1: 3000) according to the information provided. The information created in this step is inherently more accurate relative to existing data entry processes and is categorized in a superior way relative to existing categorization algorithms as the user can confirm categorization at their discretion by being optionally notified (FIG. 1: 2000) of a given categorization or set of categorizations [(FIG. 1: 945) and/or (FIG. 1: 930)].

1.7.2.2 Proprietary Algorithms (FIG. 1: 900)

The below section explores proprietary algorithms which are partially designed to correlate the Categorical Transaction Tags (FIG. 1: 930) of a given transaction (FIG. 1: 400) with Unique Data Tags (FIG. 1: 945) thereby identifying a specific data flow belonging to one of the two described data structures; the first of these data structures shown in this embodiment as process steps Income (FIG. 26: 210), Income Categories (FIG. 26: 208), Income Sub-Categories (FIG. 26: 206) and Income Granular Categories Inclusive of Unique Data Tags (FIG. 26: 204) and the second of these data structures shown as process steps Cost of Goods Sold (FIG. 26: 218), COGS Categories (FIG. 26: 216), COGS Sub-Categories (FIG. 26: 214) and COGS Granular Categories Inclusive of Unique Data Tags (FIG. 26: 212), which are, as previously explained, the components of two unique data structures which are hierarchically dictated given the taxonomy identification (FIG. 1: 001).

1.7.2.3 Data Interface (910)

The Data Interface (FIG. 1: 910) is a mechanism, to be conducted via one or more computers or machine systems, which dictates the frequency at which the above described API call (FIG. 1: 600) is run and once this schedule is set executes the necessary commands for the API call (FIG. 1: 600) to take place. The Data Interface (FIG. 1: 910) itself can be structured via human input embodying specific relationships or data structures or can be the output of a secondary heuristic computing system, programmed to operate according to a system of one more computers or machines.

In the context of this non-limiting example, the aforementioned API call (FIG. 1: 600) will be required to gather financial transaction data concerning the financial transactions (FIG. 1: 400) of the business being investigated for money laundering. As such, there will be variability between users with regards to the frequency at which the API call (FIG. 1: 600) is run. For instance, a business being investigated which has had its financial activity terminated by an investigative body will have this API call (FIG. 1: 600) executed fewer times, perhaps only once, relative to a business being investigated which has ongoing financial operations.

As such, this Data Interface (FIG. 1: 910) is designed such that the investigative body is best served based off the financial transaction trends of the business being investigated while simultaneously reducing the computing and/or system requirements needed to employ CITS, for instance as compared to, if the API call (FIG. 1: 600) was executed continuously for all businesses being investigated regardless if the associated financial activity was terminated or not.

1.7.2.4 Data Point Identified (FIG. 1: 920)

Each API call (FIG. 1: 600) can pull a number of transactions; however, it is important for teaching purposes to demonstrate only a few data points, which should be considered single, but separate, transactions (FIG. 1: 400), as they are augmented by operations inherent to CITS. As such, in the context of this non-limiting example, two data points as they operate within CITS will be described. In this description, which diverges from the previous, two data points are being chosen as the working mechanism inherent to this embodiment for a ratio analysis conducted relative to cost of goods sold and income. These example data points, in keeping with non-limiting examples which, in this case, are the purchase of goods required to maintain ongoing business operations for a wine bar being investigated for money laundering, namely the purchase of Wine and Other Alcohol (FIG. 1: 400) and Income categorized as Wine Bar (FIG. 1: 400). The Wine Bar data point should be considered according to the first data structure by which the Money Laundering Report (FIG. 1: 220) is partially made up of Income (FIG. 26: 210) where the Income Category is Goods Sold (FIG. 26: 208), the Income Sub-Category is Food and Drink (FIG. 26: 206) and the Income Granular Category Inclusive of Unique Data Tag is Wine Bar (FIG. 26: 204). The Wine and Other Alcohol purchased data point should be considered according to the second described data structure by which the Money Laundering Report (FIG. 26: 220) is partially made up of Cost of Goods Sold (FIG. 26: 218) where the COGS Category is Goods Purchased (FIG. 26: 216), the COGS Sub-Category is Food and Drink (FIG. 26: 214) and the COGS Granular Category Inclusive of Unique Data Tags is Wine and Other Alcohol (FIG. 26: 212).

However, it should be noted as in the other previously described embodiments, it is technically feasible and advantageous to run these defined operations against many data points simultaneously. As such, a practical CITS system which services a single or many investigations into potential money laundering should have the capacity to identify many data points simultaneously and pass these data points through the two previously defined data structures.

It is important from a teaching perspective that a single data point be identified and explained as each data point gathered could have a unique set of Categorical Transaction Tags Applied (FIG. 1: 930) corresponding to a Unique Data Tag (FIG. 1: 945) and therefore a unique data flow within the data structure based on the Identified Taxonomy (FIG. 1: 001). Such is the power of CITS, through the defined algorithms employed to delineate financial transaction data according to a given taxonomy based on a series of fixed relationships between Categorical Transaction Tags Applied (FIG. 1: 930) and Unique Data Tags (FIG. 1: 945) a data flow is identified and therefore any financial transaction can be inputted into a given system, recorded and manipulated into information such that the nature of the transaction is clear and therefore the aggregated information, confirmed by the user, can be used for reporting purposes (FIG. 1: 1000) and User Action (FIG. 1: 3000).

1.7.2.5 Categorical Transaction Tags Applied (FIG. 1: 930)

As a result of the nature of the aforementioned commercially available API call (FIG. 1: 600), up to, but not limited to, three descriptive categories are algorithmically assigned to a given transaction and are referred to as Categorical Transaction Tags Applied (FIG. 1: 930). An exemplary embodiment of Categorical Transaction Tags Applied (FIG. 1: 930), keeping with the two specific and non-limiting examples described above, is shown for the Wine Bar Income data point as FIG. 27 Category Example: Money Laundering Investigation—Wine Bar Income, as Goods (FIG. 27: 940), Food and Drink (FIG. 27: 941) and Wine Bar (FIG. 27: 942) and the second data point, Wine and Other Alcohol cost of goods sold, is shown as FIG. 28 Category Example: Money Laundering Investigation—Wine and Other Alcohol Cost of Goods Sold, as Goods Purchased (FIG. 28: 943), Food and Drink (FIG. 28: 944) and Wine and Other Alcohol (FIG. 28: 945). These tags act as the assimilation mechanism by which transactions pulled by the API call (FIG. 1: 600) are identified within CITS and allow for each transaction's corresponding data structure to be identified.

A rather granular description is provided to the two exemplary transactions given these categories. However, the data which is being described via Categorical Transaction Tags Applied (FIG. 1: 930) needs to be matched with a Unique Data Tag (FIG. 1: 945) relating to a specific level of a given data structure to begin the integration of the data point into the pre-defined data structure, dictated by the Identified Taxonomy (FIG. 1: 001). In this process the coupling point between the Categorical Transaction Tags Applied (FIG. 1: 930) and the Unique Data Tag (FIG. 1: 945) is the most detailed and granular Categorical Transaction Tags Applied (FIG. 1: 930) available. According to this non-limiting example, the most detailed and granular Categorical Transaction Tags Applied (FIG. 1: 930) available as it relates to the first data point is Wine Bar (FIG. 27: 942). Similarly, according to this non-limiting example, the most detailed and granular Categorical Transaction Tags Applied (FIG. 1: 930) available as it relates to the second data point is Wine and Other Alcohol (FIG. 28: 945). As such, Wine Bar (FIG. 27: 942) is the Categorical Transaction Tag Applied (FIG. 1: 930) to the first data point and Wine and Other Alcohol (FIG. 28: 945) is the Categorical Transaction Tag Applied (FIG. 1: 930) applied to the second data point. As such, it is now clear to one skilled in the art that the preceding, higher level, Categorical Transaction Tags Applied (FIG. 1: 930) are now superfluous in this non-limiting example as the information inherent in these Categorical Transaction Tags Applied (FIG. 1: 930) can be determined via a fixed relationship. Specifically, for the first data point, the Income Granular Category Inclusive of Unique Data Tag Wine Bar (FIG. 27: 204) must, by its very nature, be preceded by the Income Sub-Category Food and Drink (FIG. 27: 206) which must, by its very nature, be preceded by Income Category Goods Sold (FIG. 27: 208) which must, by its very nature, be preceded by Income (FIG. 27: 210) which must, by the data structure provided, relate to a predictable section of a Money Laundering Report (FIG. 27: 220). Specifically, for the second data point, the Cost of Goods Sold Granular Category Inclusive of Unique Data Tag Wine and Other Alcohol (FIG. 28: 212) must, by its very nature, be preceded by the COGS Sub-Category Food and Drink (FIG. 28: 214) which must, by its very nature, be preceded by COGS Category Goods Purchased (FIG. 28: 216) and Goods Purchased (FIG. 28: 216) must, by the nature of the business, be preceded by Cost of Goods Sold (FIG. 28: 218) which must, by the data structure provided, relate to a predictable section of a Money Laundering Report (FIG. 28: 220). Please see FIG. 27 Category Example: Money Laundering Investigation—Wine Bar Income for a table illustrating the Data Structure Titles, Data Bin Titles, Data Flow, Unique Data Tags and Categorical Transaction Tags as they relate to this non-limiting example as they relate to the first data point of this non-limiting example and FIG. 28 Category Example: Money Laundering Investigation—Wine and Other Alcohol cost of goods sold for a table illustrating the Data Structure Titles, Data Bin Titles, Data Flow, Unique Data Tags and Categorical Transaction Tags as they relate to this non-limiting example.

1.7.2.6 Data Flow Identified (FIG. 1: 940) Via Unique Data Tag (FIG. 1: 945)

The algorithms which execute and provide this corollary relationship are designed to operate based on a fixed relationship between the Categorical Transaction Tag (FIG. 1: 930) and the Unique Data Tag (FIG. 1: 945). Specifically, the algorithms referenced here are capable of distilling each known combination of Categorical Transaction Tags (FIG. 1: 930) to the most detailed and granular Categorical Transaction Tag (FIG. 1: 930) assigned to a given transaction via the commercially available API call (FIG. 1: 600). Accordingly, each most detailed and granular level category of a given data structure, associated with a given taxonomy (FIG. 1: 001), is also mapped with at least one Unique Data Tag (FIG. 1: 945). As such, it should be clear that this is the assimilation mechanism by which transactions pulled via the aforementioned API call (FIG. 1: 600) are tied to a given section of a given data structure arising from a given taxonomy (FIG. 1: 001). As previously noted, the Data Flow Identified (FIG. 1: 940) is then mapped as when considering the most detailed and granular Categorical Transaction Tag (FIG. 1: 930) and its relationship to a Unique Data Tag (FIG. 1: 945) only one series of logical and predictable inductive data population steps is available given a fixed data structure. In keeping with the same non-limiting examples, and as it relates to the first data point, the Income Granular Categories Inclusive of Unique Data Tags Wine Bar (FIG. 27: 204) must, by its very nature, be preceded by the Income Sub-Category Food and Drink (FIG. 27: 206) which must, by its very nature, be preceded by the Income Category Goods Sold (FIG. 27: 208) which must, by its very nature, be preceded by Income (FIG. 27: 210) which must, by the data structure provided, relate to a predictable section of a Money Laundering Report (FIG. 27: 220). Similarly, as it relates to the second data point, the COGS Granular Categories Inclusive of Unique Data Tags Wine and Other Alcohol (FIG. 28: 212) must, by its very nature, be preceded by the COGS Sub-Category Food and Drink (FIG. 28: 214) which must, by its very nature, be preceded by the COGS Category Goods Purchases (FIG. 28: 216) which must, by its very nature, be preceded by Cost of Goods Sold (FIG. 28: 218) which must, by the data structure provided, relate to a predictable section of a Money Laundering Report (FIG. 28: 220). It should be clear, in the context of this non-limiting example, that when considering any other data structure path besides the one presented the data pulled via the API call (FIG. 1: 600) from the Merchant Database (FIG. 1: 500), Financial Institution Database (FIG. 1: 510) and/or Personal Records Database (FIG. 1: 520) cannot be transformed into valuable information.

It should be noted, this assimilation mechanism and its associated algorithms are one of the driving forces in uniting data pulled from a Merchant Database (FIG. 1: 500), Financial Institution Database (FIG. 1: 510) and/or Personal Records Database (FIG. 1: 520) to the desired reports (FIG. 1: 1000), in keeping with this example. As such, as this assimilation process is totally automated and free of required user involvement the data entry associated with any financial analysis relating to money laundering investigation which previously required human performed data entry in operations such as, but not limited to, inputting expense and income records into a given analysis system, are made unnecessary by the exemplary embodiment of CITS shown here.

1.7.2.7 Inductive Data Structure Propagation (FIG. 1: 950)

In keeping with this non-limiting example, the Categorical Transaction Tag (FIG. 1: 930) once coupled with an associated Unique Data Tag (FIG. 1: 945) dictates a specific Data Flow Identification (FIG. 1: 940). As this data flow is designed according to a series of fixed relationships, the population of the most specific and granular level of a given data structure is sufficient to populate all of the preceding levels of that data structure. As such, the inductive data propagation described here affects the remainder of the preceding data structure levels associated with a given data structure by populating each with an accurate and descriptive tag which indicates to the consumer of a given CITS report the nature, on a granular and highly descriptive level, of a given transaction or a given grouping of transaction.

To expand on this concept, for the first data structure described, and keeping with FIG. 27 contains the data flow steps Income (FIG. 27: 210), Income Categories (FIG. 27: 208), Income Sub-Categories (FIG. 27: 206) and Income Granular Categories Inclusive of Unique Data Tags (FIG. 27: 204) and for the second data structure described contains the data flow steps Cost of Goods Sold (FIG. 28: 218), COGS Categories (FIG. 28: 216), COGS Sub-Categories (FIG. 28: 214) and COGS Granular Categories Inclusive of Unique Data tags (FIG. 28: 212) which, as it relates to both data structures, are directly related and information updated on a lower level of this data structure will impact the higher levels with additional data population given fixed relationship algorithms thereby creating powerful and valuable financial information which does not require end user involvement or participation on any level. For example, relating to the first data point being discussed here relating to income generated from wine bar sales (FIG. 1: 400), once described via a Categorical Transaction Tag (FIG. 1: 930) and coupled to a Unique Data Tag (FIG. 1: 945) populates the Income Granular Category Inclusive of Unique Data Tags (FIG. 27: 204) of the first data structure described thereby leading to an inductive propagation of the remainder of the data structure. Specifically, this inductive propagation is as follows and is demonstrated as Data Bin Titles as seen in FIG. 27 column "Data Bin Title" and shown as a data flow under column "Data Flow": Wine Bar (FIG. 27: 204), Food and Drink (FIG. 27: 206), Goods Sold (FIG. 27: 208), Income (FIG. 27: 210) and Money Laundering Report (FIG. 27: 220). Similarly, relating to the second data point being discussed here relating to cost of goods sold incurred from the purchase of Wine and Other Alcohol (FIG. 1: 400), once described via a Categorical Transaction Tag (FIG. 1: 930) and coupled to a Unique Data Tag (FIG. 1: 945) populates the COGS Granular Category Inclusive of Unique Data Tag (FIG. 28: 212) of the second data structured described thereby leading to an inductive propagation of the remainder of the data structure. Specifically, this inductive propagation is as follows and is demonstrated as Data Bin Titles as seen in FIG. 28 column "Data Bin Title" and shown as a data flow under column "Data Flow": Wine and Other Alcohol (FIG. 28: 212), Food and Drink (FIG. 28: 214), Goods Purchased (FIG. 28: 216), Cost of Goods Sold (FIG. 28: 218) and Money Laundering Report (FIG. 28: 220).

In summary of these data structures as they operate according to Inductive Data Structure Propagation (FIG. 1: 950), given the fixed set of relationships between Unique Data Tags (FIG. 1: 945) and Categorical Transaction Tags (FIG. 1: 930), programmed algorithms inherent in CITS, and as described above, inductively propagate the data structure from the most specific level of the data structure towards the most generalized level of the data structure, and therefore taxonomy, such that human performed data entry inherent in financial analysis, including tax and accounting operations, is entirely removed.

It is most optimal to perform this operation using inductive population as, for the first data point being described, Wine Bar must, by its very nature, be preceded by Food and Drink and Food and Drink must, by its very nature, be preceded by Goods Sold and Goods Sold must, by its very nature, be preceded by Income and Income, per the data structure provided, and is directly related to a predictable section of a given Money Laundering Report. Similarly, for the second data point being described, Wine and Other Alcohol must, by its very nature, be preceded by Food and Drink and Food and Drink must, by its very nature, be preceded by Goods Purchased and Goods Purchased must, by its very nature, be preceded by Cost of Goods Sold and Cost of Goods Sold, per the data structure provided, is directly related to a predictable section of a given Money Laundering Report. When considering this process using deductive reasoning it is now clear that algorithms cannot be created which consistently and accurately predict subsequent and lower levels of a given taxonomy as fixed relationships of this nature do not exist.

As such, it should be clear that given the most detailed and granular Categorical Transaction Tag (FIG. 1: 930) algorithms (FIG. 1: 900) inherent in CITS and the associated data structures and taxonomies eliminate the tedious and error prone task of data entry as it relates to accounting and tax operations.

1.7.3 Potential User Involvement (FIG. 1: 2000)

There are a variety of ways in which the user may become involved in this process to confirm categorization and data flow (FIG. 1: 2000). One non-limiting example is the user being optionally notified via a Digital Notification (FIG. 1: 2020) that a new transaction, or a group of transactions, has been categorized and the corresponding data has been manipulated and turned into useable information which is manifested as a Money Laundering Report (FIG. 26: 220). The nature of these notifications could indicate that certain sized batches of financial transaction data have been analyzed and amalgamated and are therefore ready for ratio or other types of investigative analysis matching the nature of this embodiment.

This optional notification may act as a mechanism by which the user can ensure that the categorization chosen is correct (FIG. 1: 2010). As such, user involvement of this nature can ensure that the transaction categorization was completed successfully and that the resulting updates impacting the Money Laundering Report (FIG. 1: 1080) reflect accurate investigative financial analysis as determined by the user.

Similarly, the user may wish to be optionally notified of a given transaction categorization, or set of categorizations, to monitor spending habits of a given nature. This could act as a mechanism by which investigative bodies could narrow the available information thereby enhancing the organization and search functions of a given set of e-discovery.

1.7.4 Reports Provided for Analysis (FIG. 1: 1000) to User (FIG. 1: 2000)

The below sections provides a description of Reports (FIG. 1: 1000) which can be provided to the User (FIG. 1: 2000) for analysis used in financial investigation as it relates to a Money Laundering Report (FIG. 26: 220) and also provided below is a description of an additional calculation suite which could be used to enhance the investigative power of the Money Laundering Report (FIG. 1: 1080).

1.7.4.1 Money Laundering Reports (FIG. 1: 1080)

As suggested, the compiled financial transaction data could be used to create aggregated e-discovery which could lead to an indication that the income for a business being investigated outstrips existing cost of goods sold thereby indicating that money laundering could be taking place.

The additional calculation suite which could be included in this report to enhance its investigative power would be the inclusion of a ratio analysis comprising an operation of calculating by computer, a ratio between income and cost of goods sold to concisely determine a discrepancy between income and cost of goods sold which could indicate that insufficient goods are available to produce the level of income being achieved. Specifically, in keeping with the two non-limiting exemplary data points discussed throughout this section, if the Cost of Goods Sold amount as it relates to the purchase of Wine and Other Alcohol was substantially less than the indicated income, according to defined variances considering current market prices of wine being sold at Wine Bars and current market prices of the purchase of Wine and Other Alcohol, then this discrepancy could act as an indicator to an investigative body that money laundering activities are potentially taking place. In embodiments, this operation may comprise comparing the ratio previously calculated with a ratio calculated based on the current market prices of wine being sold at Wine Bars and current market prices of the purchase of Wine and Other Alcohol.

As such, a Money Laundering Report (FIG. 26: 220) inclusive of this additional analysis suite would provide powerful and insightful information to investigative bodies which did not require user involvement in any step of the data propagation or analysis outside of setting appropriate variances given the goods and/or services being purchased and provided and indicating the nature of the Data Interface (FIG. 1: 910).

According to the current practices seen in modern money laundering investigation this process is usually an incredibly tedious one often completed in Microsoft Excel. As such, the advancement in art described herein would greatly speed up this process and reduce timely and costly data entry and its accompanying error rates as it relates to investigative efforts.

1.7.5 User Action (FIG. 1: 3000)

As a result of the reports created the user, in this case an investigative body, could take a number of actions to further or conclude the investigation into potential money laundering activities. Specifically, the user could use the information to reach an agreement outside of court as the evidence prepared could be overwhelming to defend against for the party engaging in suspected money laundering. Additionally, the reports created could also be used by the investigative body during litigation to help in the process of indicating guilt as it relates to money laundering.

Conversely, the Money Laundering Reports (FIG. 1: 1080) provided given the ratio between cost of goods sold and income could indicate that the likelihood of money laundering taking place is very unlikely and the investigation could be terminated.

1.8 Financial Analysis (FIG. 1: 300)

Through modern information technology a variety of solutions exist to help aid the tax analysis and audit investigation process as facilitated by the IRS. The below sections explore non-limiting examples of how the CITS system can be applied to financial analysis. The embodiment chosen is Tax Analysis Performed by the IRS for investigative and potentially auditing purposes. The example has been chosen for teaching purposes to illustrate to those skilled in the art how CITS can be applied to a host of applications in the financial analysis area of study and analysis.

1.9 Tax Analysis Performed by IRS (FIG. 1: 301)

A possible embodiment which could be employed in the public sector would be ensuring that taxes, filed by both businesses and individuals are done so accurately. For instance, using a similar taxonomy to that employed for the small business filing the IRS 1040 Schedule C, a government body on a state or federal level could request that a user's banking records or credentials be delivered along with the tax filing. By applying this data to a CITS embodiment the government body could employ a taxonomy based on the questions in the applicable tax form. After transactions are organized according to this particular taxonomy the necessary calculations could be performed and the relevant tax filing could be recreated. The government body could use this as a reference point relative to the tax filings received from the individual or business and identify significant discrepancies. These discrepancies might act as a sound and quantifiable source of investigation as financial obfuscation on the part of the individual or business being investigated would be eliminated as the investigative body would have direct access to financial records. These investigations could help to narrow the exceedingly wide gap between tax dues and tax collections.

As IRS Tax Analysis (FIG. 1: 301) is related to the Financial Management (FIG. 1: 100) and Financial Investigation (FIG. 1: 200) branches shown on FIG. 1, Master Figure many of the systems, methods and technical procedures are closely related when comparing IRS Tax Analysis (FIG. 1: 301) with these other embodiments. As such, it should be clear to those skilled in the art that the processes, systems and methodologies included in the previous sections can be employed in a similar or identical fashion in the context of this embodiment, namely, IRS Tax Analysis (FIG. 1: 301). As such, the following sections will not be included in the description of IRS Tax Analysis (FIG. 1: 301) and these sections are assumed to be conducted according to the same spirit and scope as defined in the Financial Management (FIG. 1: 100) and Financial Investigation (FIG. 1: 200) branches and are namely: Individual Transaction Takes Place (FIG. 1: 400); Information Transferred (FIG. 1: 410) to Financial Institution Database (FIG. 1: 510); Connectivity (FIG. 1: 600); Server and Database Operations (FIG. 1: 800); CPU (FIG. 1: 810); I/O Interface (FIG. 1: 815); Storage (FIG. 1: 820); Processor (FIG. 1: 825); Network Connection (FIG. 1: 830) and Database Operations (FIG. 1: 835). It should also be noted that a variety of different embodiments obvious to those skilled in the art can be ascribed to the sections not included here which may be applied to this or other embodiments and applications without departing from the spirit and scope of the present invention. Thus, the present invention is not limited to the embodiments shown, but is to be accorded the widest scope consistent with the principles and features disclosed herein. As such, the sections which remain are those which dictate the predominant changes between one CITS embodiment and another.

1.9.1 Identification of Taxonomy (FIG. 1: 001)

Each CITS embodiment rests on at least one taxonomy (FIG. 1: 001) which acts as the data structure by which gathered financial transaction records are organized such that the data inherent in these transactions can culminate as powerful and valuable information. The structure chosen for these taxonomies is part of the working mechanism by which human dependent data entry is reduced which ultimately leads to the reduction of errors in data mining and analysis while increasing the timeliness of reports as unnecessary and superfluous data tags and data entry steps are removed. Accordingly, the taxonomy shown here and the corresponding data structures are representative of the fewest possible categorical delineations thereby eliminating any unnecessary data entry and/or computing system requirements.

The taxonomy in this non-limiting example was chosen for several primary reasons. The first of which was to choose a taxonomy that would allow for accurate, thorough and complete adherence to existing IRS tax code for privately held businesses and individuals such that the filings could be analyzed by the IRS in an effort to ensure accuracy and adherence to existing IRS code and US tax law. The second was to ensure that the taxonomy chosen would eliminate the unnecessary data entry and tagging inherent in existing financial analysis thereby decreasing a leading source of data analysis and investigative error. The third was to choose a taxonomy which was realistically able to employ current information technology and API calls run against financial institution databases.

FIG. 29, Backend Taxonomy: IRS Analysis Report shows this taxonomy visually as a single data structure. This data structures represents the completion of the relevant IRS income filing for a given business being investigated during an IRS performed tax analysis and is demonstrated as process steps IRS Analysis Report (FIG. 29: 313), IRS Income Filing (FIG. 29: 311), Tax Analysis Primary Category (FIG. 29: 309) and Tax Analysis Sub-Category (FIG. 29: 307), Tax Analysis Granular Categories (FIG. 29: 305), Tax Analysis Sub-Granular Categories (FIG. 29: 303) and Tax Analysis Tertiary Categories Inclusive of Unique Data Tags (FIG. 29: 301). The below sections speak directly to the delineation of this taxonomy with an emphasis on how this particular taxonomy accomplishes the aforementioned goals of reduced data entry, data entry error rates and enhanced timeliness and accuracy of investigative reports. This section specifically references the flow of information, the ways in which information is collected using data pulling mechanisms, such as the aforementioned API call (FIG. 1: 600).

1.9.1.1 IRS Analysis Report (FIG. 29: 313)

In this non-limiting example the data structure represents the completion of an IRS Analysis Report (FIG. 29: 313) and represents the terminating level of the data structure. According to this non-limiting example, this IRS Analysis Report (FIG. 29: 313) is made up of a granular level recreation of a given individuals or businesses' tax filing made up of all relevant financial questions. This report is shown as it represents a mechanism by which the provided IRS filing can be assessed according to an objectively created one thereby providing a benchmark to investigate potential discrepancies which could indicate intentional tax evasion.

1.9.1.2 IRS Income Filing (FIG. 29: 311)

According to this non-limiting example the second level of the data structure is titled as IRS income filing (FIG. 29: 311) which should be the type of filing which the business or individual being analyzed filed. This filing is chosen as it reduces data entry and computing system requirements to the minimum possible level but ensures that thorough, complete and accurate IRS income filings are delivered to the IRS.

1.9.1.3 Tax Analysis Primary Categories (FIG. 29: 309)

The third level of this non-limiting example data structure is titled as Tax Analysis Primary Categories (FIG. 29: 309) which is a broad descriptive tag indicating the nature of the transaction it identifies. For example, these Tax Analysis Primary Categories (FIG. 29: 309) would be the delineation of the IRS Income Filing required by the type of business or individual being analyzed. In the case of a Sole Proprietorship using a 2014 1040 Schedule C these Tax Analysis Primary Categories (FIG. 29: 309) would be Income, Expense, Cost of Goods Sold, Vehicle and Other Expenses. As such, it should be noted that each Tax Analysis Primary Categories (FIG. 29: 309) is made up of the questions which correspond to that Tax Analysis Primary Categories (FIG. 29: 309). In keeping with the same non-limiting example of a Sole Proprietorship filing a 2014 IRS 1040 Schedule C and relating to the associated Tax Analysis Primary Categories (FIG. 29: 309) these would be questions one through seven for Income; eight through thirty-two for Expenses; thirty-three through forty-two for Cost of Goods Sold, forty-three through forty-seven for Vehicle Information and forty-eight for Other Expenses.

1.9.1.4 Tax Analysis Sub-Categories (FIG. 29: 307)

The fourth level of this non-limiting example taxonomy is titled as Tax Analysis Sub-Categories (FIG. 29: 307) and is made up of the individual question from the sets of questions defined by the Tax Analysis Primary Categories (FIG. 29: 309) from the IRS Income Filing (FIG. 29: 311) required for the type of business or individual being investigated. Specifically, all questions concerning the Tax Analysis Primary Category (FIG. 29: 309) titled Income would be contained within the Tax Analysis Sub-Categories (FIG. 29: 307). This implies that the Tax Analysis Sub-Categories (FIG. 29: 307) represents each one of these seven questions in a granular way such that each one of these sevens questions can be identified as the appropriate data bin of the data flow by employing a Unique Data Tag (FIG. 1: 945) associated with a specific and corresponding Categorical Transaction Tags (FIG. 1: 930) which indicates which transactions are associated with a specific Tax Analysis Sub-Categories (FIG. 29: 307). In keeping with the same non-limiting example of a Sole Proprietorship filing a 2014 IRS 1040 Schedule C and relating to an exemplary income transaction for automotive services, the Categorical Transaction Tag (FIG. 1: 930) for that given transaction would be associated to the specific Taxonomy Sub-Category via the Unique Data Tag (FIG. 1: 945) associated with automotive services income.

1.9.1.5 Tax Analysis Granular Categories (FIG. 29: 305)

The fifth level of this non-limiting example taxonomy is titled as Tax Analysis Granular Categories (FIG. 29: 305) and is made up of the individual and unique sections which can correspond to a given Tax Analysis Sub-Category (FIG. 29: 307). Specifically, in keeping with the same non-limiting example, according to a IRS Analysis Report (FIG. 29: 313) which is analyzing a business which filed 2014 IRS Income Filing 1040 Schedule C and relating to a data point which represents an income generating transaction (FIG. 1: 400) for the Tax Analysis Primary Category Income—Question One through Seven (FIG. 29: 309) and specifically relating to the Tax Analysis Sub-Category (FIG. 29: 307) Question One the Tax Analysis Granular Category (FIG. 29: 305) would be Services Provided. Accordingly, each Tax Analysis Sub-Category (FIG. 29: 307) should contain at least one Tax Analysis Granular Category (FIG. 29: 305) which acts to indicate the nature of transactions which should correspond to that specific question as it relates to the IRS Income Filing (FIG. 29: 311) pertaining to the business or individual being analyzed.

1.9.1.6 Tax Analysis Sub-Granular Categories (FIG. 29: 303)

The sixth level of this non-limiting example taxonomy is titled as Tax Analysis Sub-Granular Categories (FIG. 29: 303) and is made up descriptive identifiers which add an additional layer of definition to the specific transaction being analyzed. Specifically, in keeping with the same non-limiting example, according to a IRS Analysis Report (FIG. 29: 313) which is analyzing a business which filed 2014 IRS Income Filing 1040 Schedule C and relating to a data point which represents an income generating transaction (FIG. 1: 400) for the Tax Analysis Primary Category Income—Question One through Seven (FIG. 29: 309) and specifically relating to the Tax Analysis Sub-Category Question One (FIG. 29: 307) where the Tax Analysis Granular Category is Services Provided (FIG. 29: 305) and where the Tax Analysis Sub-Granular Category could be Automotive Services (FIG. 29: 303). Accordingly, each Tax Analysis Granular Category (FIG. 29: 305) should contain at least one Tax Analysis Sub-Granular Category (FIG. 29: 303) which acts to indicate the nature of transactions (FIG. 1: 400) which makeup that Tax Analysis Granular Category (FIG. 29: 305).

1.9.1.7 Tax Analysis Tertiary Categories Inclusive of Unique Data Tags (FIG. 29: 301)

As such, following the same line of inductive reasoning, each Tax Analysis Sub-Granular Category (FIG. 29: 303) should be made up of Tax Analysis Tertiary Categories Inclusive of Unique Data Tags (FIG. 29: 301) which add the final and most detailed delineation to the specific transaction being analyzed. Specifically, in keeping with the same non-limiting example, according to a IRS Analysis Report (FIG. 29: 313) which is analyzing a business which filed 2014 IRS Income Filing 1040 Schedule C and relating to a data point which represents an income generating transaction (FIG. 1: 400) for the Tax Analysis Primary Category Income—Question One through Seven (FIG. 29: 309) and specifically relating to the Tax Analysis Sub-Category Question One (FIG. 29: 307) where the Tax Analysis Granular Category is Services Provided (FIG. 29: 305) and the Tax Analysis Sub-Granular Category is Automotive Services (FIG. 29: 303) the Tax Analysis Tertiary Categories Inclusive of Unique Data Tags could be Towing (FIG. 29: 301). Similarly, this implies that the Unique Data Tag (FIG. 1: 945) associated with each Tax Analysis Tertiary Categories Inclusive of Unique Data Tags (FIG. 29: 301) corresponds to a given Categorical Transaction Tag (FIG. 1: 930). As such, it should be clear that each transaction of a given business requires at least one fixed relationship between two identification tags which indicate which specific Tax Analysis Tertiary Categories Inclusive of Unique Data Tags (FIG. 29: 301) that transaction relates to.

As such, given this non-limiting example, the Identification of the Taxonomy (FIG. 1: 001) consists of one unique data structure designed to provide users of CITS with accurate, thorough and complete IRS Analysis Reports (FIG. 29: 313) which can be used to evaluate the corresponding and submitted IRS Filings for potential tax fraud. This taxonomy is made up of one unique data structure employed to recreate the IRS income filing pertaining to the business or individual being analyzed. This data structure is made up of seven levels: IRS Analysis Report (FIG. 29: 313), IRS Income Filing (FIG. 29: 311), Tax Analysis Primary Categories (FIG. 29: 309) and Tax Analysis Sub-Categories (FIG. 29: 307), Tax Analysis Granular Categories (FIG. 29: 305), Tax Analysis Sub-Granular Categories (FIG. 29: 303) and Tax Analysis Tertiary Categories Inclusive of Unique Data Tags (FIG. 29: 301).

1.9.2 Data Gathering

As the previous section describes how a taxonomy (FIG. 1: 001), and an accompanying data structure are developed to ensure minimal data entry and fewest possible processing steps, this section explores how this data is gathered (FIG. 1: 600), how the data is populated and manipulated throughout the system (FIG. 1: 700) and how information (FIG. 1: 1000) is created based around an example transaction (FIG. 1: 400). In essence, the taxonomy and data structures, although a pivotal construct, are themselves insufficient to service the aforementioned goals of reduced data entry, reduced data entry error rates and increased timeliness and accuracy of reports.

1.9.3 Data Applied to Taxonomy (FIG. 1: 700)

This section explores how financial transaction data embodied as individual income and expense transactions (FIG. 1: 400), are pulled by the aforementioned API call (FIG. 1: 600), and is manipulated on a server, database and algorithmic level thereby applying that data to the pre-defined taxonomy (FIG. 1: 001) and data structure in such a way that data is turned into meaningful information (FIG. 1: 1000) per the pre-defined data flows shown in FIG. 29, Backend Taxonomy: IRS Analysis Report. This step is pivotal in the CITS embodiments as it is the technical procedure by which the data gathered from the financial institution is manipulated according to the predefined taxonomy (FIG. 1: 001) therefore creating valuable information which can be turned into reports (FIG. 1: 1000) allowing users to take action (FIG. 1: 3000) according to the information provided. The information created in this step is inherently more accurate relative to existing data entry processes and is categorized in a superior way relative to existing categorization algorithms as the user can confirm categorization at their discretion by being optionally notified (FIG. 1: 2000) of a given categorization or set of categorizations [(FIG. 1: 945) and/or (FIG. 1: 930)].

1.9.3.1 Proprietary Algorithms (FIG. 1: 900)

The below section explores proprietary algorithms which are partially designed to correlate the Categorical Transaction Tags (FIG. 1: 930) of a given transaction (FIG. 1: 400) with Unique Data Tags (FIG. 1: 945) thereby identifying a specific data flow, shown in this embodiment as process steps IRS Analysis Report (FIG. 29: 313), IRS Income Filing (FIG. 29: 311), Tax Analysis Primary Categories (FIG. 29: 309), Tax Analysis Sub-Categories (FIG. 29: 307), Tax Analysis Granular Categories (FIG. 29: 305), Tax Analysis Sub-Granular Categories (FIG. 29: 303) and Tax Analysis Tertiary Categories Inclusive of Unique Data Tags (FIG. 29: 301) which are, as previously explained, the components of a single data structure which is hierarchically dictated given the taxonomy identified (FIG. 1: 001).

1.9.3.2 Data Interface (FIG. 1: 910)

The Data Interface (FIG. 1: 910) is a mechanism, to be conducted via one or more computers or machine systems, which dictates the frequency at which the above described API call (FIG. 1: 600) is run and once this schedule is set executes the necessary commands for the API call (FIG. 1: 600) to take place. The Data Interface (FIG. 1: 910) itself can be structured via human input embodying specific relationships or data structures or can be the output of a secondary heuristic computing system, programmed to operate according to a system of one more computers or machines.

In the context of this non-limiting example, the aforementioned API call (FIG. 1: 600) will be required to gather financial transaction data concerning the financial transactions (FIG. 1: 400) of the business or individual being analyzed. As per the nature of this embodiment, the analysis taking place will consider only the previous tax year's financial transactions for a business or individual being investigated. As such, this API call (FIG. 1: 600) will need to be executed perhaps only once.

As such, this Data Interface (FIG. 1: 910) is designed such that the investigative body employing CITS to perform tax analysis is best served based off the financial transaction requirements for the analysis being performed while simultaneously reducing the computing and/or system requirements needed to employ CITS.

1.9.3.3 Data Point Identified (FIG. 1: 920)

Each API call (FIG. 1: 600) can pull a number of transactions; however, it is important for teaching purposes to demonstrate a single data point, which should be considered a single transaction, as it is augmented by operations inherent in CITS. As such, in the context of this non-limiting example, a single data point as it operates within CITS will be described. Specifically, in keeping with the non-limiting example previously described, an income generating transaction (FIG. 1: 400) relating to Automotive Services and specifically the Automotive Service, Towing.

However, it is technically feasible and advantageous to run these defined operations against many data points simultaneously. As such, it should be noted, that a practical CITS system which services a single or many IRS Analysis Reports (FIG. 29: 313) should have the capacity to identify many data points simultaneously and pass these data points through the defined data structure associated with the Identified Taxonomy (FIG. 1: 001).

It is important from a teaching perspective that a single data point be identified and explained as each data point gathered could have a unique set of Categorical Transaction Tags Applied (FIG. 1: 930) corresponding to a Unique Data Tag (FIG. 1: 945) and therefore a unique data flow within the data structure based on the Identified Taxonomy (FIG. 1: 001). Such is the power of CITS, through the defined algorithms employed to delineate financial transaction data according to a given taxonomy based on a series of fixed relationships between Categorical Transaction Tags Applied (FIG. 1: 930) and Unique Data Tags (FIG. 1: 945), a data flow is identified and therefore any financial transaction can be inputted into a given system, recorded and manipulated into information such that the nature of the transaction is clear and therefore the aggregated information, confirmed by the user, can be used for reporting purposes (FIG. 1: 1000) and User Action (FIG. 1: 3000).

1.9.3.4 Categorical Transaction Tags Applied (FIG. 1: 930)

As a result of the nature of the aforementioned commercially available API call (FIG. 1: 600), up to, but not limited to, three descriptive categories are algorithmically assigned to a given transaction and are referred to as Categorical Transaction Tags Applied (FIG. 1: 930). An exemplary embodiment of Categorical Transaction Tags Applied (FIG. 1: 930), keeping with the specific and non-limiting example described above, is shown in FIG. 30 Category Example: IRS Performed Tax Analysis, as Services Provided (FIG. 30: 946), Automotive Services (FIG. 30: 947) and Towing (FIG. 30: 948). These tags act as the assimilation mechanism by which transactions pulled by the API call (FIG. 1: 600) are identified within CITS and allow for each transaction's corresponding data structure to be identified.

A rather granular description is provided to the transaction given these categories. However, the data which is being described via Categorical Transaction Tags Applied (FIG. 1: 930) needs to be matched with a Unique Data Tag (FIG. 1: 945) relating to a specific level of a given data structure to begin the integration of the data point into the pre-defined data structure, dictated by the given taxonomy (FIG. 1: 001). In this process the coupling point between the Categorical Transaction Tags Applied (FIG. 1: 930) and the Unique Data Tag (FIG. 1: 945) is characterized by the most detailed and granular Categorical Transaction Tags Applied (FIG. 1: 930) available. According to this non-limiting example, the most detailed and granular Categorical Transaction Tags Applied (FIG. 1: 930) available is Towing (FIG. 30: 948). As such, Towing (FIG. 30: 948) is the Categorical Transaction Tag Applied (FIG. 1: 930) to this given transaction. As such, it is now clear to one skilled in the art that the preceding, higher level, Categorical Transaction Tags Applied (FIG. 1: 930) are now superfluous in this non-limiting example as the information inherent in these Categorical Transaction Tags Applied (FIG. 1: 930) can be determined via a series of inductive fixed relationship algorithms that operate as follows. Specifically, the Tax Analysis Tertiary Category Inclusive of Unique Data Tags Towing (FIG. 30: 301) must, by its very nature, be preceded by the Tax Analysis Sub-Granular Category Automotive Services (FIG. 30: 303) which must by its very nature be preceded by the Tax Analysis Granular Category Services Provided (FIG. 30: 305) which must by its very nature be preceded by the Tax Analysis Sub-Category Question One (FIG. 30: 307), which sums gross receipts or sales, which must by its very nature be preceded by the Tax Analysis Primary Category Income—Questions One through Seven (FIG. 30: 309) which must by its very nature be preceded by a predictable section of a given IRS Income Filing (FIG. 30: 311), which in this case is the IRS Income Filing 2014 1040 Schedule C and the IRS Income Filing can be effectively mined, per the data structure provided, to a predictable section of the IRS Analysis Report (FIG. 30: 313). Please see FIG. 30 for a table illustrating the Data Structure Titles, Data Bin Titles, Data Flow, Unique Data Tags and Categorical Transaction Tag Type and Value as they relate to this non-limiting example.

1.9.3.5 Data Flow Identified (FIG. 1: 940) Via Unique Data Tag (FIG. 1: 945)

The algorithms which execute and provide this corollary relationship are designed to operate based on a fixed relationship between the Categorical Transaction Tag (FIG. 1: 930) and the Unique Data Tag (FIG. 1: 945). Specifically, the algorithms referenced here are capable of distilling each known combination of Categorical Transaction Tags (FIG. 1: 930) to the most detailed and granular Categorical Transaction Tag (FIG. 1: 930) assigned to a given transaction via the commercially available API call (FIG. 1: 600). Accordingly, each most detailed and granular level category of a given data structure, associated with a given taxonomy (FIG. 1: 001), is also mapped with at least one Unique Data Tag (FIG. 1: 945). As such, it should be clear that this is the assimilation mechanism by which transactions pulled via the aforementioned API call (FIG. 1: 600) are tied to a given section of a given data structure arising from a given taxonomy. As previously noted, the Data Flow Identified (FIG. 1: 940) is then mapped as when considering the most detailed and granular Categorical Transaction Tag (FIG. 1: 930) and its relationship to a Unique Data Tag (FIG. 1: 945) only one series of logical and predictable inductive data population steps is available given a fixed data structure. In keeping with the same example, the Tax Analysis Tertiary Category Inclusive of Unique Data Tags, Towing (FIG. 30: 301) must, by its very nature, be preceded by the Tax Analysis Sub-Granular Category, Automotive Services (FIG. 30: 303) which must by its very nature be preceded by the Tax Analysis Granular Category Services Provided (FIG. 30: 305) which must by its very nature be preceded by the Tax Analysis Sub-Category Question One (FIG. 30: 307), which sums gross receipts or sales, which must by its very nature be preceded by the Tax Analysis Primary Category, Income—Questions One through Seven (FIG. 30: 309) which must by its very nature be preceded by a predictable section of a given IRS Income Filing (FIG. 30: 311), which in this case is the IRS Income Filing 2014 1040 Schedule C, which can be effectively mined, per the data structure provided, to a predictable section of the IRS Analysis Report (FIG. 30: 313).

It should be noted, this assimilation mechanism and its associated algorithms are one of the driving forces in uniting data pulled from a Merchant Database (FIG. 1: 500), Financial Institution Data Base (FIG. 1: 510) or Personal Records Database (FIG. 1: 520) to a user's desired reports (FIG. 1: 1000), in keeping with this example, IRS Audit Report (FIG. 1: 1070). As such, as this assimilation process is totally automated and free of required user involvement the data entry associated with any IRS Tax Analysis operation which previously required human performed data entry in operations such as, but not limited to, inputting expense and income records into a given financial tracking system, are made unnecessary by the exemplary embodiment of CITS shown here.

1.9.3.6 Inductive Data Structure Propagation (FIG. 1: 950)

In keeping with this non-limiting example, the Categorical Transaction Tag (FIG. 1: 930) once coupled with an associated Unique Data Tag (FIG. 1: 945) dictates a specific Data Flow Identification (FIG. 1: 940). As this data flow is designed according to a series of fixed relationships, the population of the most specific and granular level of a given data structure is sufficient to populate all of the preceding levels of that data structure. As such, the inductive data propagation described here affects the remainder of the preceding data structure levels associated with a given data structure by populating each with an accurate and descriptive tag which indicates to the consumer of a given CITS report the nature, on a granular and highly descriptive level, of a given transaction or a given grouping of transaction.

To expand on this concept, the data structure described contains the data flow steps of IRS Analysis Report (FIG. 30: 313), IRS Income Filing (FIG. 30: 311), Tax Analysis Primary Categories (FIG. 30: 309), Tax Analysis Sub-Categories (FIG. 30: 307), Tax Analysis Granular Categories (FIG. 30: 305), Tax Analysis Sub-Granular Categories (FIG. 30: 303) and Tax Analysis Tertiary Categories Inclusive of Unique Data Tags (FIG. 30: 301) which are directly related so that information updated on a lower level of this data structure will impact the higher levels with additional data population given fixed relationship algorithms thereby creating powerful and valuable financial information which does not require end user involvement or participation on any level. For example, the single data point being discussed here relating to an income generating transaction (FIG. 1: 400) as it relates to the automotive service, towing, once described via a Categorical Transaction Tag (FIG. 1: 930) and coupled to a Unique Data Tag (FIG. 1: 945) populates the Tax Analysis Tertiary Category Inclusive of Unique Data Tags (FIG. 30: 301) thereby leading to an inductive propagation of the remainder of the data structure. Specifically, this inductive propagation is as follows: Towing, Automotive Services, Services Provided, Question One, Income—Question One through Seven, 2014 1040 Schedule C and IRS Analysis Report. Similarly, in keeping with the same example, the single data point being discussed here relating to an income generating transaction (FIG. 1: 400) as it relates to the automotive service, towing, once described via a Categorical Transaction Tag (FIG. 1: 930) and coupled to a Unique Data Tag (FIG. 1: 945) populates the Tax Analysis Tertiary Category Inclusive of Unique Data Tags (FIG. 30: 301) thereby leading to an inductive propagation of the remainder of the data structure. Specifically, this inductive propagation is as follows: Tax Analysis Tertiary Categories Inclusive of Unique Data Tags (FIG. 30: 301), Tax Analysis Sub-Granular Categories (FIG. 30: 303), Tax Analysis Granular Categories (FIG. 30: 305), Tax Analysis Sub-Categories (FIG. 30: 307), Tax Analysis Primary Categories (FIG. 30: 309), IRS Income Filing (FIG. 30: 311) and IRS Analysis Report (FIG. 30: 313).

In summary of these data structures as they operate according to Inductive Data Structure Propagation (FIG. 1: 950), given the fixed set of relationships between Unique Data Tags (FIG. 1: 945) and Categorical Transaction Tags (FIG. 1: 930), programmed algorithms inherent in CITS, inductively propagate the data structure from the most specific level of the data structure towards the most generalized level of the data structure, and therefore taxonomy, such that human performed data entry inherent in financial analysis, including wealth management operations, is entirely removed.

It is most optimal to perform this operation using inductive population as Towing must, by its very nature, be preceded by Automotive Services and Automotive Services must, by its very nature, be preceded by Services Provided and Services Provided must, by its very nature, be preceded by Question One and Question One must, by the nature of the tax filing, be preceded by Income—Question One through Seven and Income—Question One through Seven must, by its very nature, be proceeded by the 2014 1040 Schedule C and the 2014 1040 Schedule C must, by its very nature, be preceded by a predictable section of a given IRS Analysis Report. When considering this process using deductive reasoning it is now clear that algorithms cannot be created which consistently and accurately predict subsequent and lower levels of a given taxonomy as fixed relationships of this nature do not exist.

As such, it should be clear that given the most detailed and granular Categorical Transaction Tag (FIG. 1: 930), algorithms inherent in CITS and the associated data structures and taxonomies eliminate the tedious and error prone task of data entry as it relates to personal wealth operations 1.9.4 Potential User Involvement (FIG. 1: 2000)

There are a variety of ways in which the user may become involved in this process to confirm categorization and data flow (FIG. 1: 2000). One non-limiting example is the user being optionally notified via a Digital Notification (FIG. 1: 2020) that a new transaction, or a group of transactions, has been categorized and the corresponding data has been manipulated and turned into useable information which is manifested as an IRS Analysis Report (FIG. 29: 313). The nature of these notifications could indicate that certain sized batches of financial transaction data has been analyzed and amalgamated and is therefore ready for ratio or other types of tax analysis matching the nature of this embodiment.

This optional notification may act as a mechanism by which the user can ensure that the categorization chosen is correct (FIG. 1: 2010). As such, user involvement of this nature can ensure that the transaction categorization was completed successfully and that the resulting updates impacting the IRS Analysis Report (FIG. 29: 313) reflect accurate financial analysis as determined by the user conducting the tax analysis, perhaps the IRS.

Similarly, the user may wish to be optionally notified of a given transaction categorization, or set of categorizations, to monitor spending habits of a given nature. This could act as a mechanism by which investigative bodies could narrow the available information thereby enhancing the organization and search functions of a given set of financial analysis.

1.9.5 Reports Provided for Analysis (FIG. 1: 1000) to User (FIG. 1: 2000)

The below sections provides a description of Reports (FIG. 1: 1000) which can be provided to the User (FIG. 1: 2000) for analysis used in financial investigation as it relates to an IRS Analysis Report (FIG. 29: 313) and also provided below is a description of an additional calculation suite which could be used to enhance the investigative power of the IRS Audit Report (FIG. 1: 1070).

1.9.5.1 IRS Audit Report (FIG. 1: 1070)

As suggested, the compiled financial transaction data could be used to create aggregated tax analysis which could lead to indicate that a business or individual being analyzed could be engaging in potential tax fraud.

The additional calculation suite which could be included in this report to enhance its analysis power would be the inclusion of a ratio analysis to concisely determine a discrepancy between particular questions of an IRS Analysis Report (FIG. 29: 313) and the actual IRS Income Filing submitted by the individual or business being analyzed. Specifically, if the Tax Analysis Sub-Category of the IRS Analysis Report relating to Advertising expenses far exceeded the indicated Advertising expenses shown on the actual IRS Income Filing submitted by the business or individual, according to defined variances considering typical error rates, then this discrepancy could act as an indicator to an investigative body that potential tax evasion is taking place. Accordingly, in embodiments a ratio or comparison may be performed via a calculation by computer of a Tax Analysis Sub-Category of the IRS Analysis Report relating to Advertising relative to an actual IRS Income Filing submitted by the business or individual, and the resulting comparison or ratio compared by computer to a defined variance.

As such, an IRS Analysis Report (FIG. 29: 313) inclusive of this additional analysis suite would provide powerful and insightful information to investigative bodies which did not require user involvement in any step of the data propagation or analysis outside of setting appropriate variances given acceptable error rates and indicating the nature of the Data Interface (FIG. 1: 910).

According to the current practices seen in tax analysis this process is usually an incredibly tedious one by which batches of IRS Income Filings are analyzed instead of all IRS Income Filings. As such, the advancement in art described herein would greatly speed up this process and reduce timely and costly data entry and its accompanying error rates as it relates to IRS tax analysis.

1.9.6 User Action (FIG. 1: 3000)

As a result of the reports created the user, in this case the IRS, could take a number of actions to further or conclude the analysis into potential tax evasion. Specifically, the user could use the information to prompt additional investigation and perhaps issue a formal Audit.

Conversely, the IRS Audit Report (FIG. 1: 1070) provided given the ratio between the same questions shown on the IRS Analysis Report (FIG. 29: 313) and actual IRS Income Filing provided could indicate that the likelihood of tax evasion taking place is very unlikely and any additional investigation could be terminated.

Embodiments of a method consistent with the invention are disclosed for reducing human data entry activity and human errors from data entry. Note that embodiments of a system and program product implementing this invention would be similar. Referring to exemplary FIG. 31, embodiments may comprise an operation 3100, performed by one or more programmed computers, of retrieving or having retrieved financial transaction data for a financial transaction for an entity. In embodiments, the entity may be a person. In embodiments, the entity may be a corporation or other business organization. In embodiments, the retrieval may be accomplished by executing an API by the one or more computers, to retrieve from the electronic data depository financial transaction data for a financial transaction for the entity, where the API call includes access credentials (e.g., a user name and password) to obtain and/or receive the financial transaction data of the entity. In embodiments, the API call may be designed to categorize the financial transaction data retrieved with a plurality of Categorical Transaction Tags, e.g., Service, Advertising and Public Relations. See for example, FIG. 6, Category Example: Business Accounting; FIG. 22, Category Example: Personal Wealth Management; FIG. 25, Category Example, Non-Community Spending Report; FIG. 27: Category Example: Money Laundering Investigation—Wine Bar Income; FIG. 28: Category Example: Wine and Other Alcohol cost of goods sold; and FIG. 30: Category Example: IRS Performed Tax Analysis. The invention is not limited to using an API. For example, in embodiments, screen scrape; manual entry; scanning; direct interface with banking entity; data vendor; data uplink; data download; FTP; direct database connection; downstream database configuration or retrieval from merchant(s) database.

Figure 31B:
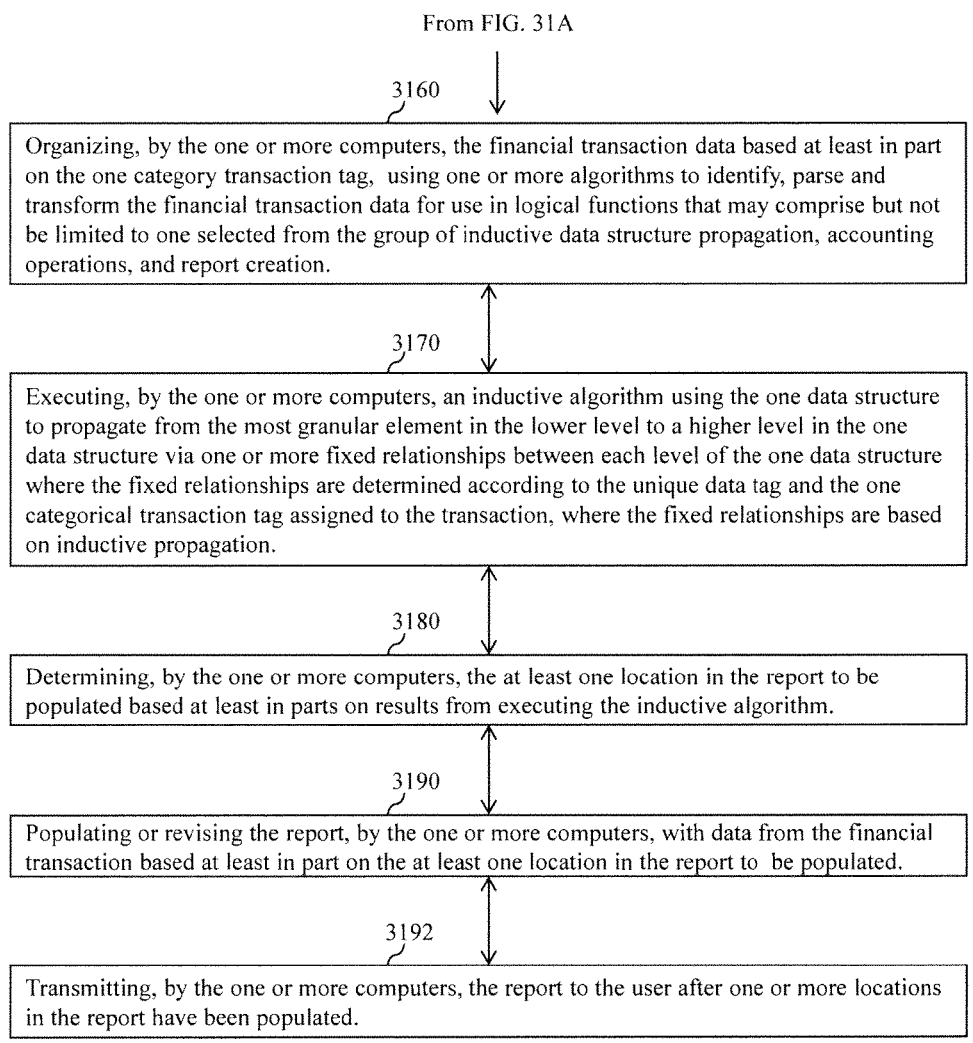
FIG. 31B is a continuation of the block diagram of FIG. 31A for embodiments consistent with the present invention.

Continuing to refer to FIG. 31, in embodiments, the method may further comprise the operation 3110 of receiving or obtaining or having obtained, by the one or more computers, for the financial transaction, a plurality of categorical transaction tags categorizing the financial transaction, and one or more items of financial transaction data selected from the group of transaction amount, account balance, account names, pending status, location, meta score, meta data, and geo-coordinates. In embodiments, the categorical transaction tags may be provided by the API. In embodiments, the categorical transaction tags may be obtained via an online service. Note that the method for obtaining the categorical transaction tags is not limiting on the invention.

In embodiments, the method may further comprise the operation 3120 of accessing, by the one or more computers, a taxonomy associated with the entity, wherein the taxonomy comprises a plurality of data structures that are vertical and/or flat, with each of the respective data structures having a progression inductively backwards to an upper level in the data structure, wherein each of the plurality of the data structures comprises a most granular element at a lower level, wherein the taxonomy is based on populating a report desired by a user, and wherein each of the data structures contains a level that references at least one location in the report to be populated. Note that in embodiments, the progression inductively backwards may be to a top level in the data structure. In embodiments, the progression inductively backwards may be to a level in the data structure which is not the top level. By way of example but not limitation, the report may be a financial statement or an internal revenue form, or a Non-Community Spending Report. In embodiments, the most granular element may be at a lowest level in the data structure. In embodiments, the most granular element may be at a level in the data structure which is not the lowest level. Non-limiting examples of data structures are disclosed at FIG. 5 Backend Taxonomy: Business Accounting; FIG. 21 Backend Taxonomy: Retirement/Personal Wealth Management; FIG. 24 Non-Community Spending Report; FIG. 26 Backend Taxonomy: Money Laundering Report; and FIG. 29 Backend Taxonomy: IRS Analysis Report.

In embodiments, the method may further comprise the operation 3130, by the one or more computers, of determining, by the one or more computers, an identification code for the financial transaction based at least in part on the plurality of categorical transaction tags, wherein the identification code references a particular one of the data structures in the taxonomy, where the particular one of the data structures comprises a corresponding unique data tag associated with a given level in the particular data structure. In embodiments, a table may be referenced that links the given level in the particular data structure in relation to the unique data tag. Non-limiting examples can be found in Section 1.2.4.2 Data Point Identified (FIG. 1: 920); Section 1.4.3.3 Data Point Identified (FIG. 1: 920); Section 1.6.3.3 Data Point Identified (FIG. 1: 920); Section 1.7.2.4 Data Point Identified (FIG. 1: 920); and Section 1.9.3.3 Data Point Identified (FIG. 1: 920).

In embodiments, the method may further comprise the operation 3140 of selecting, by the one or more computers, one from the plurality of the categorical transaction tags as the most granular element. In embodiments, this selecting operation may be based at least in part on a lookup table. In embodiments, the lookup table may use the identification code as a reference. For example, according to FIG. 6 Category Example: Business Accounting, wherein the categorical transaction tag is Public Relations and wherein the most granular element at the lower level of the particular data structure is the Granular Level Category Inclusive of Unique Data Tags and the wherein the most granular element of the data structure is partially determined based on the unique data tag, which in this example, is Public Relations.

In embodiments, the method further comprises the operation 3150 of assigning, by the one or more computers, the unique data tag associated with the given level in the particular data structure to the one categorical transaction tag selected as the most granular element for the financial transaction.

In embodiments, the method may further comprise the operation 3160 of organizing, by the one more computers, the financial transaction data based at least in part on the one categorical transaction tag, using one or more algorithms to identify, parse and transform the financial transaction data for use in logical functions that may comprise but not be limited to one selected from the group of inductive data structure propagation, accounting operations, and report creation. In embodiments, those logical function may comprise but not be limited to one selected from the group of inductive data structure propagation, accounting, tax operations, financial analysis, financial management, financial investigation, and report creation. In embodiments, the data from the financial transaction may be parsed and placed in various tables to be accessed for accounting operations and report creation.

Continuing to refer to FIG. 31, in embodiments, the method may further comprise the operation 3170 of executing, by the one or more computers, an inductive algorithm using the one data structure to propagate from the most granular element in the lower level to a higher level in the one data structure via one or more fixed relationships between each level of the one data structure where the fixed relationships are determined according to the unique data tag and the one categorical transaction tag assigned to the transaction, where the fixed relationships are based on inductive propagation. For non-limiting examples, see FIG. 2A Inductive Data Structure Propagation—Part 1; FIG. 2B Inductive Data Structure Propagation—Part 2; FIG. 5 Backend Taxonomy: Business Accounting; FIG. 21 Backend Taxonomy: Retirement/Personal Wealth Management; FIG. 24 Non-Community Spending Report; FIG. 26 Backend Taxonomy: Money Laundering Report; and FIG. 29 Backend Taxonomy: IRS Analysis Report and the text at Section 1.2.4.3 Categorical Transaction Tags Applied (FIG. 1: 930); Section 1.2.4.4 Data Flow Identified (FIG. 1: 940) via Unique Data Tag (FIG. 1: 945); Section 1.2.4.5 Inductive Data Structure Propagation (FIG. 1: 950); Section 1.4.3.4 Categorical Transaction Tags Applied (FIG. 1: 930); Section 1.4.3.5 Data Flow Identified (FIG. 1: 940) via Unique Data Tag (FIG. 1: 945); Section 1.4.3.6 Inductive Data Structure Propagation (FIG. 1: 950); Section 1.6.3.4 Categorical Transaction Tags Applied (FIG. 1: 930); Section 1.6.3.5 Data Flow Identified (FIG. 1: 940) via Unique Data Tag (FIG. 1: 945); Section 1.6.3.6 Inductive Data Structure Propagation (FIG. 1: 950); Section 1.7.2.5 Categorical Transaction Tags Applied (FIG. 1: 930); Section 1.7.2.6 Data Flow Identified (FIG. 1: 940) via Unique Data Tag (FIG. 1: 945); Section 1.7.2.7 Inductive Data Structure Propagation (FIG. 1: 950); Section 1.9.3.4 Categorical Transaction Tags Applied (FIG. 1: 930); Section 1.9.3.5 Data Flow Identified (FIG. 1: 940) via Unique Data Tag (FIG. 1: 945) and; Section 1.9.3.6 Inductive Data Structure Propagation (FIG. 1: 950).

In embodiments, the method may further comprise the operation 3180 of determining, by the one or more computers, the at least one location in the report to be populated based at least in part on results from executing the inductive algorithm. A non-limiting example of such a location is shown in FIG. 7 Relevant Portion of Exemplary Profit and Loss Statement and FIG. 23 Personal Wealth Report: Car Wash Expense.

In embodiments, the method may further comprise the operation 3190 of populating or revising the report, by the one or more computers, with data from the financial transaction based at least in part on the at least one location in the report to be populated.

Continuing to refer to FIG. 31, in embodiments, the method may further comprise the operation 3192 of transmitting, by the one or more computers, the report to the user after one or more locations in the report have been populated.

In embodiments, the method may further comprise the operation of transmitting, by the one or more computers, a notification that a particular one of the locations in the report has been populated with the transaction data, wherein the notification comprises an electronic element for indicating approval or a correction of the populated transaction data at the particular location in the report. In embodiments, the electronic element may be an email, or SMS (Short Message Service), MMS (Multimedia Messaging Service), mApp (Mobile Device Application), mWeb (Mobile Web), VRS/IVRS (Interactive Voice Response System), Web (WiFi or Network), Push Notification, Voice/Telephony, Internet Telephony (e.g. VOIP) and/or Long Code/Short Code text messaging. In embodiments, the electronic element comprises an electronic ability to select from a drop-down menu comprising at least one selected from the group of re-categorizing and deleting. The type of electronic element is not limiting on the invention.

In embodiments, there may be a plurality of taxonomies, and the method may further comprise the operations of running, by the one or more computers, the operation steps of claim 1 for each of the plurality of taxonomies associated with the entity in order to populate a plurality of reports.

In embodiments, the report may be an accounts payable statement, and the method may further comprise the operations of triggering, by the one or more computers, initiation of a payment based at least in part on the transmission of the report, where the payment method may be, in embodiments, an automated clearing house payment which can be initiated by multi-factor authentication which can be question based, code based, or selection based such that the routing number, and other account identifiers, are stored in a derivative table and accessed via a globally unique access token. For example, please see Section 1.3.1 Example and Comparison: Accounts Payable (A/P).

In embodiments, the report may be an accounts receivable report, and the method may further comprise the operations of scanning or inputting a purchase order, by the one or more computers, by employing optical character recognition; and inputting some or all of the information present on the purchase order into a native accounting software for accounts receivable to populate the accounts receivable report. For example, see Section 1.3.1 Example and Comparison: Accounts Receivable (A/R) and FIG. 15 Recording and Settling Accounts Receivable According to CITS.

In embodiments, the method may further comprise the operations of executing an API call, by the one or more computers, to retrieve, at least one transaction which has not been previously recorded and to parse a plurality of data points retrieved with that transaction; and to store for later use, by the one or more computers, the data points associated with the transaction in a derivative table using globally unique transaction identification codes. The type of table is not limiting on the invention. For example, see the description in Section 1.2.2.3 Connectivity (FIG. 1: 600).

In embodiments, the method may further comprise the operations of organizing, by the one or more computers, the financial transaction data according to a discrete histogram; determining, by the one or more computers, a transactional frequency at which financial transactions for the entity occur; and creating, by the one or more computers, a schedule to execute the API call based at least in part on the transactional frequency of the entity. For examples, see sections 0 Data Interface (FIG. 1: 910), 1.4.3.2 Data Interface (FIG. 1: 910), 1.6.3.2 Data Interface (FIG. 1: 910), 1.7.2.3 Data Interface (FIG. 1: 910), 1.9.3.2 and Data Interface (FIG. 1: 910).

In embodiments, the method may further comprise the operations of retrieving a plurality of financial transactions including at least one financial transaction which has not been previously recorded; queuing, by the one or more computers, the plurality of financial transactions; storing, by the one or more computers, the financial transaction data for each of the financial transactions in tables with globally unique transaction identification codes; and executing, by the one or more computers, one or more accounting operations. In embodiments, the tables may be derivative tables. For example, as described in Section 1.2.2.3 Connectivity (FIG. 1: 600).

Figure 32:
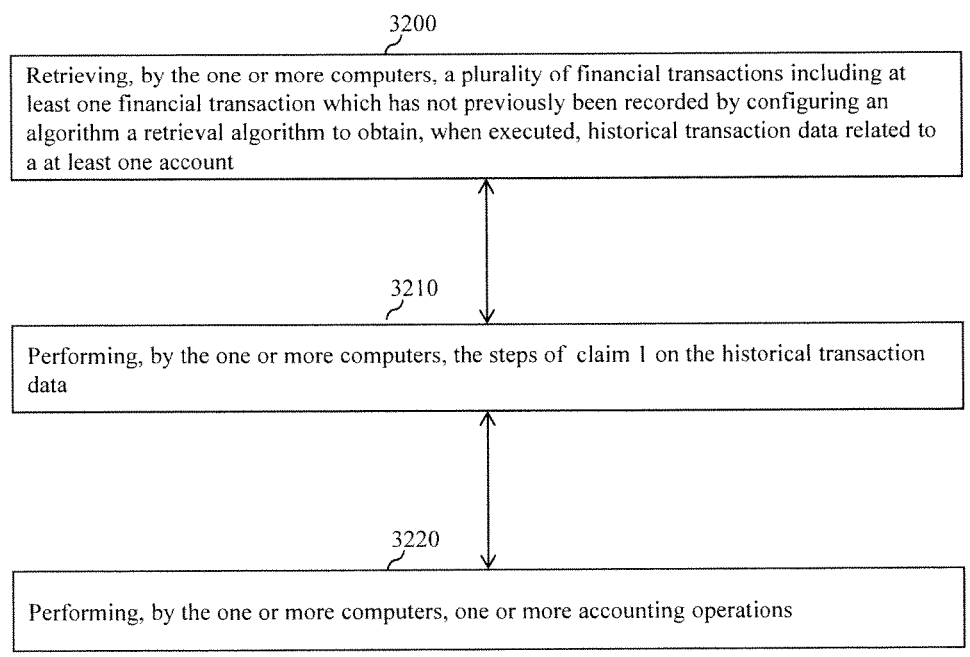
FIG. 32 is a block diagram for embodiments consistent with the present invention.

Referring to FIG. 32, in embodiments, the method may further comprise the operations of retrieving 3200, by the one or more computers, a plurality of financial transactions including at least one financial transaction which has not been previously recorded by configuring a retrieval algorithm, to obtain, when executed, historical transaction data relating to at least one selected from the group of a checking account, a savings account, and a credit account, a mortgage account, a brokerage account, a loan account, or other account; performing 3210, by the one or more computers, the steps of FIG. 31, on the historical transaction data to populate a report; and performing 3220, by the one or more computers, one or more accounting operations on the historical transaction data. In embodiments, the configuring operation may comprise setting a date range to obtain or retrieve all transactions in this date range for the entity. See Section 1 for an example and further description.

Figure 33:
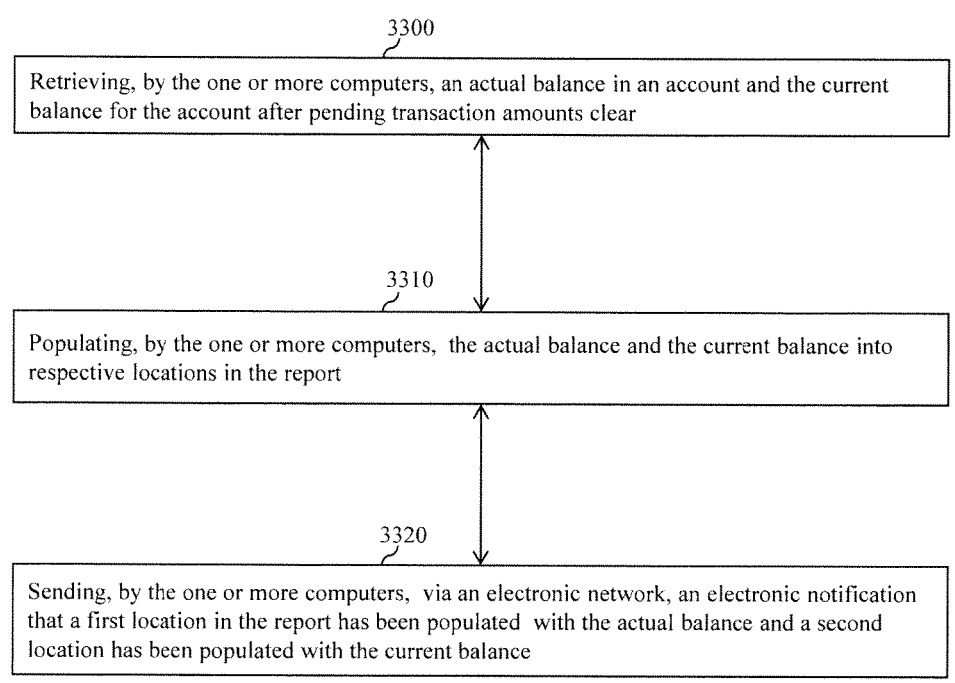
FIG. 33 is a block diagram for embodiments consistent with the present invention.

Referring to FIG. 33, in embodiments, the method may further comprise the operations of retrieving 3300, when executed, via an API call or other means, by the one or more computers, an actual balance in an account and a current balance for the account after pending transaction amounts clear for one selected from the group of a checking account, a savings account, and a credit account, a mortgage account, a brokerage account, a loan account, or another account; populating 3310, by the one or more computers, the actual balance and the current balance into respective locations in the report; and sending 3320, by the one or more computers, via an electronic network, an electronic notification that a one location in the report has been populated with the actual balance and another location in the report has been populated with the current balance, wherein the notification comprises an electronic element. In embodiments, the electronic element may comprise an email, a text message, or other convenient electronic communication.

Figure 34:
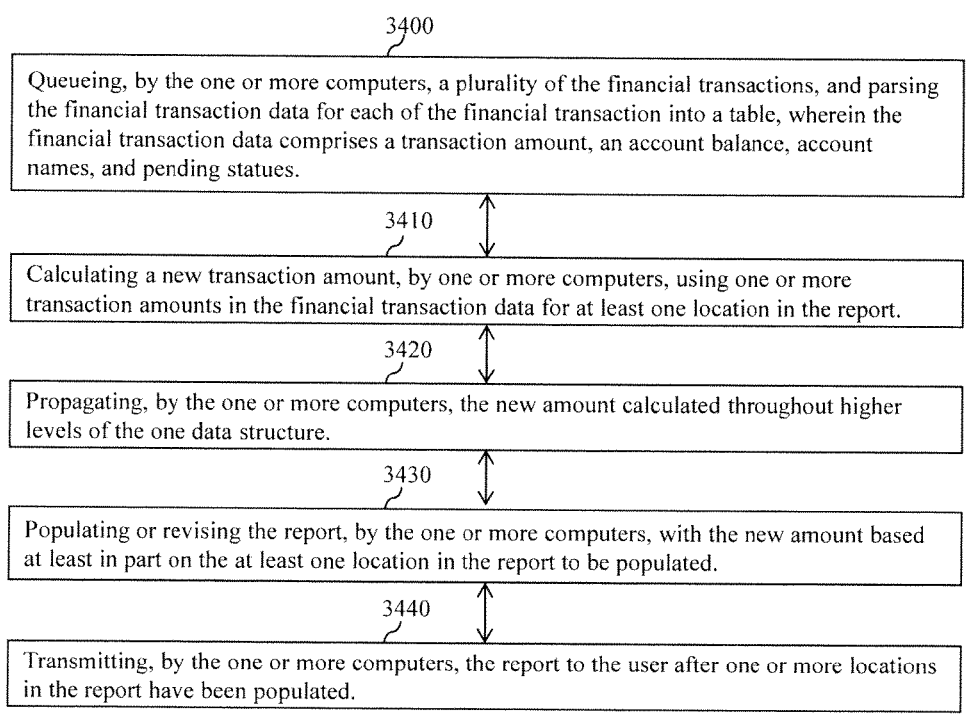
FIG. 34 is a block diagram for embodiments consistent with the present invention.

Referring to FIG. 34, in embodiments where the financial transaction data comprises a transaction amount, an account balance, account names, and pending status, the method may further comprise the operations of queuing 3400, by the one or more computers, a plurality of the financial transactions, and parsing the financial transaction data for each of the financial transactions into a table. In embodiments, the financial transaction data may further comprise one or more selected from the group of location, meta score, meta data, and geo-coordinates from a table. The method of FIG. 34 may further comprise calculating 3410 a new transaction amount, by one or more computers, using one or more transaction amounts in the financial transaction data for at least one location in the report; propagating 3420, e.g., like a spreadsheet operation, by the one or more computers, the new amount calculated throughout higher levels of the one data structure; populating or revising the report 3430, by the one or more computers, with the new amount based at least in part on the at least one location in the report to be populated; and transmitting 3440, by the one or more computers, the report to the user after one or more locations in the report have been populated.

In embodiments where the financial transaction data is for an expense transaction for which payment was provided digitally, and where the financial transaction data comprises a transaction amount for the expense transaction and an account balance, the method may further comprise the operations of subtracting, by the one or more computers, the transaction amount from the account balance and; summing, by the one or more computers, the transaction amount with an amount from the most granular element of the lower element of the one data structure.

In embodiments where the financial transaction data is for an expense transaction for which payment was provided as cash or check, and where the financial transaction data comprises a transaction amount for the expense transaction and an account balance, the method may further comprise the operations of receiving, by the one or more computers, an assignment from the entity, by the one or more computers, of one or more categorical transaction tags; subtracting, by the one or more computers, the transaction amount from the account balance; and summing, by the one or more computers, the transaction amount with the most granular element of the lowest level of the one data structure representing an increase of assets as shown in an inventory or service account.

In embodiments where the financial transaction data is for an income transaction for which payment was provided digitally, and wherein the financial transaction data comprises a transaction amount for the income transaction and an account balance, the method may further comprise the operations of summing, by the one or more computers, the transaction amount with the account balance; and subtracting, by the one or more computers, the transaction amount from the most granular element of the lowest level of the one data structure which may represent an increase of liabilities as shown in an in an inventory or service account.

In embodiments where the financial transaction data is for an income transaction for which payment was provided as cash or check, and where the financial transaction data comprises a transaction amount for the income transaction and an account balance, the method may further comprise the operations of receiving, by the one or more computers, an assignment from the entity, by the one or more computers, of one or more categorical transaction tags; summing, by the one or more computers, the transaction amount for the income transaction with the account balance; and subtracting, by the one or more computers, the transaction amount from the most granular element of the lowest level of the data structure representing an increase of assets as shown in an inventory or service account.

In embodiments where one or more items of financial transaction data are selected, the method may further comprise the operations of receiving, by the one or more computers, an assignment from the entity of a remediation amount to remediate a bank error; re-calculating a new amount, by one or more computers, using the remediation amount for at least one location in the report; re-propagating, e.g., like a spreadsheet, by one or more computers, the new amount throughout higher levels of the one data structure. What has been eliminated with this operation is the normal adjustment of the balance per books (e.g. FIG. 20: 4740 and Section 1.3.8 Example and Comparison: Reconciliation) used in most accounting systems. For example, as seen in section 1.3.8 Example and Comparison: Reconciliation and FIG. 19 Reconciliation According to Traditional Accounting Standards and FIG. 20 Reconciliation According to CITS (Auto-Reconciliation).

In embodiments where there are a plurality of financial transactions, the method may further comprise placing, by the one or more computers, the plurality of financial transactions into a queue; and running, by the one or more computers, the method of FIG. 31 on each of the financial transactions in the queue in an order.

In embodiments where the report is a Personal Wealth Report, and where the financial transaction data comprises multiple of the categorical transaction tags categorizing the financial transaction, an available balance of an account and/or a current balance of the account, and one or more items of financial transaction data selected from the group of transaction amount, account names, pending status, location, meta data, meta score, and geo-coordinates, the method may further comprise calculating, by the one or more computers, an existing savings amount in an account based at least in part on the available balance of the account and/or the current balance of the account; and executing, by the one or more computers, a ratio analysis between a target savings amount and the existing savings amount.

In embodiments, where the report may be a Money Laundering Report, and where the financial transaction data comprises one or more income items from income garnering financial transactions for calculating an income amount, and a plurality of cost items for calculating a cost of goods sold, the method may further comprise the operations of calculating, by the one or more computers, the income amount based at least in part on the one or more income items; calculating the cost of goods sold based at least in part on the plurality of cost items; and executing/calculating, by the one or more computers, a ratio analysis between the income amount and the cost of goods sold. In embodiments, the result of the ratio calculated may be compared to a threshold amount, and a communication generated and sent if the comparison dictates an alert.

In embodiments, wherein the report is a IRS Analysis Report, and where the financial transaction data comprises a provided IRS answer amount for an IRS filing question and a plurality of transaction amounts used for obtaining the provided IRS answer amount, e.g., summing all of expenses for advertising, the method may further comprise the operations of re-calculating, by the one or more computers, a summation of the plurality of transaction amounts used for obtaining the provided IRS answer amount to obtain a re-calculated answer; determining, by the one or more computers, a ratio between the provided IRS answer amount and the re-calculated answer for the IRS filing question; and generating, by the one or more computers, an electronic notification when the ratio is outside of a threshold.

The term "computer-readable medium" or "computer-readable storage medium," as used herein refers to any non-transitory medium that is computer-readable and participates in storing and providing instructions to the processor for execution. Such a medium may be removable or non-removable and may take many forms, including, but not limited to, non-volatile media and volatile media. Non-volatile media include, for example, optical or magnetic disks. Volatile media include dynamic memory, such as the main memory. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other non-transitory tangible medium from which a computer can read computer instructions. Combinations of the above are also included within the scope of machine-readable media. Machine-executable instructions comprise, for example, instructions and data which cause a general purpose computer, special purpose computer, or a special purpose processing machine to perform a certain function or group of functions.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein and the claims show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments to form further embodiments with this added element or step.

The above-described embodiments of the present invention are merely meant to be illustrative and not limiting. Various changes and modifications may be made without departing from the invention in its broader aspects. The appended claims encompass such changes and modifications within the spirit and scope of the invention.

We claim:

1. A method wherein human data entry activity and human errors from data entry can be reduced, comprising:
   retrieving or having retrieved, by one or more computers, financial transaction data for a financial transaction for an entity;
   receiving or obtaining or having obtained, by the one or more computers, for the financial transaction, a plurality of categorical transaction tags categorizing the financial transaction, and one or more items of financial transaction data selected from the group of transaction amount, account balance, account names, pending status, location, meta score, and geo-coordinates;
   accessing, by the one or more computers, a taxonomy associated with the entity, wherein the taxonomy comprises a plurality of data structures that are vertical and/or flat, with each of the respective data structures having a progression inductively backwards to an upper level in the data structure, wherein each of the plurality of the data structures comprises a most granular element at a lower level, wherein the taxonomy is based on populating a report desired by a user, and wherein each of the data structures contains a level that references at least one location in the report to be populated;
   determining, by the one or more computers, an identification code for the financial transaction based at least in part on the plurality of categorical transaction tags, wherein the identification code references a particular one of the data structures in the taxonomy, where the particular one of the data structures comprises a corresponding unique data tag associated with a given level in the particular data structure;

89 selecting, by the one or more computers, one from the plurality of the categorical transaction tags as the most granular element;

assigning, by the one or more computers, the unique data tag associated with the given level in the particular data structure to the one categorical transaction tag selected as the most granular element for the financial transaction;

organizing, by the one more computers, the financial transaction data based at least in part on the one categorical transaction tag, using one or more algorithms to identify, parse and transform the financial transaction data for use in logical functions that may comprise but not be limited to one selected from the group of inductive data structure propagation, accounting operations, and report creation;

executing, by the one or more computers, an inductive algorithm using the one data structure to propagate from the most granular element in the lower level to a higher level in the one data structure via one or more fixed relationships between each level of the one data structure where the fixed relationships are determined according to the unique data tag and the one categorical transaction tag assigned to the transaction, where the fixed relationships are based on inductive propagation;

determining, by the one or more computers, the at least one location in the report to be populated based at least in part on results from executing the inductive algorithm;

populating or revising the report, by the one or more computers, with data from the financial transaction based at least in part on the at least one location in the report to be populated; and transmitting, by the one or more computers, the report to the user after one or more locations in the report have been populated.

2. The method as defined in claim 1, wherein the retrieving step is via an API call, where the API call includes access credentials to obtain and/or receive the financial transaction data of the entity, and where the API call is designed to categorize the financial transaction data with a plurality of categorical transaction tags.

3. The method as defined in claim 1, further comprising:
transmitting, by the one or more computers, a notification that a particular one of the locations in the report has been populated with the transaction data, wherein the notification comprises an electronic element for indicating approval or a correction of the populated transaction data at the particular location in the report.

4. The method as defined in claim 3, wherein the electronic element comprises an electronic ability to select from a drop-down menu comprising at least one selected from the group of re-categorizing and deleting.

5. The method as defined in claim 1, wherein there are a plurality of taxonomies, and further comprising:
executing, by the one or more computers, the operation steps of claim 1 for each of the plurality of taxonomies associated with the entity in order to populate a plurality of reports.

6. The method as defined in claim 1, wherein the report is an accounts payable statement, and further comprising:
triggering, by the one or more computers, initiation of a payment based at least in part on the transmission of the report where the payment method is an automated clearing house payment which may be initiated by multi-factor authentication which can be question based, code based, or selection based such that the routing number, and other account identifiers, are stored in a derivative table and accessed via a globally unique access token.

7. The method as defined in claim 1, wherein the report is an accounts receivable report, and further comprising:
scanning or inputting a purchase order, by the one or more computers, by employing optical character recognition; and
inputting some or all of the information present on the purchase order into a native accounting software for accounts receivable to populate the accounts receivable report.

8. The method as defined in claim 1, wherein the report is a financial statement.

9. The method as defined in claim 1, wherein the report is an internal revenue form.

10. The method as defined in claim 1, further comprising:
executing an API call, by the one or more computers, to retrieve, at least one transaction which has not been previously recorded and to parse a plurality of data points retrieved with that transaction; and
store for later use, by the one or more computers, the data points associated with the transaction in a derivative table using globally unique transaction identification codes.

11. The method as defined in claim 1, further comprising:
organizing, by the one or more computers, the financial transaction data according to a discrete histogram;
determining, by the one or more computers, a transactional frequency at which financial transactions for the entity occur; and
creating, by the one or more computers, a schedule to execute the API call based at least in part on the transactional frequency of the entity.

12. The method as defined in claim 1, further comprising:
retrieving a plurality of financial transactions including at least one financial transaction which has not been previously recorded;
queuing, by the one or more computers, the plurality of financial transactions;
storing, by the one or more computers, the financial transaction data for each of the financial transactions in tables with globally unique transaction identification codes; and
executing, by the one or more computers, one or more accounting operations.

13. The method as defined in claim 1, further comprising:
retrieving, by the one or more computers, a plurality of financial transactions including at least one financial transaction which has not been previously recorded by configuring a retrieval algorithm, to obtain, when executed, historical transaction data relating to at least one selected from the group of a checking account, a savings account, and a credit account, a mortgage account, a brokerage account, a loan account, or another account; and
performing, by the one or more computers, the steps of claim 1 on the historical transaction data; and
performing, by the one or more computers, one or more accounting operations.

14. The method as defined in claim 1, further comprising:
retrieving, when executed by the one or more computers, via an API call, an actual balance in an account and a current balance for the account after pending transaction amounts clear for one selected from the group of a checking account, a savings account, and a credit account;

populating, by the one or more computers, the actual balance and the current balance into respective locations in the report; and sending, by the one or more computers, via an electronic network, an electronic notification that a particular one of the locations in the report has been populated with the actual balance and the current balance, wherein the notification comprises an electronic element.

15. The method as defined in claim 1, comprising:

wherein the financial transaction data comprises a transaction amount, an account balance, account names, and pending status, queuing, by the one or more computers, a plurality of the financial transactions, and parsing the financial transaction data for each of the financial transactions into a table;

calculating a new transaction amount, by one or more computers, using one or more transaction amounts in the financial transaction data for at least one location in the report;

propagating, by the one or more computers, the new amount calculated throughout higher levels of the one data structure;

populating or revising the report, by the one or more computers, with the new amount based at least in part on the at least one location in the report to be populated; and transmitting, by the one or more computers, the report to the user after one or more locations in the report have been populated.

16. The method as defined in claim 15, wherein the financial transaction data is for an expense transaction for which payment was provided digitally, and subtracting, by the one or more computers, the transaction amount from the account balance; and summing, by the one or more computers, the transaction amount with an amount from the most granular element of the lower element of the one data structure.

17. The method as defined in claim 15, wherein the financial transaction data is for an expense transaction for which payment was provided as cash or check, receiving, by the one or more computers, an assignment from the entity of one or more categorical transaction tags;

subtracting, by the one or more computers, the transaction amount from the account balance; and summing, by the one or more computers, the transaction amount with the most granular element of the lowest level of the one data structure.

18. The method as defined in claim 15, wherein the financial transaction data is for an income transaction for which payment was provided digitally, and summing, by the one or more computers, the transaction amount with the account balance; and subtracting, by the one or more computers, the transaction amount from the most granular element of the lowest level of the one data structure.

19. The method as defined in claim 15, wherein the financial transaction data is for an income transaction for which payment was provided as cash or check, and receiving, by the one or more computers, an assignment from the entity, by the one or more computers, of one or more categorical transaction tags;

summing, by the one or more computers, the transaction amount for the income transaction with the account balance; and subtracting, by the one or more computers, the transaction amount from the most granular element of the lowest level of the data structure.

20. The method as defined in claim 15, wherein one or more items of financial transaction data are selected, and further comprising:

receiving, by the one or more computers, an assignment from the entity of a remediation amount to remediate a bank error;

re-calculating a new amount, by one or more computers, using the remediation amount for at least one location in the report; and re-propagating, by one or more computers, the new amount throughout higher levels of the one data structure.

21. The method as defined in claim 1, wherein there are a plurality of financial transactions, and further comprising:

placing, by the one or more computers, the plurality of financial transactions into a queue; and running, by the one or more computers, the method of claim 1 on each of the financial transactions in the queue in an order.

22. A system, comprising:

one or more computers configured to to retrieve or have retrieved, by the one or more computers, financial transaction data for a financial transaction for an entity;

to receive or obtain or have obtained, by the one or more computers, for the financial transaction, a plurality of categorical transaction tags categorizing the financial transaction, and one or more items of financial transaction data selected from the group of transaction amount, account balance, account names, pending status, location, meta score, and geo-coordinates;

to access, by the one or more computers, a taxonomy associated with the entity, wherein the taxonomy comprises a plurality of data structures that are vertical and/or flat, with each of the respective data structures having a progression inductively backwards to an upper level in the data structure, wherein each of the plurality of the data structures comprises a most granular element at a lower level, wherein the taxonomy is based on populating a report desired by a user, and wherein each of the data structures contains a level that references at least one location in the report to be populated;

to determine, by the one or more computers, an identification code for the financial transaction based at least in part on the plurality of categorical transaction tags, wherein the identification code references a particular one of the data structures in the taxonomy, where the particular one of the data structures comprises a corresponding unique data tag associated with a given level in the particular data structure;

to select, by the one or more computers, one from the plurality of the categorical transaction tags as the most granular element;

to assign, by the one or more computers, the unique data tag associated with the given level in the particular data structure to the one categorical transaction tag selected as the most granular element for the financial transaction;

to organize, by the one more computers, the financial transaction data based at least in part on the one categorical transaction tag, using one or more algorithms to identify, parse and transform the financial transaction data for use in logical functions that may comprise but not be limited to one selected from the group of inductive data structure propagation, accounting operations, and report creation;

to execute, by the one or more computers, an inductive algorithm using the one data structure to propagate from the most granular element in the lower level to a higher level in the one data structure via one or more fixed relationships between each level of the one data structure where the fixed relationships are determined according to the unique data tag and the one categorical transaction tag assigned to the transaction, where the fixed relationships are based on inductive propagation;

to determine, by the one or more computers, the at least one location in the report to be populated based at least in part on results from executing the inductive algorithm;

to populate or revise the report, by the one or more computers, with data from the financial transaction based at least in part on the at least one location in the report to be populated; and to transmit, by the one or more computers, the report to the user after one or more locations in the report have been populated.

23. A non-transitory computer-readable medium comprising computer-readable program code embodied therein, to be executed by one or more computers, comprising:

program code to retrieve or have retrieved, by the one or more computers, financial transaction data for a financial transaction for an entity;

program code to receive or obtain or have obtained, by the one or more computers, for the financial transaction, a plurality of categorical transaction tags categorizing the financial transaction, and one or more items of financial transaction data selected from the group of transaction amount, account balance, account names, pending status, location, meta score, and geo-coordinates;

program code to access, by the one or more computers, a taxonomy associated with the entity, wherein the taxonomy comprises a plurality of data structures that are vertical and/or flat, with each of the respective data structures having a progression inductively backwards to an upper level in the data structure, wherein each of the plurality of the data structures comprises a most granular element at a lower level, wherein the taxonomy is based on populating a report desired by a user, and wherein each of the data structures contains a level that references at least one location in the report to be populated;

program code to determine, by the one or more computers, an identification code for the financial transaction based at least in part on the plurality of categorical transaction tags, wherein the identification code references a particular one of the data structures in the taxonomy, where the particular one of the data structures comprises a corresponding unique data tag associated with a given level in the particular data structure;

program code to select, by the one or more computers, one from the plurality of the categorical transaction tags as the most granular element;

program code to assign, by the one or more computers, the unique data tag associated with the given level in the particular data structure to the one categorical transaction tag selected as the most granular element for the financial transaction;

program code to organize, by the one more computers, the financial transaction data based at least in part on the one categorical transaction tag, using one or more algorithms to identify, parse and transform the financial transaction data for use in logical functions that may comprise but not be limited to one selected from the group of inductive data structure propagation, accounting operations, and report creation;

program code to execute, by the one or more computers, an inductive algorithm using the one data structure to propagate from the most granular element in the lower level to a higher level in the one data structure via one or more fixed relationships between each level of the one data structure where the fixed relationships are determined according to the unique data tag and the one categorical transaction tag assigned to the transaction, where the fixed relationships are based on inductive propagation;

program code to determine, by the one or more computers, the at least one location in the report to be populated based at least in part on results from executing the inductive algorithm;

program code to populate or revise the report, by the one or more computers, with data from the financial transaction based at least in part on the at least one location in the report to be populated; and program code to transmit, by the one or more computers, the report to the user after one or more locations in the report have been populated.

* * * * *